US010367955B2

(12) United States Patent
Hitaka

(10) Patent No.: US 10,367,955 B2
(45) Date of Patent: Jul. 30, 2019

(54) IMAGE FORMING DEVICE AND DEVICE, SYSTEM, RECORDING MEDIUM WITH PROGRAM CODES FOR MANAGING CONSUMABLES IN IMAGE FORMING DEVICE

(71) Applicant: KONICA MINOLTA, INC., Chiyoda-ku, Tokyo (JP)

(72) Inventor: Masatoshi Hitaka, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/073,393

(22) Filed: Mar. 17, 2016

(65) Prior Publication Data

US 2016/0286059 A1 Sep. 29, 2016

(30) Foreign Application Priority Data

Mar. 25, 2015 (JP) .................. 2015-061857

(51) Int. Cl.
*G06F 3/12* (2006.01)
*H04N 1/00* (2006.01)
*H04N 1/32* (2006.01)

(52) U.S. Cl.
CPC ..... *H04N 1/00344* (2013.01); *H04N 1/00042* (2013.01); *H04N 1/00061* (2013.01);
(Continued)

(58) Field of Classification Search
None
See application file for complete search history.

(56) References Cited

U.S. PATENT DOCUMENTS

| 7,415,420 B2 | 8/2008 | Takata et al. |
| 2008/0201374 A1* | 8/2008 | Oya ............... G06Q 10/087 |

(Continued)

FOREIGN PATENT DOCUMENTS

| JP | 2002300308 A | 10/2002 |
| JP | 2012128237 A | 7/2012 |

(Continued)

OTHER PUBLICATIONS

Japanese Office Action dated Jul. 25, 2017 issued in counterpart Japanese Application No. 2015-061857.

(Continued)

*Primary Examiner* — Miya J Williams
(74) *Attorney, Agent, or Firm* — Holtz, Holtz & Volek PC

(57) ABSTRACT

A storage unit stores therein registered data about image forming devices connected to each other via a network. An acquisition unit refers to the registered data to acquire the number of the image forming devices. A consumption ratio monitor unit monitors a consumption ratio of consumables in at least one of the image forming devices. A prediction unit predicts a predicted time for replenishment or replacement of consumables for each image forming device monitored by the consumption rate monitor, based on the consumption ratio of consumables thereof, and corrects the predicted time based on comparison between a number that the acquisition unit has acquired and another number that the acquisition unit previously acquired. A requisition unit issues a request for replenishment or replacement of consumables at the predicted time.

27 Claims, 27 Drawing Sheets

(52) U.S. Cl.
CPC ..... *H04N 1/00068* (2013.01); *H04N 1/00323* (2013.01); *G06F 3/121* (2013.01); *G06F 3/1218* (2013.01); *G06F 3/1219* (2013.01); *G06F 3/1229* (2013.01); *G06F 3/1232* (2013.01); *G06F 3/1235* (2013.01); *G06F 3/1239* (2013.01); *H04N 1/32539* (2013.01); *H04N 2201/0094* (2013.01)

(56) References Cited

U.S. PATENT DOCUMENTS

| | | | | |
|---|---|---|---|---|
| 2008/0309964 | A1* | 12/2008 | Willis | H04N 1/00954 358/1.15 |
| 2011/0013915 | A1* | 1/2011 | Yamasaki | G03G 15/55 399/8 |
| 2011/0069977 | A1* | 3/2011 | Yasukawa | G03G 15/556 399/27 |
| 2012/0076518 | A1* | 3/2012 | Rapkin | G03G 15/5079 399/24 |
| 2012/0148267 | A1 | 6/2012 | Kawai | |
| 2014/0185084 | A1* | 7/2014 | Cudak | G06F 3/1296 358/1.15 |
| 2014/0355031 | A1* | 12/2014 | Fukuda | G06F 3/1263 358/1.14 |

FOREIGN PATENT DOCUMENTS

| | | |
|---|---|---|
| JP | 2014052697 A | 3/2014 |
| JP | 2014091298 A | 5/2014 |
| JP | 2014092729 A | 5/2014 |
| JP | 2015018008 A | 1/2015 |

OTHER PUBLICATIONS

Japanese Office Action (and English language translation thereof) dated Jan. 22, 2019 issued in counterpart Japanese Application No. 2017-226298.

* cited by examiner

FIG. 4

| Identification data | | Job types | | | | Sheet attributes | | | | | |
|---|---|---|---|---|---|---|---|---|---|---|---|
| Device name | IP address | Color? | Printer | Copier | Scanner | A3 | A4 | B4 | Normal paper | Coated paper | High-quality paper |
| DEV-01 | 10.1.1.4 | Color | ○ | ○ | ○ | ○ | ○ | ○ | ○ | ○ | ○ |
| DEV-02 | 10.1.1.8 | Color | ○ | × | × | × | × | × | ○ | ○ | ○ |
| DEV-03 | 10.1.1.32 | Color | ○ | × | × | × | ○ | × | ○ | ○ | × |
| DEV-04 | 10.1.1.55 | Monochrome | ○ | ○ | ○ | ○ | ○ | ○ | ○ | × | ○ |
| DEV-05 | 10.1.1.70 | Monochrome | × | ○ | × | ○ | ○ | ○ | ○ | × | ○ |

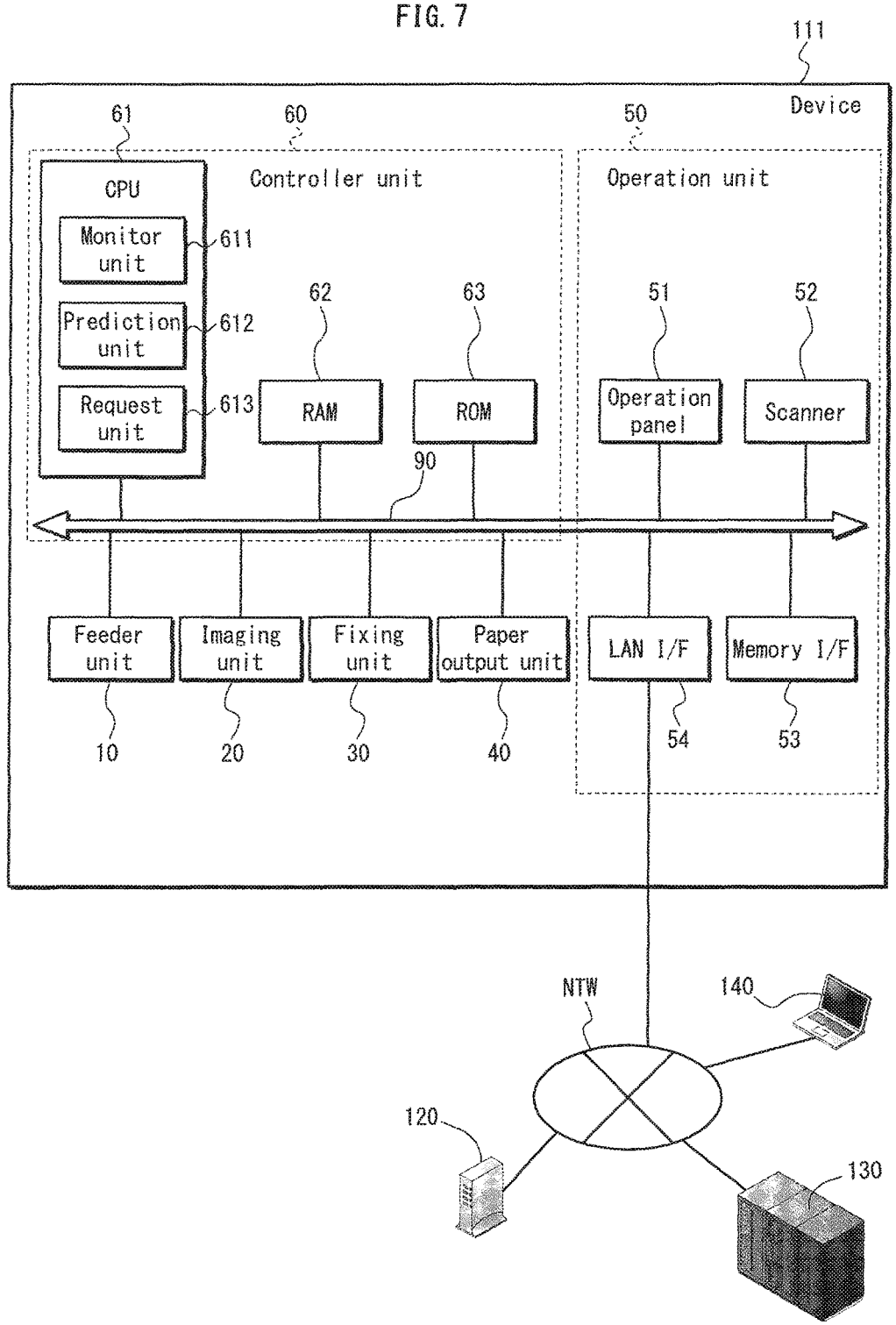

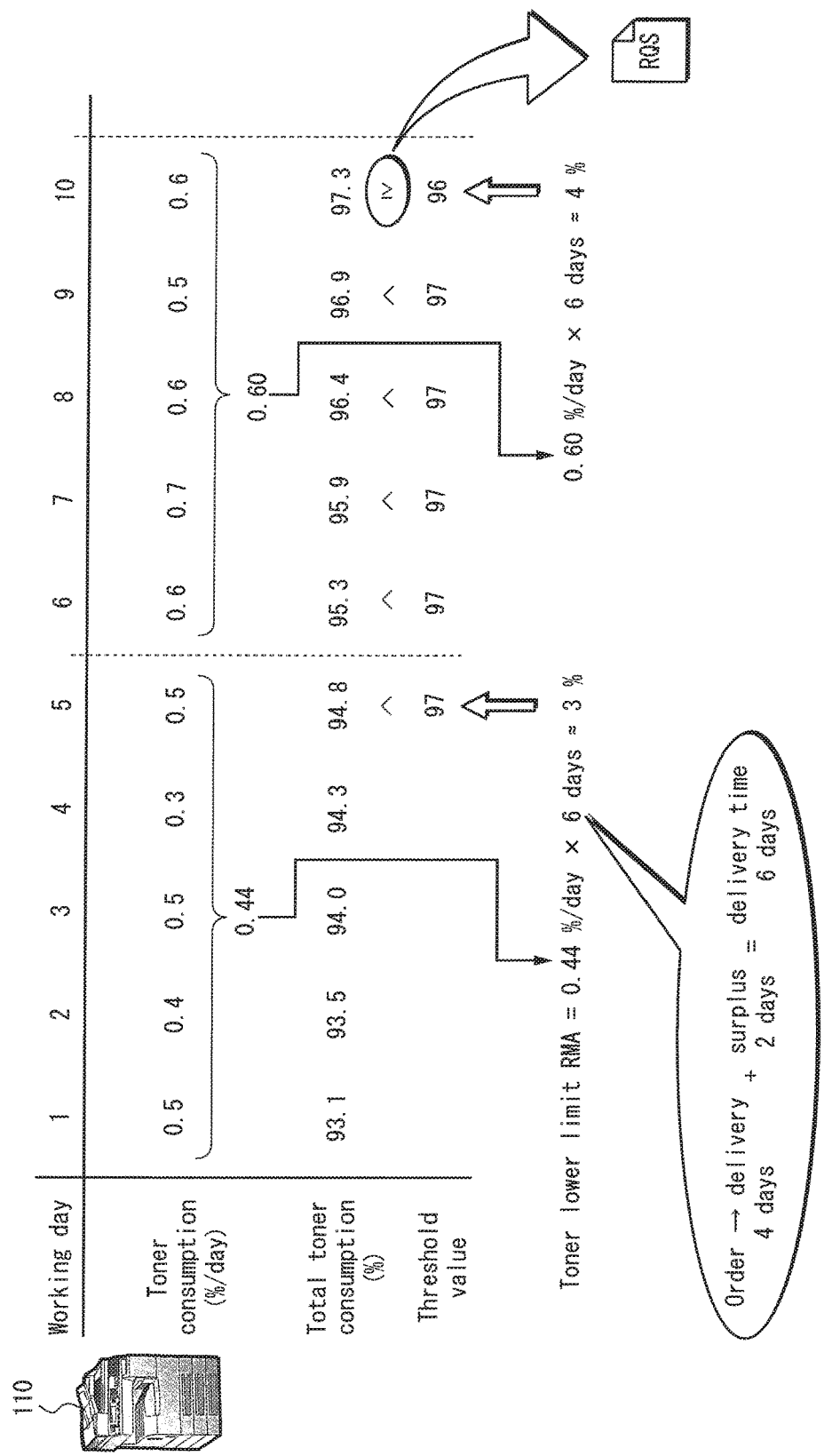

FIG. 21
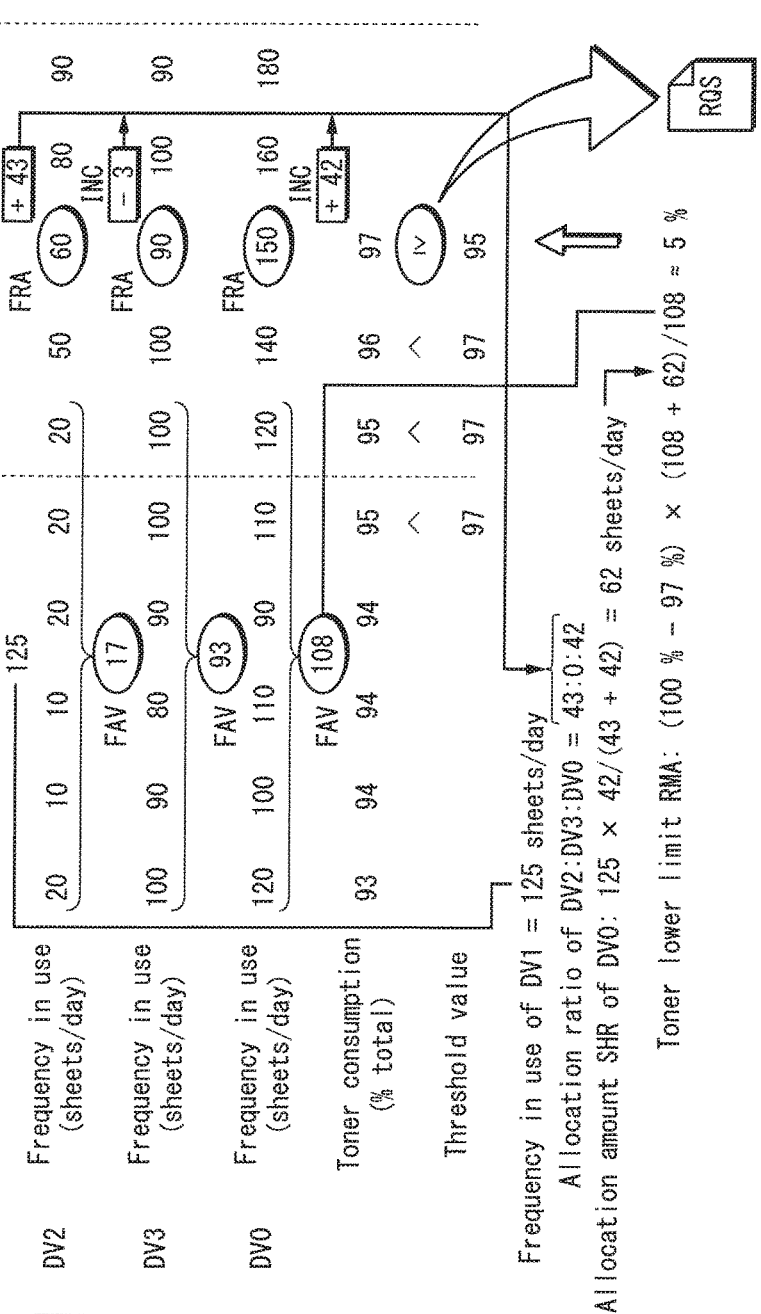
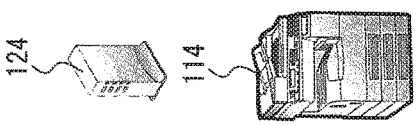

IMAGE FORMING DEVICE AND DEVICE, SYSTEM, RECORDING MEDIUM WITH PROGRAM CODES FOR MANAGING CONSUMABLES IN IMAGE FORMING DEVICE

This application is based on an application No. 2015-61857 filed in Japan, the contents of which are hereby incorporated by reference.

BACKGROUND OF THE INVENTION (1) Field of the Invention

The present invention relates to image forming devices, and in particular, technologies for managing consumables used in image forming devices.

(2) Background

Image forming devices use various consumables. For example, an image forming device uses sheets stored in its paper cassettes as objects of printing. In such printing, devices of an electrophotographic type use toner, while devices of an inkjet type use ink such as pigment. A device of the electrophotographic type has movable members such as photoreceptor drums, an intermediate transfer belt, and transfer rollers, which are subject to wear caused by contact with other members and to fatigue resulting from vibration and the like. Accordingly, replenishment or replacement of these consumables at an appropriate time is expected in maintenance of image forming devices.

A typical image forming device is equipped with functions of notifying users or other electronic devices of the time for replenishment or replacement of consumables depending on consumption ratios of the consumables; such functions serve as support for management of the consumables. More specifically, a typical image forming device monitors one or more parameters that quantitatively indicate operational statuses of the device, such as the number of sheets printed, the amount of toner consumed, the number of jobs processed, and operating time. Based on values of these parameters, the device estimates consumption ratios of the consumables. When any of the estimated values indicates a need for replenishment or replacement of a consumable, such as paper or toner shortage, or an upcoming end of an expected service life of a movable member, the image forming device then notifies a user of the replenishment or replacement by display on an operation screen, or makes a request for the replenishment or replacement to an external management server. See, for example, JP 2002-300308.

Furthermore, JP 2014-092729, JP 2014-091298, JP 2014-052697, and JP 2012-128237 disclose a system for predicting the time of replenishment or replacement of consumables from changes in operating status of an image forming device. More specifically, this system first acquires data on operational statuses of the image forming device at regular intervals, e.g., every hour or every day. This system next estimates from the history of operational statuses the rates at which the image forming device consumes consumables. These rates are hereinafter referred to as "consumption rates." The system then uses the estimated values to predict the time for replenishment or replacement of consumables. Under condition that new consumables will be delivered before this predicted time, the system orders the new consumables, thus making is possible to reduce or even eliminate the time during which exhaustion of a consumable brings the image forming device to a standstill.

SUMMARY OF THE INVENTION

With the growth in network technologies, more and more systems have centralized control over two or more image forming devices via networks. In recent years, such systems have grown in size, thus including not only office-wide systems but also corporate-wide systems. It is not uncommon for such a system to manage a dozen or even hundreds of image forming devices.

Such a large-scale system often fails to accurately predict the time for replenishment or replacement of consumables from the history of operational statuses of image forming devices in the system. In fact, in a network used by such a system, wild fluctuations in the number of image forming devices are not uncommon. In particular, the network may undergo temporary or permanent removal of image forming devices at short intervals. Around a location from which an image forming device has been removed, other devices typically operate at higher rates since they process more jobs in substitution for the removed device. Accordingly, consumption rates of consumables can easily rise beyond values estimated based on the history of operational statuses, and thus the actual times for replenishment or replacement of consumables are often earlier than predicted.

As a method for preventing such inaccurate prediction, increasing the frequency at which each image forming device acquires data on its own operational statuses may be considered. Higher frequency could be considered as enabling the prediction to conform to the fluctuations in number of image forming device within the network. However, excessively high frequencies could reduce the accuracy of the prediction, contrary to expectation, since high frequencies could cause individual jobs to influence evaluation of the operational statuses. Therefore, increasing the frequency of acquisition of the operational statuses is undesirable as a method for preventing inaccurate prediction.

An object of the invention is to solve the above-discussed technical problems and, in particular, to provide a system for managing consumables in image forming devices connected to the same network. The system can more accurately predict the time for replenishment or replacement of the consumables regardless of fluctuations in number of the image forming devices.

A system according to one aspect of the invention is a system comprising image forming devices that are connected to each other via a network. The system further comprises a storage unit, an acquisition unit, a consumption ratio monitor unit, a prediction unit, and a requisition unit. The storage unit stores therein registered data about the image forming devices. The acquisition unit refers to the registered data to acquire the number of the image forming devices. The consumption ratio monitor unit monitors a consumption ratio of consumables in at least one of the image forming devices. The prediction unit predicts a predicted time for replenishment or replacement of consumables for each image forming device monitored by the consumption rate monitor, based on the consumption ratio of consumables thereof, and corrects the predicted time based on comparison between a number that the acquisition unit has acquired and another number that the acquisition unit previously acquired. The requisition unit issues a request for replenishment or replacement of consumables at the predicted time.

An information processing device according to one aspect of the invention is a device connected to image forming devices via a network. The information processing device includes an acquisition unit, a consumption ratio monitor unit, a prediction unit, and a requisition unit. The acquisition unit refers to registered data about the image forming devices to acquire the number of the image forming devices. The consumption ratio monitor unit monitors a consumption ratio of consumables in at least one of the image forming devices. The prediction unit predicts a predicted time for replenishment or replacement of consumables for each image forming device monitored by the consumption rate monitor, based on the consumption ratio of consumables thereof, and corrects the predicted time based on comparison between a number that the acquisition unit has acquired and another number that the acquisition unit previously acquired. The requisition unit issues a request for replenishment or replacement of consumables at the predicted time.

A non-transitory recording medium according to one aspect of the invention is a non-transitory recording medium readable for a computer connected to image forming devices via a network. The recording medium includes program code recorded thereon. According to the program code, the computer executes: referring to registered data about the image forming devices to acquire the number of the image forming devices; monitoring a consumption ratio of consumables in at least one of the image forming devices; predicting a predicted time for replenishment or replacement of consumables for each image device monitored, based on the consumption ratio; correcting the predicted time based on comparison between the number and a number previously acquired; and issuing a request for replenishment or replacement of consumables at the predicted time.

BRIEF DESCRIPTION OF THE DRAWINGS

These and other objects, advantages, and features of the invention will become apparent from the following description thereof taken in conjunction with the accompanying drawings which illustrate a specific embodiment of the invention.

In the drawings:

FIG. 4 is a table showing registration data about devices, which is stored in the storage unit shown in FIG. 3;

FIG. 7 is a block diagram of an electronic control system of the image forming device shown in FIG. 5;

FIG. 8 is a schematic diagram for illustrating a process of predicting the time for replenishment of toner based on the history of amounts of the toner that the image forming device illustrated in FIG. 7 has consumed;

FIG. 21 is a schematic diagram for illustrating a process in which an image forming device according to Embodiment 4 of the invention corrects predicted time for replenishment of toner based on the number and frequencies in use of operable image forming devices;

DETAILED DESCRIPTION

The following describes embodiments of the invention with reference to the drawings.

Embodiment 1

A consumables management system according to Embodiment 1 of the invention is incorporated in an existing system comprising a plurality of image forming devices and one or more manager devices connected via a network. The consumables management system supports timely replenishment of toner consumed by the image forming devices. The existing system may, for example, be designed to distribute jobs via a print server, to bill for use of the image forming devices, and to detect errors such as paper jams and notify an administrator of the errors.

[Configuration of Consumables Management System]

Figure 1:
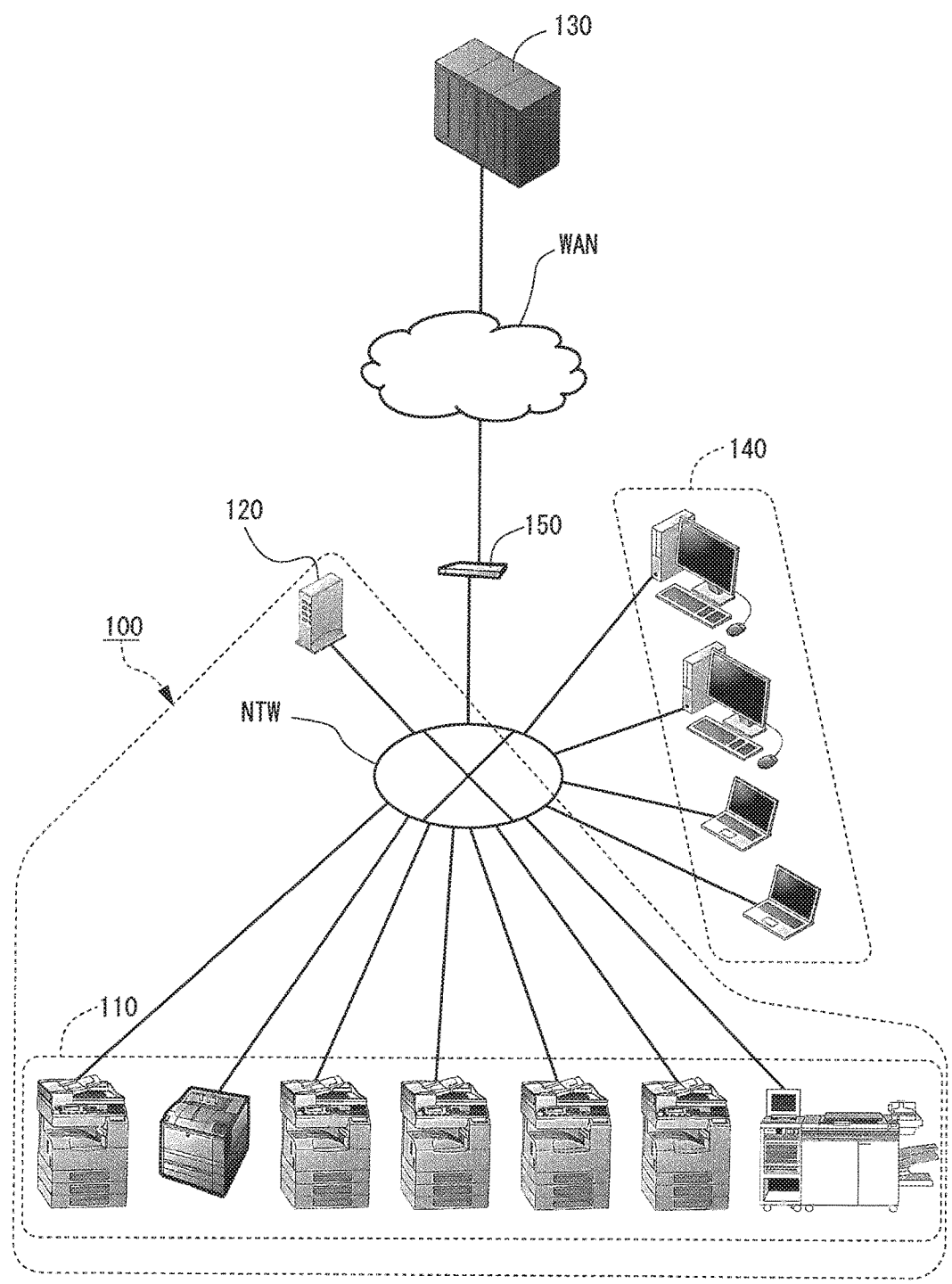
FIG. 1 is a network diagram of a consumables management system according to Embodiment 1 of the invention.

FIG. 1 is a network diagram of the consumables management system according to Embodiment 1 of the invention. Referring to FIG. 1, a system 100 includes a device group 110 and a manager device 120. The device group 110 and the manager device 120 are connected via a network NTW to each other and to a personal computer (PC) group 140. The network NTW is, for example, a TCP/IP network that is a local area network (LAN) built into an office or building, an intranet owned by a company, or a virtual private network (VPN) via the internet. The network NTW is further connected to a wide area network WAN such as the internet via a router 150. This allows the manager device 120 to communicate with a cloud server 130 on the wide area network WAN. The cloud server 130 is a PC, server, or mainframe owned by a company that leases the device group 110 of image forming devices or a company commissioned to maintain the image forming devices of the device group 110.

The device group 110 includes a plurality of image forming devices (hereinafter, "devices") such as printers, copiers, scanners, fax machines, and multi-function peripherals (MFPs). Each device of the device group 110 is connected to the PC group 140 via the network NTW, and receives and prints image data from the PC group 140 or captures and sends image data from documents to the PC group 140.

The manager device 120 is a general-purpose information processing machine, such as a PC or server, that executes specific software to serve as a manager device, or alternatively is a dedicated information processing machine equipped with hardware such as electronic circuitry dedicated to specific functions to serve as a manager device. A primary function of the manager device 120 is to manage jobs assigned to some or all of the device group 110. For example, as a print server the manager device 120 accepts jobs from the PC group 140, and allocates or distributes the jobs to target devices of the device group 110. As a storage server the manager device 120 stores, downloads from the cloud server 130, and uploads to the cloud server 130 image data to be processed or image data processed by target devices of the device group 110.

Furthermore, another primary function of the manager device 120 may be to support maintenance of some or all devices of the device group 110. Through the network NTW, the manager device 120 may monitor operational statuses of target devices of the device group 110 and periodically collect from the target devices values of parameters quantitatively indicating their operational statuses, such as the numbers of printed sheets and operation times, to send the values to the cloud server 130. The manager device 120 may further detect errors such as paper jams from the target devices and notify the cloud server 130 of the errors. The cloud server 130 then, based on the values of parameters periodically received from the manager device 120, bills for use of each target device, and in response to notification of an error from the manager device 120, provides support for recovery, such as arranging personnel to repair the error.

[Summary of Functions of Consumables Management System]

In addition to the primary functions described above, the manager device 120 has the following functions as an element of the consumables management system 100: (1) accepting toner replenishment requests from target devices of the device group 110; (2) accepting from the PC group 140 requests for registration of adding/removing a device to/from the device group 110; and (3) periodically notifying target devices in the device group 110 of the number of devices in the device group 110.

Each target device of the device group 110 has the following functions as an element of the consumables management system 100: (4) monitoring consumption of toner in the device; (5) predicting a toner replenishment time for the device, based on a rate at which the device consumes toner; (6) transmitting a toner replenishment request to the manager device 120 when the predicted replenishment time is reached; and (7) correcting the predicted replenishment time based on the number of devices indicated in a notification from the manager device 120.

—Request for Replenishment of Toner—

Figure 2A:
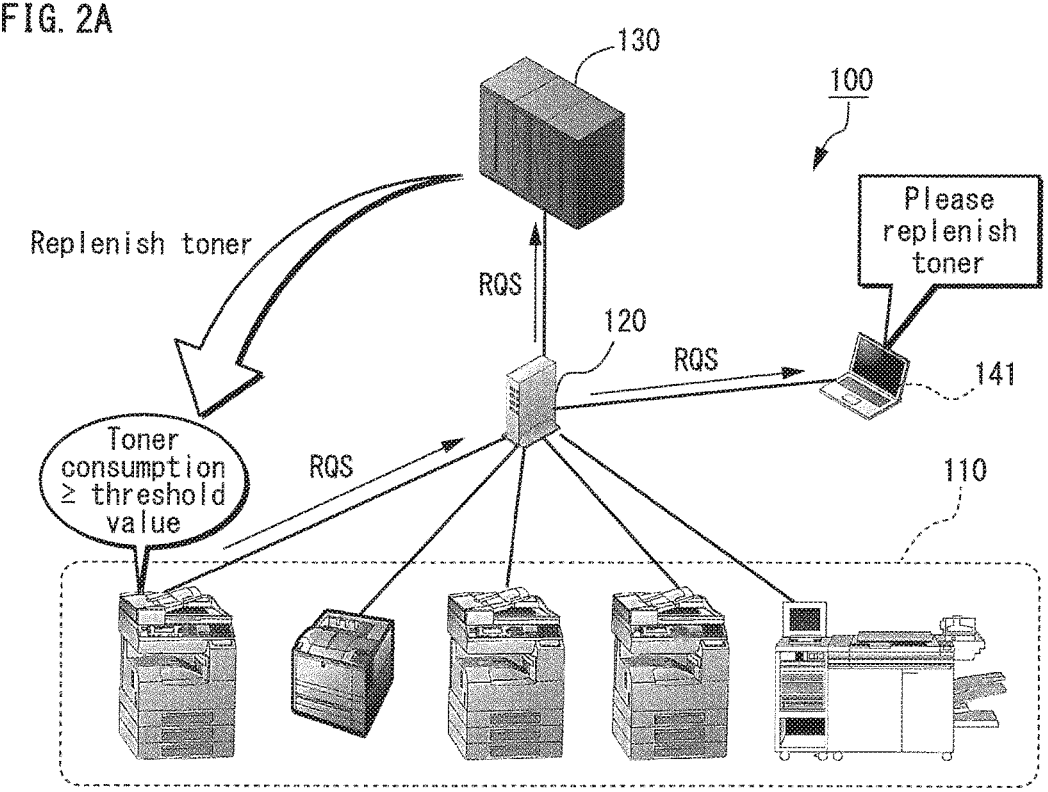
FIG. 2A is a schematic diagram showing data exchanges by the system shown in FIG. 1 when requesting replenishment of consumables.

FIG. 2A is a schematic diagram showing data exchanges by the system 100 when requesting replenishment of toner. Referring to FIG. 2A, each target device of the device group 110 first sets the replenishment time to the time when an amount of toner consumption reaches a threshold value and transmits, at the replenishment time, a replenishment request RQS to the manager device 120. The manager device 120 sends the replenishment request RQS to the cloud server 130 or a terminal 141 in the PC group 140. In response to the replenishment request RQS, the cloud server 130 supports toner replenishment by, for example, placing an order for a toner bottle. In response to the replenishment request RQS, the terminal 141 displays onscreen a message such as "please replenish toner", to prompt a user to replenish toner in each applicable device in the device group 110.

Each target device of the device group 110 sets the threshold value for toner consumption as follows. The target device initially estimates toner consumption for processing each job, and aggregates the estimated values for jobs at intervals of, for example, one working day, i.e., each day the device group 110 operates. From a history of aggregated values, the target device next estimates a consumption rate of toner, i.e., amount of toner consumption per working day, at intervals of, for example, one week or five working days, which are longer intervals than the intervals at which the target device aggregates estimated toner consumption values. The target device then calculates the product of the consumption rate and the number of working days required for the device to be actually replenished with toner after sending the replenishment request RQS. This number is hereinafter referred to as "toner delivery time." The target device sets this product as the amount of toner that should remain when placing an order for a toner bottle. This amount is hereinafter referred to as a "toner lower limit." The target device further sets the threshold value to a value obtained by subtracting the toner lower limit from a maximum toner capacity of the device.

Thus, the threshold value indicates a predicted value of total toner consumption at which, when reached, sufficient time remains to supply toner before the toner becomes exhausted. In this sense, the threshold value is considered to be a "predicted time for replenishment or replacement of consumables". As long as the target device sends a replenishment request RQS when the total toner consumption reaches the threshold value, there is a sufficiently high probability that the device is replenished with toner before the toner is exhausted.

Furthermore, the threshold value, i.e., the predicted time for replenishment or replacement of consumables, is updated at intervals of, for example, a week or five working days. Updating the predicted time at such appropriate intervals prevents the predicted time from being greatly influenced by sudden fluctuations in the toner consumption rate, such as an unusual increase in the number of jobs to be processed, and enables the predicted time to be accurately adjusted to conform to variations over long periods of use that have a large influence in the toner consumption rate, such as year-end and month-end concentrations of jobs.

—Correction of Replenishment Time Prediction—

When the number of devices in the device group 110 changes, the system 100 corrects the predicted replenishment time for each target device as follows, based on a comparison of the number of devices before and after the change in number, and regardless of whether or not an added/removed device is a target device.

Figure 2B:
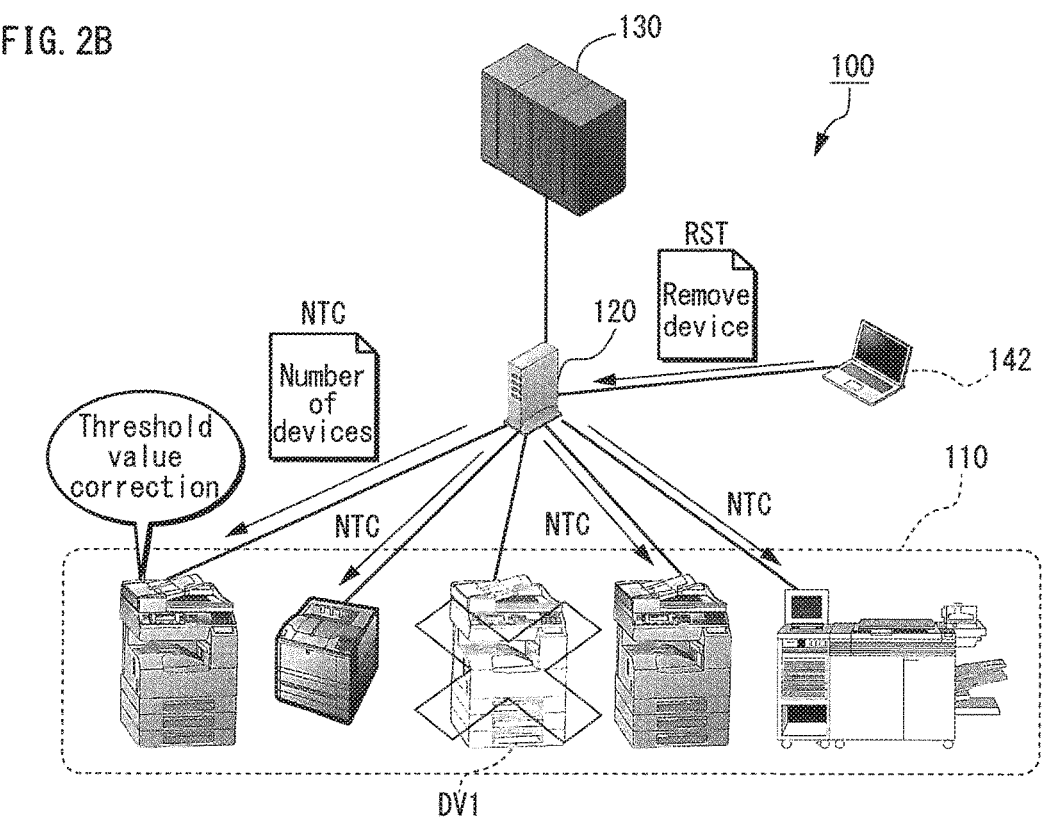
FIG. 2B is a schematic diagram showing data exchanges by the system when receiving registration of removal of an image forming device from the network.

FIG. 2B is a schematic diagram showing data exchanges that the system 100 performs when receiving registration of removal of a device from the network NTW. Referring to FIG. 2B, when a device DV1 of the device group 110 is removed from the network NTW, a user operates a terminal 142 of the PC group 140 to send a registration request RST for registration of the removal of the device DV1 to the manager device 120, regardless of whether or not the device DV1 is one of the target devices managed by the manager device 120. The registration request RST includes identification data of the device DV1. Upon accepting the registration request RST, the manager device 120 specifies the device DV1 from the identification data indicated in the registration request RST, and updates information the registration data regarding the device DV1 regardless of whether or not the device DV1 is a device managed by the manager device 120. The manager device 120 operates in a similar manner when a new device is added to the device group 110; in response to a registration request RST for the addition of the new device, the manager device 120 creates registration data about the new device regardless of whether the device will be managed by the manager device 120.

The manager device 120 periodically references registration data about the device group 110 to count the number of devices in the device group 110 regardless of whether or not each device is managed by the manager device 120, and notifies the device group 110 of data NTC indicating the number of devices. The interval for notification is set to be equal to or less than the interval for prediction of replenishment time, which may be a week or five working days, for example the interval for notification may be one working day.

When receiving the data NTC, each of the devices of the device group 110 reads the number of devices from the data NTC and calculates the ratio of the number to another number of devices read from the previously-received data NTC. When this ratio is not "1", it indicates a change in the number of devices. Accordingly, each device of the device group 110 uses the ratio to correct their predicted replenishment time, i.e., their threshold value for toner consumption. For example, when the ratio is greater than "1", an increase in the number of devices is indicated, and therefore each device increases its threshold value, pushing back the replenishment time. On the other hand, when the ratio is less than "1", a decrease in the number of devices is indicated, and therefore each device decreases its threshold value, bringing forward the replenishment time. Thus, each device corrects its predicted replenishment time according to changes in the number of devices.

In particular, the interval for notification of the number of devices is set to be equal to or less than the interval for prediction of replenishment time, and therefore even if removal of the device DV1 causes an abrupt increase in the amount of jobs that the surrounding devices should process, the system 100 enables each device to bring forward the replenishment time to keep pace with the abrupt increase.

[Hardware Configuration of Manager Device]

Figure 3:
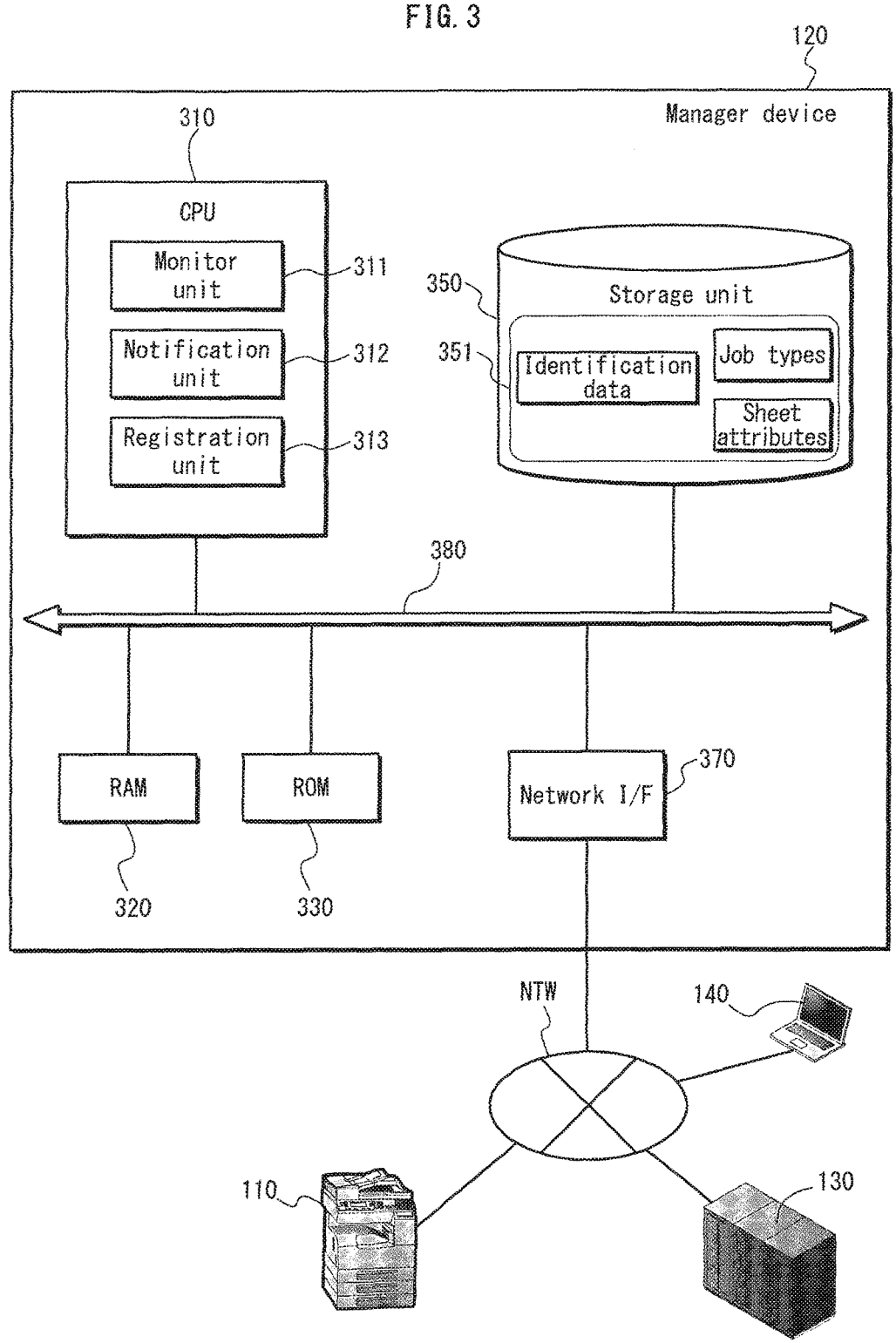
FIG. 3 is a block diagram showing hardware configuration of the management device shown in FIG. 1.

FIG. 3 is a block diagram showing hardware configuration of the manager device 120. Referring to FIG. 3, the manager device 120 includes a CPU 310, a RAM 320, a ROM 330, a memory 350, and a network interface (I/F) 370. These elements 310, 320, 330, 350, 370 are connected to be able to communicate with each other via a bus 380.

The CPU 310, the RAM 320, and the ROM 330 are electronic circuits mounted on a single substrate of the manager device 120. The CPU 310 controls the elements 320, 330, 350, 370 according to firmware. According to this control, the CPU 310 implements in particular the three functions described above as an element of the consumables management system: (1) accepting toner replenishment requests; (2) accepting requests for registration of adding/removing a device; and (3) periodically notifying target devices of the number of devices. The RAM 320 provides the CPU 310 with a workspace for executing firmware. The ROM 330 includes a non-writable semiconductor memory device and a writable semiconductor memory device such as EEPROM. The former stores firmware and the latter provides the CPU 310 with storage for data such as environmental variables.

The storage unit 350 is a non-volatile mass storage device such as a hard disk drive (HDD) or solid state drive (SSD). In particular, the storage unit 350 stores registration data 351 regarding the device group 110.

The network I/F 370 is connected to the network NTW by wired or wireless means, and communicates with the device group 110, the PC group 140, and the cloud server 130 via the network NTW. In particular, the network I/F 370 notifies the CPU 310 of receipt of a replenishment request RQS from the device group 110, notifies the CPU 310 of receipt of a registration request RST for addition/removal of a device from the PC group 140, and transmits a replenishment request RQS to the cloud server 130.

—Entries of Registration Data about Device Group—

FIG. 4 is a table showing registration data about the device group, which is stored in the storage unit 350. Referring to FIG. 4, entries in the registration data include an identification data item for each device, types of jobs that device can process, and attributes of sheets that the device can process. The identification data item indicates, for example, a name and IP address of the device. The types of jobs indicate whether the device can process color, and whether the device has functions such as printing, copying, and scanning. The attributes of sheets indicates whether the device can process, for example, paper sizes such as A3, A4, and B4 and paper types such as plain, coated, and high-quality. Although not indicated in FIG. 4, the registration data may also include entries indicating whether the device can perform duplex printing, presence or absence of an automatic document feeder (ADF), and which types of post-processing the device can perform.

Functional Units of Manager Device

Referring again to FIG. 3, the CPU 310 operates according to firmware as functional units 311, 312, 313 to implement the three functions (1), (2), and (3), mentioned above. These functional units include a monitor unit 311, a notification unit 312, and a registration unit 313. The monitor unit 311 controls the network I/F 370 to detect a replenishment request RQS from the device group 110 and a registration request RST from the PC group 140. The notification unit 312 periodically accesses the storage unit 350 at intervals of, for example, one working day, to reference the registration data 351 about the device group 110, count IP addresses contained in the identification data of the device group 110, and set the number of IP addresses as the number of devices in the device group 110. The notification unit 312 further creates data NTC indicating the number of devices and controls the network I/F 370 to notify the device group 110 of the data NTC. When the network I/F 370 detects a replenishment request RQS from a device of the device group 110, the notification unit 312 controls the network I/F 370 to transfer the replenishment request RQS to the cloud server 130. The registration unit 313 analyzes the registration request RST sent from the PC group 140 and detected by the network I/F 370. In response to a request containing an identification data item of a device to be added, the registration unit 313 adds the item to the registration data 351 in the storage unit 350. In response to a request containing an identification data item of a device to be removed, the registration unit 313 retrieves from the storage unit 350 the entries of the registration data 351 that are associated with the identification data item, then either adds to the entries an item indicating removal of the device or deletes the entries from the storage unit 350.

Configuration of Image Forming Device

Figure 5:
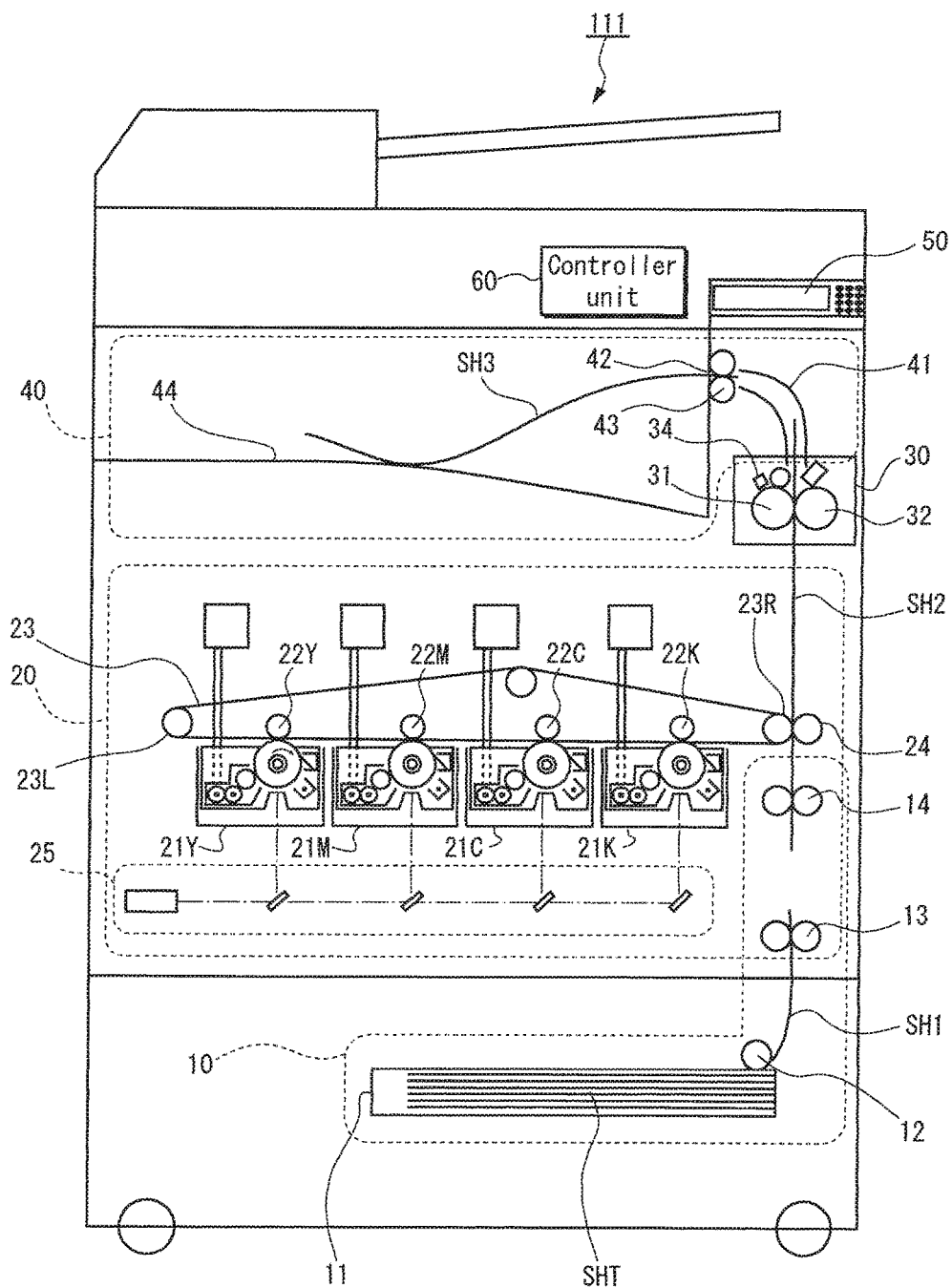
FIG. 5 is a schematic frontal view showing configuration of the image forming device shown in FIG. 1.

FIG. 5 is a schematic frontal view showing the configuration of an MFP 111 as an example of an image forming device of the device group 110. In FIG. 5, internal elements of the MFP 111 are drawn as if housing of the MFP 111 were transparent. The MFP 111 is equipped with a color printer function. Referring to FIG. 5, the MFP 111 is provided with an operation unit 50, a controller unit 60, and an image forming section. The operation unit 50 accepts a job request such as a print request and image data to be processed via operations performed by a user on an operation panel or communication with an external electronic device. The operation unit 50 then communicates the job request and the image data to the controller unit 60. The controller unit 60 is an electronic circuit mounted on a single substrate, and controls operations of other elements of the MFP 111 based on data from the operation unit 50. The image forming section includes a feeder unit 10, an image forming unit 20, a fixing unit 30, and a paper output unit 40. The image forming section forms a toner image on a sheet based on image data received from the operation unit 50.

The feeder unit 10 contains sheets SHT in a paper feed cassette 11 housed in a lower portion of the MFP 111. The sheets SHT may be paper or resin, size A3, A4, A5, B4, etc., and plain, coated, high-quality, etc. Although not illustrated in FIG. 5, the paper feed cassette 11 may be provided in a plurality and different cassettes may contain sheets having different properties. The feeder unit 10 uses a transport roller group 12, 13, 14 to separate and transport individual sheets from the sheets SHT to the image forming unit 20.

The image forming unit 20 includes an intermediate transfer belt 23 that passes around and is supported between two rollers 23L, 23R. The image forming unit 20 makes the intermediate transfer belt 23 rotate and pass between imaging units 21Y, 21M, 21C, 21K and primary transfer rollers 22Y, 22M, 22C, 22K. Thus, four toner images in four colors: yellow (Y), magenta (M), cyan (C), and black (K) overlap to form a single color toner image at an identical position on the intermediate transfer belt 23. The image forming unit 20 then passes a sheet SH2, which is fed from the feeder unit 10, through a nip between the intermediate transfer belt 23 and a secondary roller 24, in order to transfer the color toner image from the intermediate transfer belt 23 to the sheet SH2 and at the same time, to feed the sheet SH2 towards the fixing unit 30.

The fixing unit 30 passes the sheet SH2 through a nip formed between a fixing roller 31 and a pressure roller 32, in order that the sheet SH2 is heated by an internal heater or similar of the fixing roller 31 while the pressure roller 32 presses the sheet SH2 against the fixing roller 31. The toner image is fixed onto a surface of the sheet SH2 according to heat from the fixing roller 31 and pressure from the pressure roller 32. The fixing roller 31 and the pressure roller 32 further feed the sheet SH2 to the paper output unit 40.

When the sheet SH2 is fed from an upper portion of the fixing unit 30 to a guide 41, and guided along the guide 41, the paper output unit 40 uses an output roller 43 to output the sheet SH2 from an output opening 42. Thus, a sheet SH3 on which a toner image is formed is stacked on an output tray 44.

—Imaging Unit Configuration—

Figure 6A:
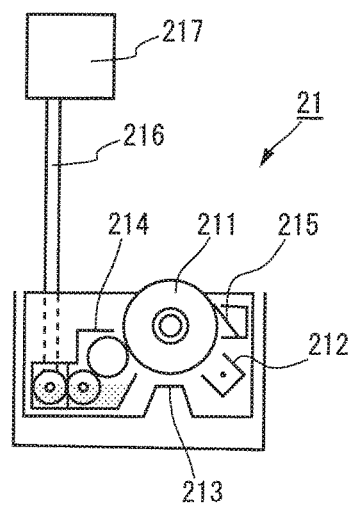
FIG. 6A is a cross-section view of one of the image forming units shown in FIG. 5, FIGS. 6B and 6C are top and cross-section views, respectively, of a development unit built into the one of the image forming units.

FIG. 6A is a cross-section of an imaging unit 21. Each of the four imaging units 21Y, 21M, 21C, 21K have the same configuration as the imaging unit 21 shown in FIG. 6A. The imaging unit 21 includes a photoreceptor drum 211, a charger 212, a light exposure opening 213, a developer unit 214, a cleaner 215, an eraser lamp (not illustrated in FIG. 6A), a toner supply tube 216, and a toner cartridge 217.

The photoreceptor drum 211 is a cylindrical member, a circumferential surface of which is covered by a photoreceptor. The photoreceptor is chargeable, and portions of the photoreceptor that are exposed to light are thereby neutralized. The photoreceptor drum 211 is rotatable around a central axis thereof, and rotation causes each portion of the circumferential surface of the photoreceptor drum 211 to face the charger 212, the light exposure opening 213, the developer unit 214, the intermediate transfer belt 23, and the cleaner 215, in this order.

The charger 212 causes discharge near a portion of the circumferential surface of the photoreceptor drum 211 that faces the charger 212, or directly transfers a charge to the portion. Thus the portion of the photoreceptor drum 211 is uniformly charged.

The light exposure opening 213 is an opening that guides laser light from an exposure unit 25 to the interior of the imaging unit, exposing to light a portion of a charged region of the circumferential surface of the photoreceptor drum 211 that faces the light exposure opening 213. Thus, the exposed portion is neutralized, forming an electrostatic latent image.

The developer unit 214 loads toner stored in the toner cartridge 217 via the toner supply tube 216, and puts toner onto portions of the circumferential surface of the photoreceptor drum 211 on which the electrostatic latent image is formed. Thus, toner attaches to the electrostatic latent image, and the electrostatic latent image is made visible as a toner image.

The cleaner 215 cleans off residue toner from a portion of the circumferential surface of the photoreceptor drum 211 immediately after contact with the intermediate transfer belt 23. The eraser lamp exposes a facing portion of the circumferential surface of the photoreceptor drum 211 to uniform light to neutralize the facing portion.

—Developer Unit Configuration—

Figure 6B:
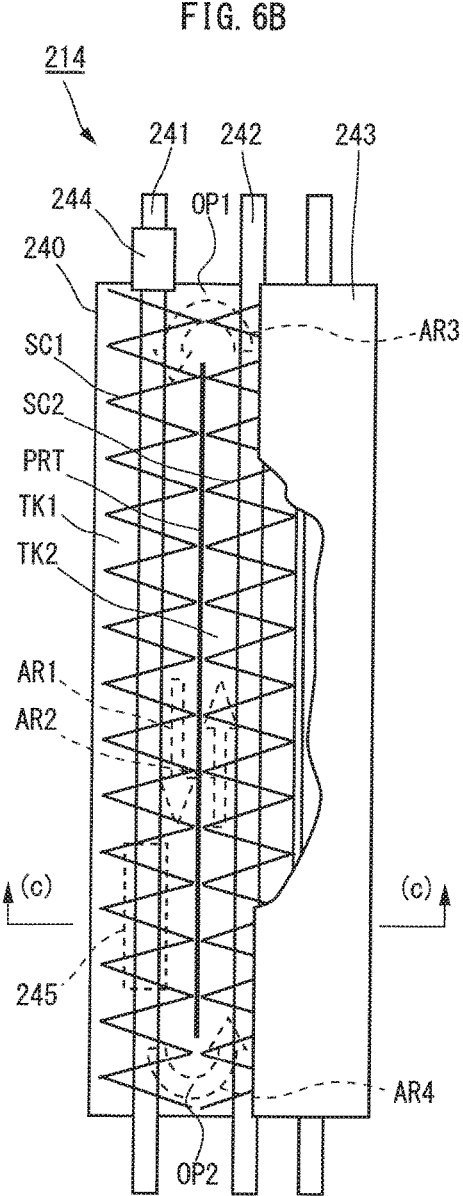
Figure 6C:
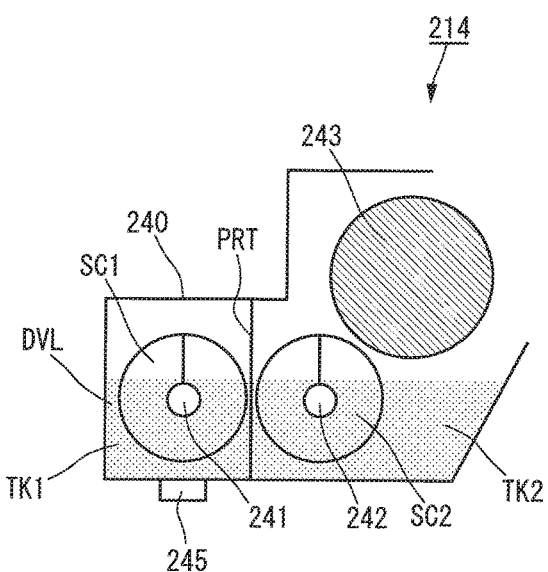

FIG. 6B and FIG. 6C are top and cross sections of the developer unit 214. Referring to FIG. 6B and FIG. 6C, the developer unit 214 includes a casing 240, an agitator shaft 241, a supply shaft 242, and a developer roller 243.

An interior of the casing 240 is divided by a partition PRT into an agitation tank TK1 and a supply tank TK2. A portion of the agitation tank TK1 and a portion of the agitation tank TK2 are filled with developer DVL. The developer DVL includes both toner and carrier. The toner is a fine powder of an electrically conductive non-magnetic material, colored one of the four colors Y, M, C, and K. The carrier is powder of a magnetic insulating material. Particle diameter of the carrier is greater than particle diameter of the toner, and a large number of toner particles are adsorbed on each surface of each carrier particle.

The agitator shaft 241 is housed in the agitator tank TK1 and is rotatable around a central axis of the agitator shaft 241. A screw SC1 is formed on a circumferential surface of the agitator shaft 241, and, along with rotation of the agitator shaft 241, mixes the developer DVL and transports it in a direction indicated by the arrow AR1 in FIG. 6B. The supply shaft 242 is housed in a portion of the supply tank TK2 that is partially filled with the developer DVL, and is rotatable around a central axis of the supply shaft 242. A screw SC2 is formed on a circumferential surface of the supply shaft 242, and, along with rotation of the supply shaft 242, mixes the developer DVL and transports it in a direction opposite the direction of transport of the screw SC1 of the agitator axis 241, as indicated by the arrow AR2 in FIG. 6B. The partition PRT is provided with an opening OP1 and an opening OP2, allowing the developer DVL to circulate between the agitator tank TK1 and the supply tank TK2 (as indicated by arrows AR3, AR4 in FIG. 6B). Thus, the toner is charged by friction with the carrier while the developer DVL is circulated.

The developer roller 243 is disposed in a portion of the supply tank TK2 above the portion filled with the developer DVL, and is rotatable around a central axis of the developer roller 243. The developer roller 243 incorporates a magnet, and the carrier in the developer DVL is adsorbed on the circumferential surface of the developer roller 243 by magnetic force of the magnet. The circumferential surface of the developer roller 243 faces the circumferential surface of the photoreceptor drum 211 across a predefined distance. A bias voltage is applied between the developer roller 243 and the photoreceptor drum 211, and therefore electrostatic force causes toner to move from the surface of carrier adsorbed on the circumferential surface of the developer roller 243 to attach to the circumferential surface of the photoreceptor drum 211.

Referring again to FIG. 6B, a toner:carrier ratio (TCR) sensor 245 is disposed on a bottom portion of the agitator tank TK1. The TCR sensor 245 measures a toner-to-carrier ratio of developer DVL moving in the agitator tank TK1. Unlike the carrier, the toner is not magnetic, and therefore the higher the magnetic permeability of the developer DVL, the lower the ratio of toner to carrier in the developer DVL. Using this magnetic permeability, the controller unit 60 detects the ratio of toner to carrier in the developer DVL from a value measured by the TCR sensor 245, and determines an amount of toner to be supplied to the developer unit 214 based on the value detected.

FIG. 6B illustrates a toner inlet 244. The toner inlet 244 connects the toner supply tube 216 to the agitator tank TK1, and includes a motor for toner supply. The motor is driven according to a drive signal from the controller unit 60 and supplies a designated quantity of toner from the toner cartridge 217 to the agitator tank TK1 via the toner supply tube 216.

Electronic Control System of Image Forming Device

FIG. 7 is a block diagram of the electronic control system of the MFP 111. Referring to FIG. 7, the operation unit 50, the controller unit 60, and image forming elements 10, 20, 30, 40 are connected to be able to communicate with each other via a bus 90.

The operation unit 50 includes an operation panel 51, a scanner 52, a memory interface (I/F) 53, and a LAN I/F 54. The operation panel 51 includes a push button, a touch panel, and a display. The operation panel 51 displays a graphical user interface (GUI), such as an operation screen and a parameter input screen, in response to a drive signal from the controller unit 60. The operation panel 51 also identifies operation of the push button or a location on the touch panel by a user, and transmits to the controller unit 60 operation data regarding the identification of a user operation. The scanner 52 exposes a surface of a document to light by using internal optical equipment, reads characters, diagrams, and photographs from an intensity distribution of resulting reflected light, converts the intensity distribution into image data, and transmits the image data to the controller unit 60. The memory I/F 53 accepts image data directly from an attached storage device such as a USB memory or a HDD via a video input terminal such as a USB port or a memory card slot. The LAN I/F 54 is connected to the network NTW by wired or wireless means, and communicates with other electronic devices that are connected to the network NTW. The LAN I/F 54 receives instructions from a user, and in particular receives jobs and image data to be printed from the other electronic devices.

The controller unit 60 includes a CPU 61, a RAM 62, and a ROM 63. The CPU 61 controls the elements 10, 20, 30, 40, 50 according to firmware. The RAM 62 provides the CPU 61 with a workspace for firmware to be executed by the CPU 61, and stores image data to be printed that is received by the operation unit 50. The ROM 63 includes a non-writable semiconductor memory device and a writable semiconductor memory device such as EEPROM. The former stores firmware and the latter provides the CPU 61 with storage for data such as environmental variables.

[Functions of Controller Unit]

The controller unit 60 transmits drive signals to other elements in the MFP 111, based on operation information from the operation unit 50. Thus, the controller unit 60 instructs the other elements to enter operation modes such as a running mode, a waiting mode and a sleep mode so that the other elements execute their respective processing according to the operation mode entered.

The controller unit 60 makes the operation unit 50 display an operation screen and accept operations from a user. When the operation unit 50 receives a job from a user, the controller unit 60 makes the operation unit 50 transfer image data to be printed to the RAM 62. The controller unit 60 further specifies to the feeder unit 10 the type of sheet to be fed and timing of sheet feeding, according to printing conditions indicated in the job, and provides image data representing the toner image to be formed to the image forming unit 20. In particular, the controller unit 60 makes the exposure unit 25 change laser light emission patterns based on the image data.

When providing the image forming unit 20 with image data, the controller unit 60 processes the image data by methods such as color correction, gray level correction, screening, and error diffusion. These image processing methods are hereinafter collectively referred to as raster image processing (RIP). The controller unit 60 then provides the resultant raster image data to the image forming unit 20. In particular, according to the screen processing, the raster data represents four color values of each pixel as densities of dots made by toner of respective colors.

Referring to FIG. 7, the controller unit 60 includes a monitor unit 611, a prediction unit 612, and a request unit 613. The CPU 61 operates according to firmware to implement these functional units, and in particular the four functions mentioned above: (4) monitoring amounts of consumed toner; (5) predicting time for replenishment of toner; (6) sending a replenishment request RQS to the manager device 120; and (7) correcting the replenishment time based on the number of devices.

—Monitor Unit—

The monitor unit 611 monitors amounts of toner consumed by the MPF 111. For example, for each job, the monitor unit 611 reads color values of pixels from image data to be processed, and, from the color values, estimates amounts of toners that the image forming unit 20 consumes to generate toner images based on the image data. More specifically, the monitor unit 611 first counts pixels classified according to color value shown in the raster data, i.e., the image data after RIP. The monitor unit 611 then multiplies the number of pixels of each color value by an estimated amount of toner consumption per pixel of the color value, and sums all the products classified according to color. Here, estimated relationships of correspondence between color values and toner consumption, i.e., the relationships between the number of dots for one pixel and the estimated amounts of toner amount consumed in making the dots, is stored in advance in the ROM 63 in the form of a table or functions. The monitor unit 611 further aggregates values estimated for jobs at intervals of, for example, one working day, stores the aggregated estimated values in the ROM 63, and monitors cumulative toner consumption from the last time the toner was replenished. When this cumulative value reaches the corresponding threshold value, the monitor unit 611 notifies the request unit 613.

The estimated values of toner consumption aggregated by the monitor unit 611 are used in toner supply to the developer unit 214 as follows. The controller unit 60 monitors the ratio of toner to carrier in the developer DVL via values measured by the TCR sensor 245, and, in parallel, aggregates estimated values of toner consumption accumulated since toner was last supplied to the developer unit 214. When the ratio of toner to carrier decreases to an acceptable lower limit due to toner consumption, or when the cumulative amount of toner consumption reaches an upper limit, the controller unit 60 supplies toner to the developer unit 214. In particular, the controller unit 60 determines a toner supply amount based on the cumulative amount of toner consumption, calculates drive amount for the motor of the toner inlet 244 based on the toner supply amount, and transmits a drive signal to a drive circuit of the motor. According to drive of the motor in response to the drive signal, the toner supply amount is supplied from the toner inlet 244 to the agitator tank TK1.

—Prediction Unit—

The prediction unit 612 predicts a toner replenishment time, based on the consumption rate of toner of the MFP 111. More specifically, the prediction unit 612 periodically, for example, each week, estimates toner consumption rate, i.e., toner consumption per working day, from a history of toner consumption that is periodically aggregated at intervals of, for example, every working day. As an estimated value, the prediction unit 612 selects an average of the amounts aggregated since the last estimation. The prediction unit 612 then calculates a lower limit of remaining toner from the estimated value, by multiplying toner consumption rate by toner delivery time, and sets the threshold value for toner consumption as a value obtained by subtracting the lower limit of remaining toner from the maximum toner capacity. The estimated value of toner consumption rate is periodically updated, and therefore the threshold value, i.e., the predicted replenishment time, is also updated at the same frequency, for example, every week.

In addition to the above-described function the prediction unit 612 corrects the threshold value based on the number of devices indicated by the data NTC whenever the prediction unit 612 receives the data NTC from the manager device 120 at intervals of, for example, one working day. More specifically, the prediction unit 612 first reads the number of devices from the data NTC, then calculates the ratio of the number of devices to another number of devices read from the previously-received data NTC. When the ratio is equal to one, the prediction unit 612 maintains the original predicted value without correcting it. When the ratio is not equal to one, the prediction unit 612 divides the toner lower limit RMA by the ratio, and updates the toner lower limit RMA with the quotient. Thus, when the ratio is greater than one, the toner lower limit RMA decreases while the threshold amount increases; this pushes back the replenishment time. On the other hand, when the ratio is less than one, the toner lower limit RMA increases while the threshold amount decreases; this brings forward the replenishment time.

—Request Unit—

The request unit 613 sends a replenishment request RQS to the manager device 120 at the replenishment time predicted by the prediction unit 612. More specifically, the request unit 613 considers the time of notification that toner consumption reaches the threshold value from the monitor unit 611 to be the replenishment time, generates a replenishment request RQS in response to the notification, and instructs the LAN I/F 54 to transmit the replenishment request RQS to the manager device 120.

Subsequently, until the MFP 111 is actually replenished with toner, the request unit 613 makes the prediction unit 612 skip the correction of the predicted replenishment time even when receiving data NTC indicating the number of devices from the manager device 120. For example, the request unit 613 creates sets a flag to one when the replenishment request RQS is transmitted, and returns the flag to zero when the MFP 111 is replenished with toner. The prediction unit 612 checks the flag when receiving the data NTC from the manager device 120. If the flag is set to one, the prediction unit 612 skips correction of the predicted value; if the flag is set to zero, the prediction unit 612 corrects the predicted value.

[Prediction of Replenishment Time for Toner]

FIG. 8 is a schematic diagram for illustrating a process in which the controller unit 60 predicts the time for replenishment of toner based on the history of amounts of toner consumed. FIG. 8 shows toner amounts that the monitor unit 611 aggregates on each working day as percentages of the maximum toner capacity of the MFP 111; the amounts include a daily toner consumption and a total of toner consumption from the last time toner was replenished. For example, when the maximum toner capacity is equal to one 500 g toner bottle, consumption of 0.5% is equivalent to 2.5 g, i.e., 500 g multiplied by 0.5%. FIG. 8 further shows a threshold value for toner consumption, set by the prediction unit 612 each week, i.e., every five working days, based on these values.

On the fifth working day the prediction unit 612 first calculates an average value of toner consumption from the first to the fifth working day, which is 0.44% per day in FIG. 8, and uses this as a toner consumption rate for the week. The prediction unit 612 subsequently multiplies the consumption rate of 0.44% per day by a toner delivery time of six days, and sets the product as the toner lower limit RMA, i.e., RMA=0.44%/day×6 days 3%. Here, the delivery time of six days is a value obtained by adding a surplus of two days to the time required from ordering a toner bottle until delivery, which is four days. The prediction unit 612 further sets a value of 97% as the threshold value, obtained by subtracting the toner lower limit RMA of 3% from the maximum toner capacity of 100%. The monitor unit 611 repeatedly compares this threshold value of 97% to the toner consumption from the fifth working day until the tenth working day, when the predicted value for replenishment time is updated. As shown in FIG. 8, the total value of toner consumption is less than the threshold value of 97% from the fifth working day to the ninth working day.

On the tenth working day the prediction unit 612 again predicts the replenishment time, i.e., revises the threshold value. More specifically, the prediction unit 612 first calculates an average value of amount of toner consumption from the sixth to the tenth working day, which is 0.60% per day in FIG. 8, and uses this value as a toner consumption rate for the week. The prediction unit 612 subsequently multiplies the consumption rate of 0.60%/day by the toner delivery time of six days, and sets the product as the toner lower limit RMA, i.e., RMA=0.60%/day×6 days 4%. The prediction unit 612 then replaces the threshold value with a value of 96%, which is lower than the toner maximum capacity of 100% by the toner lower limit RMA of 4%. Because the total amount of toner consumption on the tenth working day, which is 97.3%, exceeds the new threshold value of 96%, the monitor unit 611 notifies the request unit 613. In response to the notification, the request unit 613 sends a replenishment request RQS to the manager device 120.

[Correction of Predicted Replenishment Time]

Figure 9:
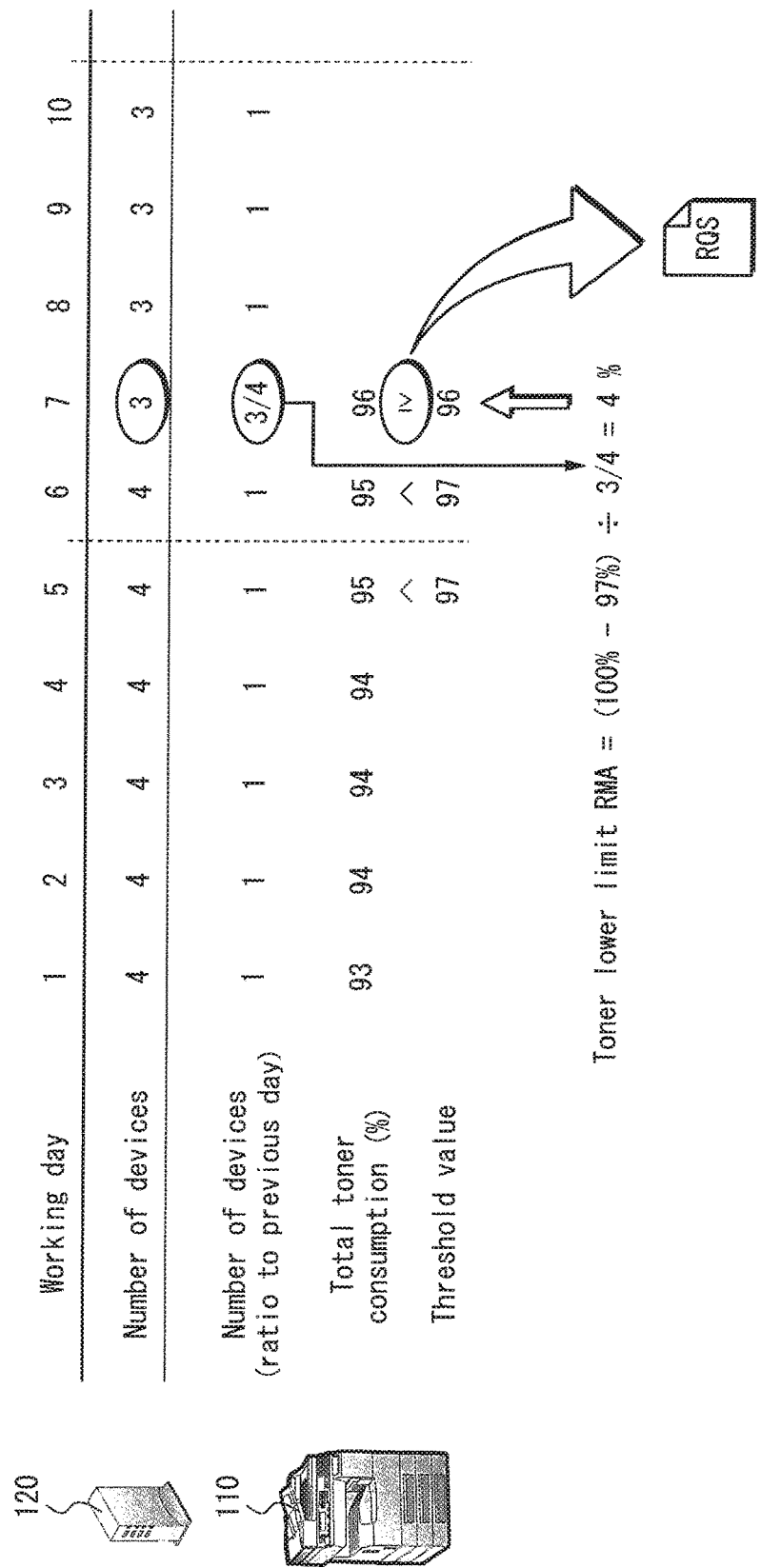
FIG. 9 is a schematic diagram for illustrating the process in which the image forming device shown in FIG. 7 corrects predicted replenishment time based on the number of other image forming devices.

FIG. 9 is a schematic diagram illustrating a process in which the prediction unit 612 corrects the predicted replenishment time based on the number of devices connected to the network NTW. FIG. 9 shows, for each working day, the number of devices indicated by the data NTC received from the manager device 120, the ratio of the number to another number read from the previous data NTC, and the total amount of toner consumed since toner was last replenished. FIG. 9 also shows threshold values that the prediction unit 612 assigns for toner consumption.

From the first to the sixth working day, the number of devices indicated in the data NTC received from the manager device 120 remains constant at four, and therefore the prediction unit 612 maintains the ratio of the numbers of devices at a value of one. Accordingly, as in FIG. 8, the prediction unit 612 sets the toner lower limit RMA to 3% and the threshold value to 97%. On the fifth and the sixth working day, the monitor unit 611 confirms that the total amount of toner consumption is less than the threshold value of 97%.

On the seventh working day, the data NTC from the manager device 120 indicates that the number of devices is three, and therefore the ratio of the numbers of devices becomes 3/4, which is less than one. The prediction unit 612 then corrects the threshold value. In other words, the prediction unit 612 divides the toner lower limit RMA by the ratio of 3/4 and replaces the toner lower limit RMA with the quotient, i.e., RMA=(100%−97%)/(3/4)=4%. The prediction unit 612 then replaces the threshold value with a value of 96%, which is lower than the toner maximum capacity of 100% by the toner lower limit RMA of 4%.

Because the total amount of toner consumption at 96% has already reached the updated threshold value of 96%, the monitor unit 611 notifies the request unit 613. In response to the notification, the request unit 613 sends a replenishment request RQS to the manager device 120.

[Estimation of Toner Consumption]

Figure 10:
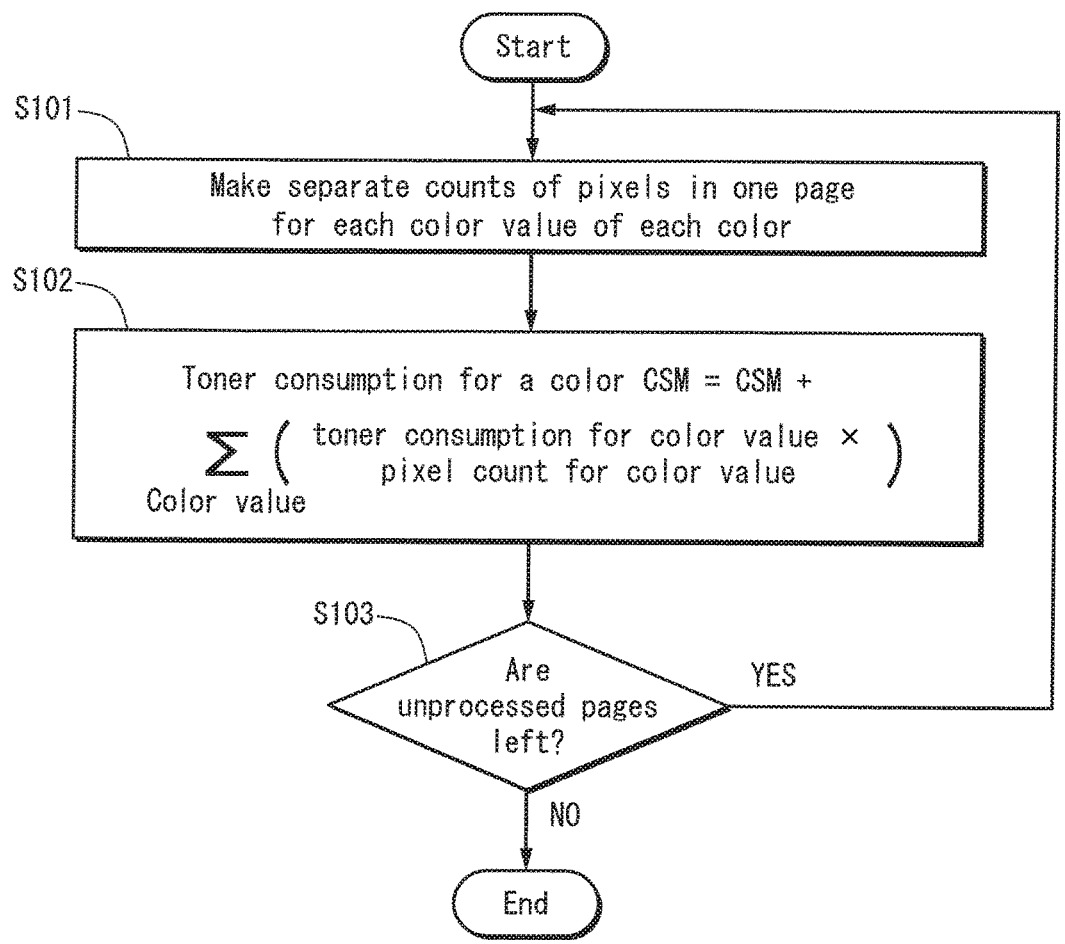
FIG. 10 is a flowchart of a process in which the image forming device shown in FIG. 7 estimates an amount of toner consumption from image data.

FIG. 10 is a flow chart of a process in which the monitor unit 611 estimates an amount of toner consumption from image data. The process starts when the controller unit 60 receives a job request from the operation unit 50.

In step S101, in parallel with RIP of the image data by the controller unit 60, the monitor unit 611 selects one page from the raster data, i.e., the image data after RIP. The monitor unit 611 then extracts sets of pixel data from the page. For each set of pixel data, the monitor unit 611 reads color values for four colors from the pixel data and, for each color value, the monitor unit 611 increments a count for a pixel that indicates the color value. Thus, pixels included in the page are counted for each color value for each color. Subsequently, processing proceeds to step S102.

In step S102, the monitor unit 611 multiplies an estimated amount of toner consumption for each color value, i.e., dot count, by the number of pixels of the color value, sums each product of this calculation for each color, and, for each color, adds the sum to an estimated amount of toner consumption CSM. Subsequently, processing proceeds to step S103.

In step S103, the monitor unit 611 checks whether unprocessed pages remain in the image data after RIP. If an unprocessed page remains, processing returns to step S101, and if not, processing ends.

[Process of Determining Need for Toner Replenishment]

Figure 11:
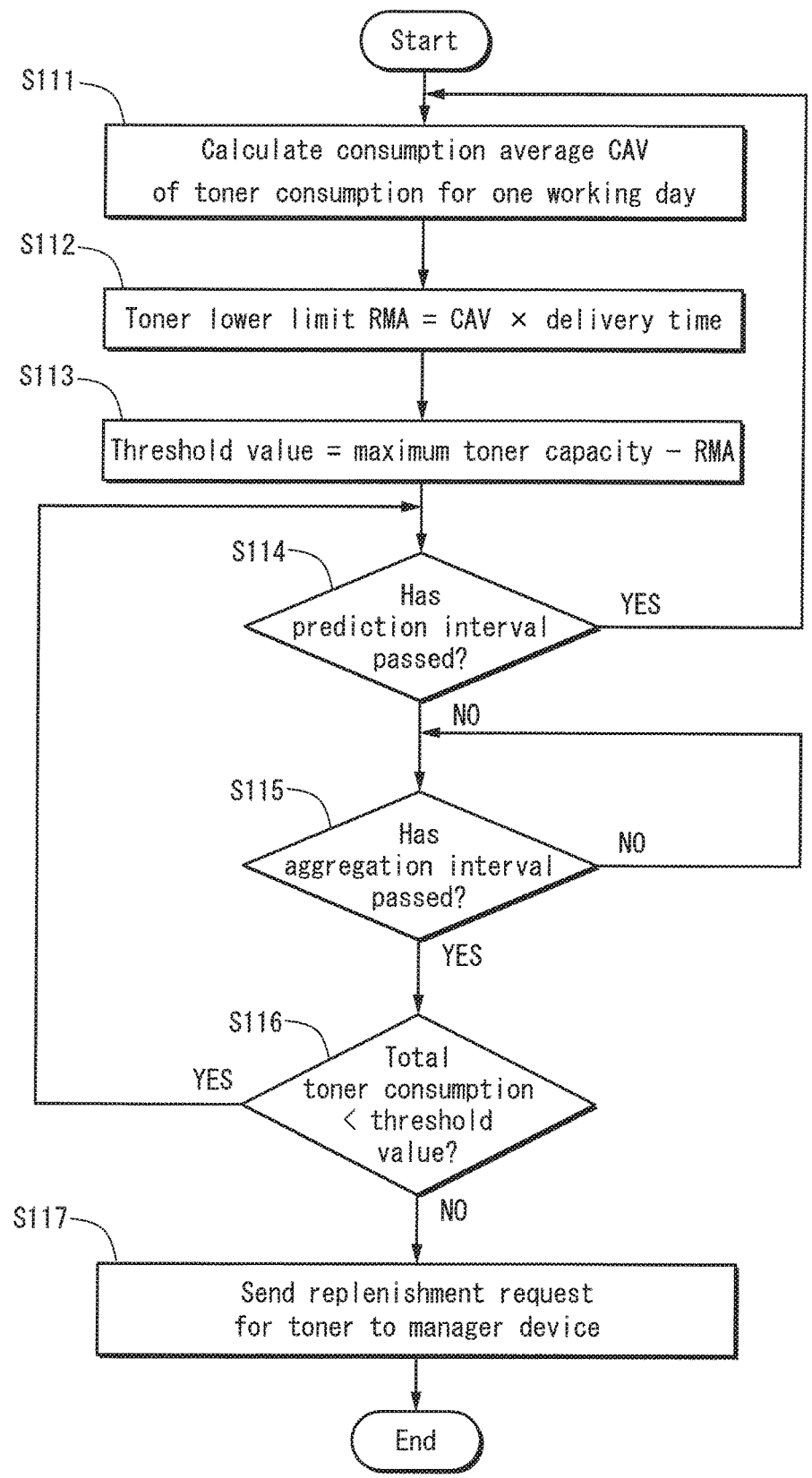
FIG. 11 is a flowchart of a process in which the image forming device shown in FIG. 7 determines need of replenishment of toner based on the history of amounts of toner consumption.

FIG. 11 is a flow chart of a process in which the controller unit 60 determines need of replenishment of toner based on the history of amounts of toner consumption. This process starts when a predefined period passes from the last time toner was replenished, for example one week or five working days.

In step S111, the prediction unit 612 calculates a consumption average CAV of aggregate values read from a history of toner consumption that is periodically aggregated, for example every working day since toner was last replenished, and sets the consumption average CAV as an estimated value for a toner consumption rate, i.e., toner consumption per working day. Subsequently, processing proceeds to step S112.

In step S112, the prediction unit 612 sets the product of the consumption average CAV multiplied by toner delivery time as the toner lower limit RMA, i.e., RMA=CAV× delivery time. Subsequently, processing proceeds to step S113.

In step S113, the prediction unit 612 sets a difference between the toner lower limit RMA and the maximum toner capacity as the threshold value for consumption, i.e., threshold value=maximum toner capacity−RMA. Subsequently, processing proceeds to step S114.

In step S114, after the prediction unit 612 has finished step S113, the monitor unit 611 checks whether a prediction interval has passed, for example, whether one week or five working days has passed. If the prediction interval has passed, processing returns to step S111, and if not, processing proceeds to step S115.

In step S115, the monitor unit 611 checks whether an aggregation interval has passed since the aggregate value of toner consumption was last calculated, for example, the monitor unit 611 checks whether one working day has passed. If the aggregation interval has not passed, processing repeats step S115, and if the aggregation interval has passed, processing proceeds to step S116.

In step S116, the monitor unit 611 checks whether total toner consumption since the last toner replenishment is less than the threshold value. If the total toner consumption is less than the threshold value, processing returns to step S114, and if equal to or greater than the threshold value, processing proceeds to step S117.

In step S117, the total amount of toner consumption is equal to or greater than the threshold value, and therefore the monitor unit 611 notifies the request unit 613. In response to the notification, the request unit 613 sends a replenishment request RQS to the manager device 120. Subsequently, processing ends.

[Process of Correction of Predicted Replenishment Time]

Figure 12:
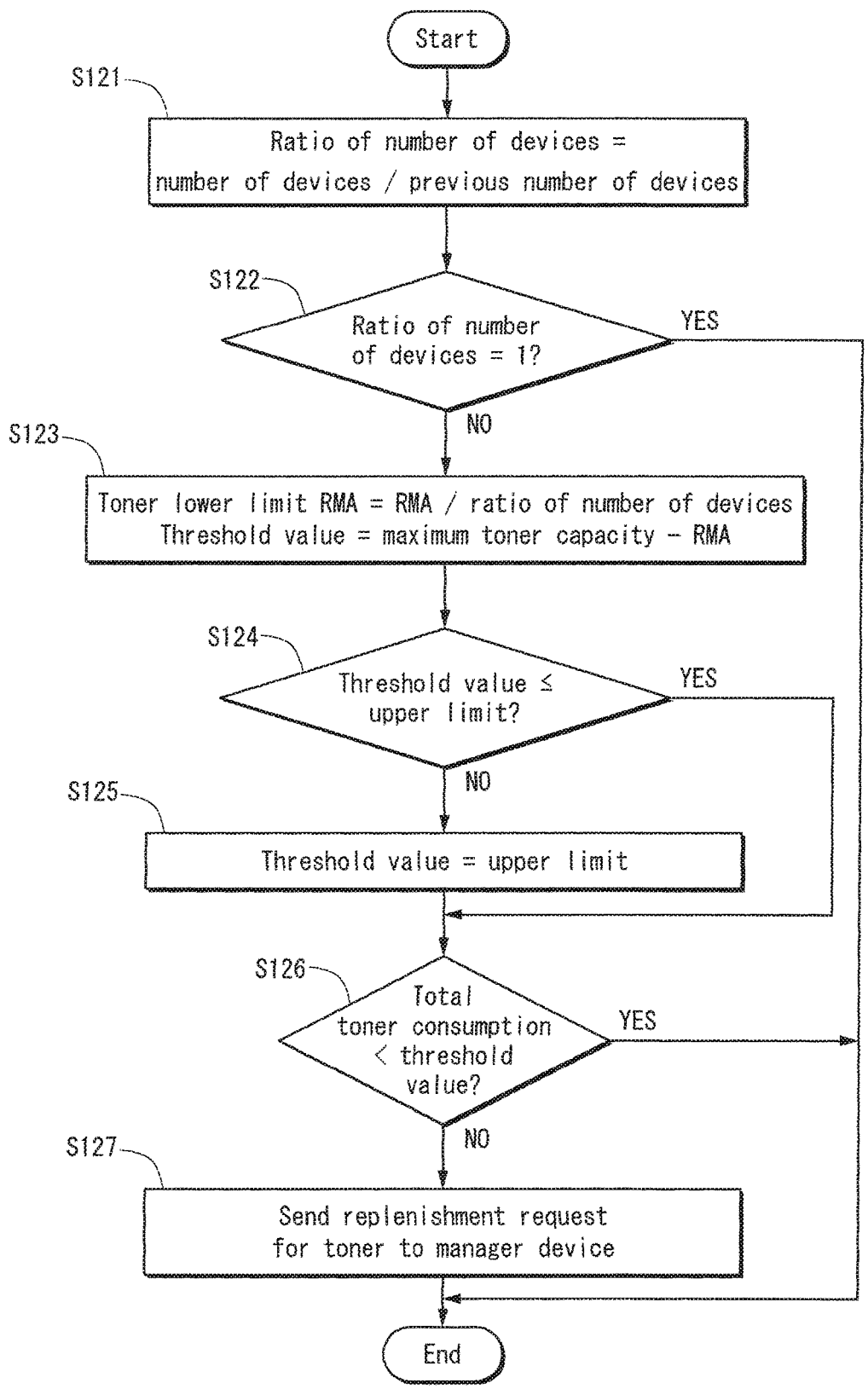
FIG. 12 is a flowchart of a process in which the image forming device shown in FIG. 7 corrects a threshold value for amount of toner consumption based on the number of image forming devices received from the manager device.

FIG. 12 is a flowchart of a process in which the controller unit 60 corrects a threshold value for amount of toner consumption based on the number of image forming devices received from the manager device 120. This process starts when the controller unit 60 receives data NTC indicating the number of devices from the manager device 120.

In step S121, the prediction unit 612 reads the number of devices from the data NTC, then calculates the ratio of the number of devices to another number of devices read from the previously-received data NTC. Subsequently, processing proceeds to step S122.

In step S122, the prediction unit 612 checks whether the ratio of the numbers of devices is equal to one. If the ratio is equal to one, processing ends, and if not, processing proceeds to step S123.

In step S123, the ratio of the numbers of devices is not one and therefore the number of devices has changed. The prediction unit 612 divides the toner lower limit RMA by the ratio and replaces the toner lower limit RMA with the quotient. The prediction unit 612 further updates the threshold value of toner consumption with the difference between the new toner lower limit RMA and the maximum toner capacity, i.e., threshold value=maximum toner capacity−RMA. Subsequently, processing proceeds to step S124.

In step S124, the prediction unit 612 checks whether the new threshold value is equal to or less than an upper limit, for example 98%. The upper limit is so determined that, after toner consumption reaches the upper limit, a typical device can operate without exhausting toner for a predefined time, for example, four days. If the threshold value is less than or equal to the upper limit, processing proceeds to step S126, and if greater than the upper limit, processing proceeds to step S125.

In step S125, the threshold value is greater than the upper limit, and therefore the prediction unit 612 limits the threshold value to the upper limit, for example to 98%. Subsequently, processing proceeds to step S126.

In step S126, the monitor unit 611 checks whether the total toner consumption since the last toner replenishment is less than the threshold value. If the total toner consumption is less than the threshold value, processing ends, and if greater than or equal to the threshold value, processing proceeds to step S127.

In step S127, the total amount of toner consumption is equal to or greater than the threshold value, and therefore the monitor unit 611 notifies the request unit 613. In response to the notification, the request unit 613 sends a replenishment request RQS to the manager device 120. Subsequently, processing ends.

Advantages of Embodiment 1

As described above, in the consumables management system 100 according to Embodiment 1 of the invention, first the monitor unit 611 of each device of the device group 110 monitors the amount of toner consumed by the device. Subsequently, based on the history of toner consumption, the prediction unit 612 of the device predicts a value that the total toner consumption will reach at the toner replenishment time, and sets the predicted value as the threshold value for the total toner consumption. In the system, the manager device 120 further notifies devices belonging to the device group 110 of the data NTC indicating the number of the devices at intervals, and, in response to each notification, the devices compare the number with another number indicated in the previous data NTC. When the ratio is not equal to one, the prediction unit 612 divides the toner lower limit RMA by the ratio, and updates the toner lower limit RMA with the quotient. When the ratio is greater than one, the toner lower limit RMA decreases while the threshold amount increases; this pushes back the replenishment time. On the other hand, when the ratio is less than one, the toner lower limit RMA increases while the threshold amount decreases; this brings forward the replenishment time. Thus, the system makes the devices correct their predicted replenishment time in response to changes in the number of devices.

Thus, the consumables management system 100 enables each device of the device group 110 to more accurately predict the replenishment time even when the number of devices in the device group 110 fluctuates. In particular, even if removal of one device causes an abrupt increase in the amount of jobs that the surrounding devices should process, the consumables management system 100 enables each device to bring forward the replenishment time to keep pace with the abrupt increase.

Modifications of Embodiment 1

(A) The consumables management system 100 according to Embodiment 1 supports timely replenishment of toner for each image forming device of the device group 110. As a target of consumables management aside from toner, the consumables management system 100 may manage consumables such as sheets, ink such as pigment used in an inkjet printer, the photoreceptor drum, intermediate transfer belt, or transfer roller of the image forming unit 20, and the laser of the exposure unit 25. For such a case, the consumables management system 100 may, for example, estimate consumption from number of printed sheets, usage of ink, usage time of elements such as the photoreceptor drum, etc., and set a predicted time for replenishment or replacement as a threshold value thereof.

(B) In each device of the device group 110, the monitor unit 611 estimates toner consumption based on image data, and the controller unit 60 determines toner supply to the developer unit 214 based on the estimate. Alternatively, the controller unit 60 may determine toner supply based on variables such as a time at which the ratio of toner to carrier in the developer DVL drops to an acceptable lower limit or volume of developer DVL in the developer unit 214 as measured by a light sensor, and the monitor unit 611 may estimate toner consumption according to a cumulative amount of toner supplied. The monitor unit 611 may estimate toner consumption from variables such as number of sheets processed and device operation time, or may use such variables as an indicator of toner consumption.

(C) The manager device 120 periodically notifies each device of the number of devices in the device group 110. The manager device 120 may directly notify the devices in the device group 110 whenever there is a change in the number of devices when registration data 351 is overwritten in response to a registration request RST from the PC group 140.

(D) The manager device 120, as shown in FIG. 1, is a separate device from the device group 110 and the PC group 140. The manager device 120 may alternatively be incorporated into any terminal of the device group 110 or PC group 140.

(E) According to Embodiment 1, the notification unit 312 of the manager device 120 refers to identification data items of devices in the registration data 351 relating to the device group 110 in order to determine the number of devices. The notification unit 312 may incorporate device identification data into the data NTC to be sent to the device group 110, and the prediction unit 612 of each device of the device group 110 may refer to the identification data and set the number of devices by, for example, the number of IP addresses in the identification data.

(F) The notification unit 312 refers to identification data items of devices in the registration data 351 relating to the device group 110, and determines the number of devices by counting the IP address included in the registration data 351. Accordingly, the number of devices indicated in the data NTC the notification unit 312 sends to the device group 110 is equal to the total number of devices stored in the storage unit 350.

The notification unit 312 may divide the number of devices according to other items indicated in the registration data shown in FIG. 4, for example according to types of jobs or sheets that can be processed. The notification unit 312 may divide the device group 110 according to devices that can perform color processing and devices that can only perform monochrome processing, or according to whether the devices are printers, copiers, scanners, etc. Furthermore, the notification unit 312 may divide the device group 110 according to devices that can process different sheet sizes such as A3, A4, B4, etc., or according to devices that can process different paper types such as plain, coated, high-quality, etc.

Thus, the notification unit 312 may notify the device group 110 with data NTC indicating the number of devices classified according to a type of job received or the number of devices classified according to sheet attributes. Each device in the device group 110 may correct its predicted replenishment time based on the number of devices that are classified as being able to process the same job type or sheet type as the device according to the data NTC. For example, a color printer may correct its threshold value for Y, M, C colors of toner based on number of devices that can process color such as color printers, color copiers, etc., and may correct its threshold value for K color toner based on the number of devices regardless of whether they are color or monochrome devices.

(G) As shown in FIG. 12, in the process of correcting the threshold value of toner consumption, as long as the ratio of the numbers of devices is not one in step S122, the toner lower limit RMA is replaced by the quotient of the ratio and the toner lower limit RMA.

Alternatively, when the ratio of the numbers of devices is not one in step S122, the prediction unit 612 may further determine a difference between the threshold value and the current total of toner consumption, and when the difference is equal to or greater than a predefined margin, for example 10%, the prediction unit 612 may skip correction of the threshold value. Thus, when threshold value–total toner consumption≥10% margin, correction of the threshold value is skipped. Thus, correction is made more efficient by only occurring when total toner consumption is approaching the threshold value.

Embodiment 2

The consumables management system according to Embodiment 2 of the invention is similar to the consumables management system 100 according to Embodiment 1 in that it supports timely resupply of toner for image forming devices included in the device group 110. However, the consumables management system according to Embodiment 2 differs from the consumables management system 100 according to Embodiment 1 in that the monitor unit 311 of the manager device 120 monitors operational statuses of the device group 110.

The following describes this difference between the systems according to Embodiment 2 and Embodiment 1. The description for Embodiment 1 is applicable to all parts that are common to both systems.

In the manager device 120 according to Embodiment 1, the notification unit 312 sets the number of devices by counting the number of IP addresses included in identification data of the registration data 351 related to the device group 110, which is stored in the storage unit 350. Accordingly, the number of devices indicated in the data NTC sent to the device group 110 is equal to the total number of registered devices.

In contrast, in the manager device 120 according to Embodiment 2, the monitor unit 311 performs monitoring such as polling to determine the IP addresses included in the identification data, and counts the number of operable devices of the device group 110 based on the monitoring results. Accordingly, the number of devices indicated in the data NTC sent to the device group 110 is equal to the number of operable devices of the registered devices. Here, whether a device is "operable" may be determined according to the following three conditions, for example: (A) the device is powered on; (B) at least one sheet processable by the device is held in a paper feed cassette thereof; and (C) the device is not indicating an error status such as a paper jam.

The monitor unit 311 controls the network I/F 370 to periodically perform polling of the device group 110. More specifically, the network I/F 370 transmits a polling signal to each of the IP addresses indicated in the registration data 351 relating to the device group 110 in turn, to make each targeted device reply with a report related to operational status of the device. Based on the operational statuses indicated in this data, the monitor unit 311 counts the number of devices that have an operational state matching the definition of "operable" described above.

A polling interval is preferably set to about one hour, and the interval at which data NTC indicating the number of devices is sent to the device group 110 is, for example, set to one working day or less. Thus, when the notification unit 312 sends the data NTC to the device group 110, the notification unit 312 selects the maximum value, for example, from the number of operable devices according to polling since the data NTC was last sent, and incorporates the value into the data NTC.

Figure 13:
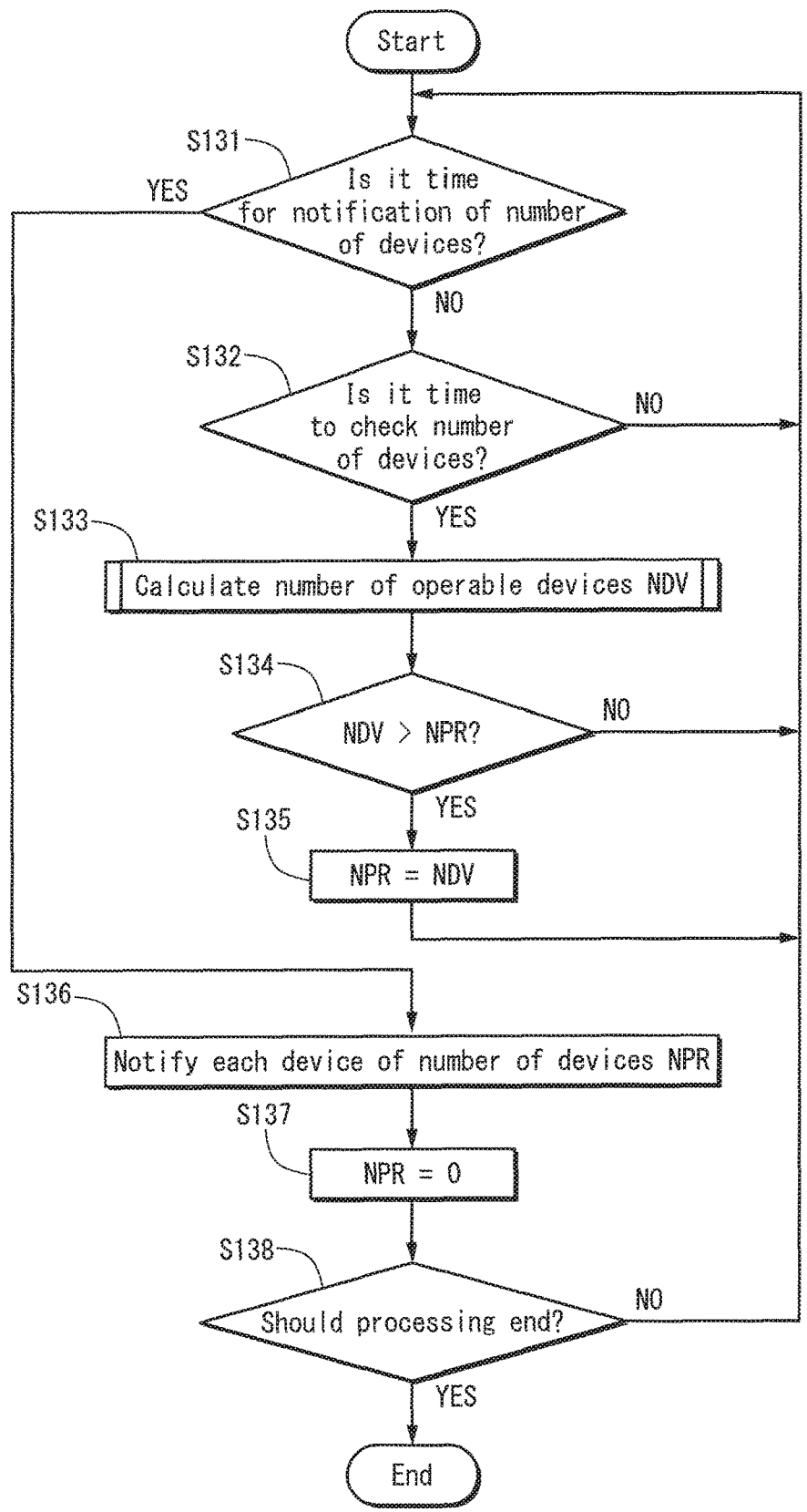
FIG. 13 is a flowchart of a process in which an image forming device according to Embodiment 2 of the invention counts the number of operable image forming devices and sends the number to other image forming devices.

FIG. 13 is a flowchart of a process in which the manager device 120 notifies the device group 110 of the number of operable devices. The process starts when the manager device 120 is powered on.

In step S131, the notification unit 312 checks whether it is time to send the data NTC to the device group 110, for example, by checking whether one day has passed since the data NTC was last sent to the device group 110. If the time has been reached, processing proceeds to step S136, and if not, processing proceeds to step S132.

In step S132, it is not yet time to send the data NTC, and therefore the monitor unit 311 checks whether it is time to count the number of operable devices, for example by checking whether one hour has passed since the number of devices was last counted. If the time has been reached, processing proceeds to step S133, and if not, processing returns to step S131.

In step S133 it is time to count the number of operable devices, and therefore the monitor unit 311 performs monitoring of the device group 110 to find the number of operable devices NDV based on the result of monitoring. Details of step S133 are provided later. Subsequently, processing proceeds to step S134.

In step S134, the monitor unit 311 checks whether the number of devices NDV found in step S133 is greater than the number of devices NPR stored by the manager device 120. If the former NDV is greater than the latter NPR, processing proceeds to step S135. If not, processing returns to step S131.

In step S135, the number of devices NDV found in step S133 is greater than the number of devices NPR stored by the manager device 120, and therefore the monitor unit 311 updates the latter NPR with the former NDV. Subsequently, processing returns to step S131.

In step S136, it is time to send the data NTC, and therefore the notification unit 312 sends the data NTC, incorporating the number of devices NPR stored by the monitor unit 311, to the device group 110. By repeating steps S134 and S135 since the data NTC was last sent, the number of devices NPR stored by the monitor unit 311 at the time of sending the data NTC is made equal to the maximum value of the number of operable devices found in step S133 since the data NTC was last sent. Subsequently, processing proceeds to step S137.

In step S137, the monitor unit 311 initializes the number of devices NPR to zero. Subsequently, processing proceeds to step S138.

In step S138, the monitor unit 311 checks whether to end the monitoring of the device group 110. If the monitoring is to be ended, processing ends, and if not, processing returns to step S131.

Figure 14:
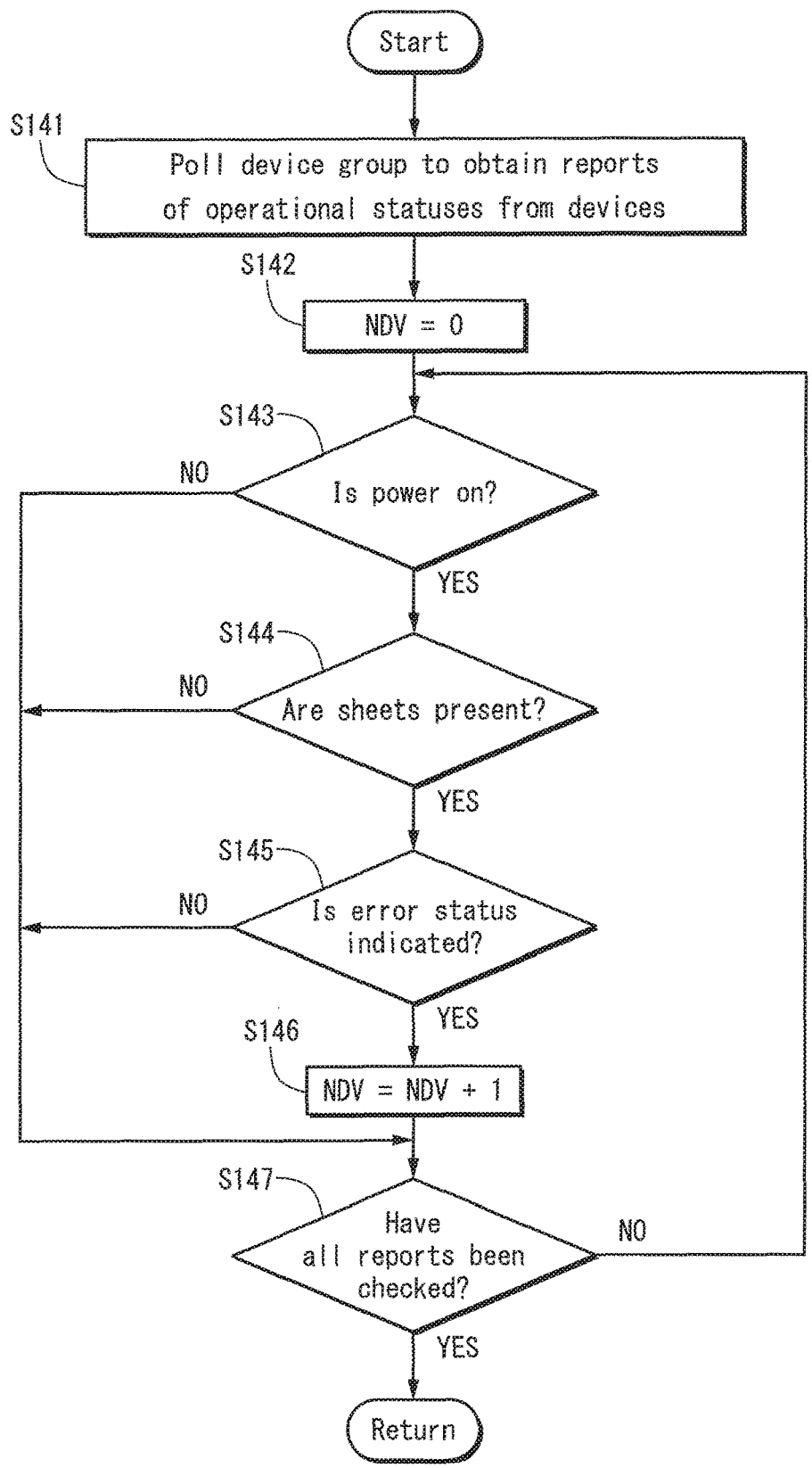
FIG. 14 is a flow chart of the subroutine of step S133 shown in FIG. 13.

FIG. 14 is a flow chart of the subroutine of step S133 shown in FIG. 13, i.e., the subroutine to find the number of operable devices NDV based on the results of monitoring the device group 110.

In step S141, the monitor unit 311 reads IP addresses of devices from the registration data 351 related to the device group 110 from the storage unit 350, and controls the network I/F 370 to transmit a polling signal to each of the IP addresses in turn. The monitor unit 311 accepts reports, via the network I/F 370, from the device group 110 in response to the polling signals. Subsequently, processing proceeds to step S142.

In step S142, the monitor unit 311 initializes the number of operable devices NDV to zero. Subsequently, processing proceeds to step S143.

In step S143, the monitor unit 311 selects and analyzes one report from the responses to the polling signals, and checks whether the operational status of the device that sent the report satisfies condition (A) to be considered "operable", i.e., whether the device is powered on. If the device is powered on, processing proceeds to step S144, and if powered off, processing proceeds to step S147.

In step S144, the monitor unit 311 checks whether the operational status of the device that sent the report satisfies condition (B) to be considered "operable", i.e., whether the device holds at least one processable sheet in a paper feed cassette. If the device holds such a sheet, processing proceeds to step S145, and if not, processing proceeds to step S147.

In step S145, the monitor unit 311 checks whether the operational status of the device that sent the report satisfies condition (C) to be considered "operable", i.e., whether the device is indicating an error state such as a paper jam. If the device is not indicating any error, processing proceeds to step S146, and if indicating, processing proceeds to step S147.

In step S146, the device that sent the report has satisfied the conditions (A), (B), and (C) indicating that its operational status is "operable", and therefore the monitor unit 311 increments the number of operable devices NDV by one. Subsequently, processing proceeds to step S147.

In step S147, the monitor unit 311 checks whether the reports in response to the polling signals include one that the unit has not yet processed, i.e., whether the unit has checked the operational statuses of all the devices. If the reports include no unprocessed report, processing ends, and if otherwise, processing returns to step S143.

Advantages of Embodiment 2

In the consumables management system according to Embodiment 2 of the invention, as in the consumables management system 100 according to Embodiment 1, each device of the device group 110 monitors the amount of toner that the device consumes, and, based on the history of toner consumption, sets the toner lower limit RMA, and predicts the time when the total toner consumption reaches the threshold value, which is lower than the maximum toner capacity by the toner lower limit RMA. In the consumables management system, the manager device 120 periodically notifies devices in the device group 110 of the data NTC indicating the number of the devices, and, in response to each notification, the devices calculate the ratio of the number to another number indicated in the previous data NTC. The devices for which the ratio is not one update the toner lower limit RMA with the quotient of the ratio and the toner lower limit RMA. Thus, the consumables management system makes the devices correct their predicted replenishment time in response to changes in number of the devices. Therefore, the consumables management system enables the devices to more accurately predict replenishment time regardless of fluctuations in number of the devices.

In contrast to Embodiment 1, the manager device 120 according to Embodiment 2 counts only operable devices of the device group 110. Thus, not only the removal of a device from the network NTW, but also inoperability of a device despite a valid connection with the network NTW is reflected in correction of a predicted replenishment time, and therefore accuracy of prediction is further improved.

Modifications of Embodiment 2

(A) The monitor unit 311 of the manager device 120 monitors the device group 110 by polling. The manager device 120 may monitor the device group 110 by receiving periodic notifications of operational status from each device of the device group 120.

(B) The monitor unit 311 judges that conditions (B) and (C) for determining that the operational status of a device is "operable" are not satisfied when the device is out of paper (B) or the device is indicating an error status (C), regardless of the length of time needed by the device to recover from either state. Alternatively, the monitor unit 311 may judge whether conditions (B) and (C) are satisfied according to predicted recovery times. For example, a paper shortage can be resolved in a relatively short time, and therefore condition (B) may be removed from the conditions to determine whether a device is "operable". Furthermore, the monitor unit 311 may judge that an error status that can be resolved in a relatively short time, such as a single paper jam or paper shortage, satisfies condition (C), and that an error status that takes a relatively long time to resolve because dispatch of trained personnel is required, such as frequent paper jams or a need for component replacement, does not satisfy condition (C). When making this judgment, the manager device 120 may prompt a user to set a predicted recovery time as a standard for evaluating condition (C).

Embodiment 3

The consumables management system according to Embodiment 3 of the invention is similar to the consumables management system 100 according to Embodiment 1 in that it supports timely resupply of toner for image forming devices included in a device group. However, the system according to Embodiment 3 is different from the consumables management system 100 according to Embodiment 1 in that frequency in use is included in items monitored for operational statuses of the device group, and, in addition to the number of devices, frequency in use is used in correction of predicted replenishment time.

The following describes this difference between the systems according to Embodiment 3 and Embodiment 1. The description for Embodiment 1 is applicable to all parts that are common to both systems.

[Configuration of Consumables Management System]

In addition to functions similar to those of the manager device 120 according to Embodiment 1, i.e., (1) accepting a replenishment request and (2) accepting a registration request for addition/removal of a device, the manager device according to Embodiment 3 has the following functions: (2A) monitoring operational statuses of the device group, in particular the number of sheets processed; and (3A) periodically notifying devices of the number and frequencies in use of operable devices in the device group.

In addition to functions similar to those of each device in the device group according to Embodiment 1, i.e., (4) monitoring toner consumption, (5) predicting a toner replenishment time; and (6) sending a replenishment request to the manager device, each device of the device group according to Embodiment 3 has the function of (7A) in response to a notification from the manager device, correcting the predicted replenishment time based on the number and frequencies in use of operable devices that the notification indicates. In particular, when the operable devices decrease in number, the prediction unit of each operable device after the decrease distributes the frequency in use of a device that was operable only before the decrease "equally" among the operable devices after the decrease. The prediction unit then corrects the threshold value based on a difference in frequency in use of its own device between before and after the distribution.

—Monitoring Operational Statuses of Devices—

Figure 15A:
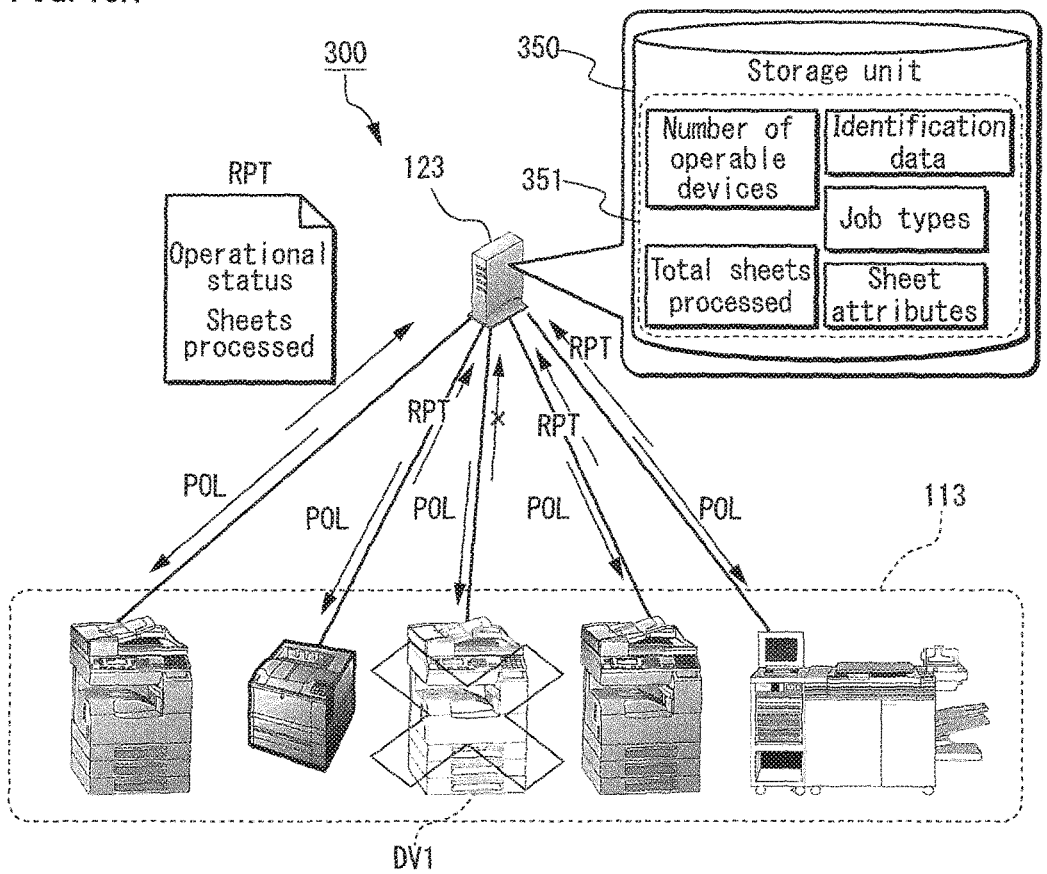
FIG. 15A is a schematic diagram showing data exchanges in a system according to Embodiment 3 of the invention by a manager device when acquiring from image forming devices data about their operational statuses.

FIG. 15A is a schematic diagram showing, in a system 300 according to Embodiment 3, data exchanges by a manager device 123 when acquiring from devices of a device group 113 data about their operational statuses. Referring to FIG. 15A, the monitor unit 311 of the manager device 123 periodically controls the network I/F 370 to poll the device group 113. More specifically, the network I/F 370 transmits a polling signal POL to each of the IP addresses indicated in identification data in turn. The identification data is stored in the storage unit 350 and indicates IP addresses of devices in the registration data 351 related to the device group 113. In response to the polling signal POL, each device of the device group 113 sends a report RPT related to operational status of the device to the network I/F 370. Based on the operational status indicated in the report RPT, the monitor unit 311 counts the number of operable devices and the registration unit 313 stores the number of operable devices in the storage unit 350 as an entry in the registration data 351. The interval of polling is similar to the interval according to Embodiment 2, i.e., preferably set to one hour, and the interval of notifying the device group 113 of the data NTC indicating the number of devices is set to one working day or less, for example.

Conditions for determining whether a device is "operable", for example, are the following three conditions, which are the same as in Embodiment 2: (A) the device is powered on; (B) at least one sheet processable by the device is held in a paper feed cassette thereof; and (C) the device is not indicating an error status such as a paper jam. A device that has an operational status matching these definitions is counted by the monitor unit 311. Accordingly, in addition to any devices that are registered as having been removed from the network NTW, a device that does not satisfy any of the conditions (A), (B), and (C) is also removed from the count of the number of operable devices. Such a device is hereinafter referred to as an "inoperative device".

In contrast to the monitor unit 311 of Embodiment 2, the monitor unit 311 of Embodiment 3 makes each device in the device group 113 send to the manager device at each polling, as an entry in the report RPT related to operational status, the number of sheets processed since the last polling. The monitor unit 311 aggregates the number of sheets for each device polled. The registration unit 313 stores, in the storage unit 350, the aggregated values as entries of the registration data 351.

—Correction of Prediction of Replenishment Time—

When there is a change in the number of operable devices in the device group 113, the system 300 controls each device in the device group 113 to predict the replenishment time as follows:

The notification unit 312 of the manager device 123 periodically, for example each working day, refers to the registration data 351 related to the device group 113 to find out the number of operable devices and the frequencies in use thereof, and notifies the devices in the device group 113 of the data NTC that indicates the number and frequencies in use of operable devices. As the number of operable devices, the notification unit 312 selects, for example, the maximum value of the numbers of operable devices that the unit has obtained by polling since the last notification of the number of operable devices. As the frequency in use of each operable device, the notification unit 312 sets, for example, a cumulative value of the numbers of sheets that the device has processed and the unit has obtained by polling since the last notification.

Figure 15B:
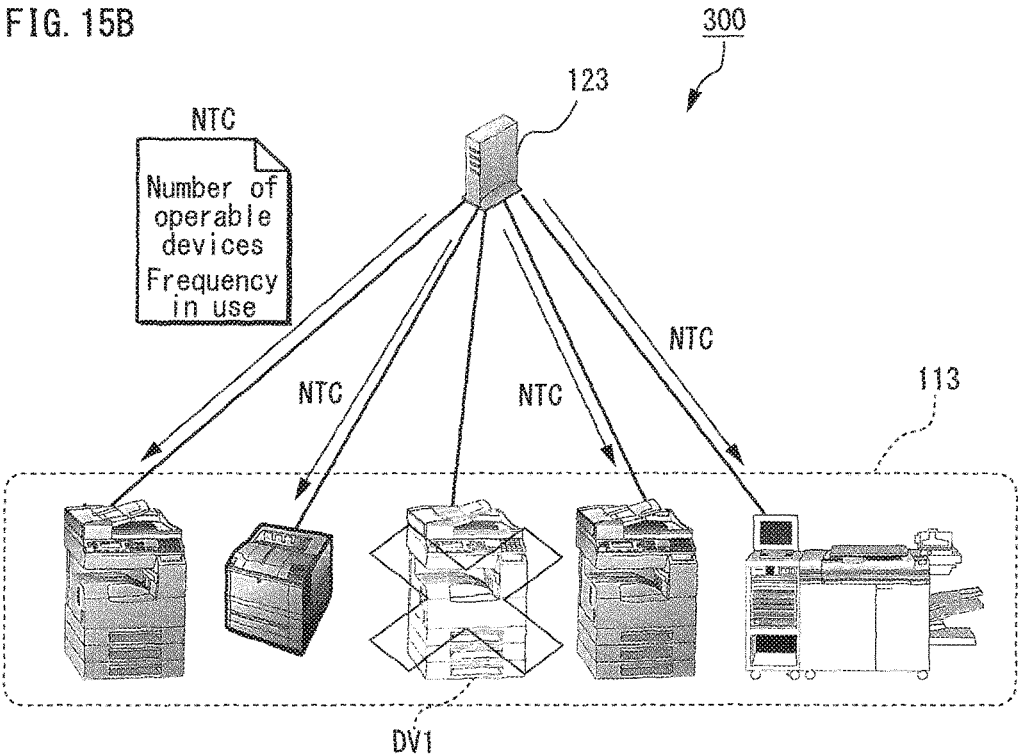
FIG. 15B is a schematic diagram showing data exchanges by the system when detecting an inoperative image forming device.

FIG. 15B is a schematic diagram showing data exchanges by the system 300 when detecting an inoperative device DV1. Referring to FIG. 15B, one device DV1 of the device group 113 is inoperative. In this case, the notification unit 312 sends to the device group 113 the data NTC that includes the number and frequencies in use of operable devices, which are devices in the device group 113 other than the inoperative device DV1.

When receiving the data NTC, each prediction unit 612 of the operable devices in the device group 113 first reads the number of operable devices from the data NTC and calculates the ratio of the number to another number of operable devices read from the previously-received data NTC. When the ratio is equal to one, the prediction unit 612 maintains the original predicted replenishment time, i.e., the threshold value for toner consumption, without correcting it. When the ratio is not equal to one, the number of operable devices has changed, and therefore the prediction unit 612 corrects the threshold value based on the ratio.

More specifically, when the ratio of the numbers of operable devices is greater than one, the prediction unit 612 divides the toner lower limit RMA by the ratio, and replaces the toner lower limit RMA with the quotient unless a value obtained by subtracting the quotient from 100% exceeds an upper limit, such as 98%. The upper limit is so determined that, after toner consumption reaches the upper limit, a typical device can keep itself operable without exhausting toner for a predefined time, for example, four days. When the ratio is greater than one, the toner lower limit RMA decreases while the threshold amount increases; this pushes back the replenishment time.

When the ratio of the numbers of operable devices is less than one, the prediction unit 612 first references the frequencies in use included in the data NTC received from the manager device 123, and searches devices of which frequencies in use are included in the previous data NTC for a device of which frequency in use is not included in the next data NTC, then classifies the device as inoperative. The prediction unit 612 next calculates the average value of frequencies in use of each inoperative device included in all the data NTC received from the manager device 123 since the last prediction of toner replenishment time. The prediction unit 612 further divides the average value equally by the number of operable devices, thereby estimating an allocation amount for one of the operable devices, and adds the allocation amount to the frequency in use of its own device. As the "frequency in use of its own device", the prediction unit 612, similarly to the calculation of the frequency in use of the inoperative device, calculates the average value of frequencies in use of its own device included in all the data NTC received from the manager device 123 since the last prediction of toner replenishment time.

The prediction unit 612 then calculates the ratio of the frequency in use of its own device after addition of the allocation amount to the frequency before the addition, multiplies the ratio by the toner lower limit RMA of the device, and replaces the toner lower limit RMA with the product. When the ratio is greater than one, the toner lower limit RMA increases while the threshold amount decreases; this brings forward the replenishment time.

Figure 16:
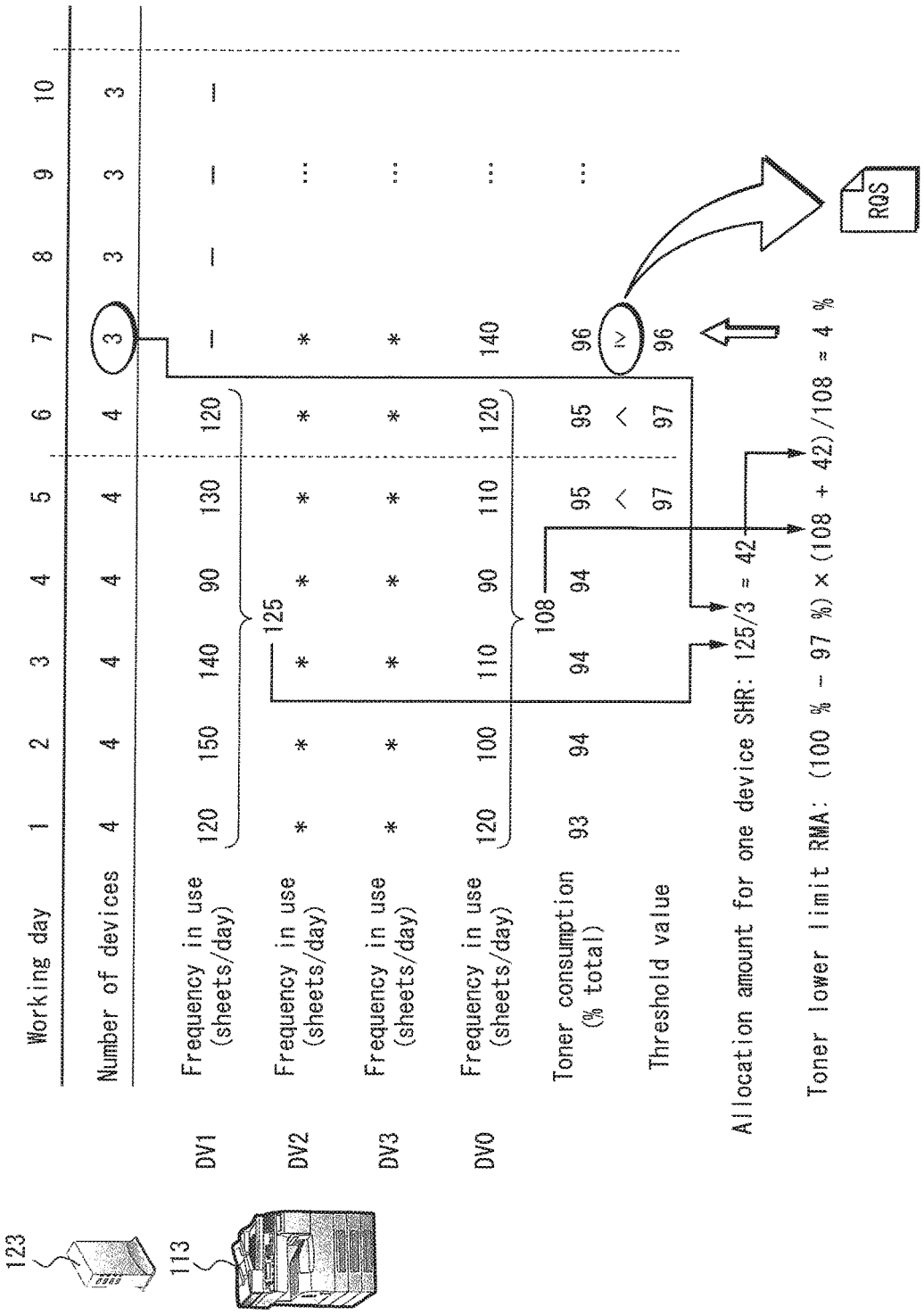
FIG. 16 is a schematic diagram for illustrating a process in which an image forming device shown in FIG. 15 corrects predicted replenishment time based on the frequency in use of the inoperative image forming device and the number of other operable image forming devices.

FIG. 16 is a schematic diagram for illustrating a process in which the prediction unit 612 of a specific device DV0 corrects a predicted replenishment time based on the frequency in use of an inoperative device DV1 and the number of other operable devices DV2 and DV3. FIG. 16 shows the figures each working day for: the number of operable devices indicated by the data NTC from the manager device 123; the frequencies in use of devices DV0, DV1, DV2, DV3; a total amount of toner consumed by the specific device DV0 since toner in the device DV0 was last replenished; and the threshold value for toner consumption set by the prediction unit 612 of the device DV0.

From the first to the fifth working day, the number of operable devices indicated in the data NTC received from the manager device 123 remains constant at four, and therefore the prediction unit 612 maintains the ratio of the numbers of operable devices at a value of one. Accordingly, the prediction unit 612 maintains a previously-set value of 97% as the threshold value for the first to the fourth working day.

The fifth working day is time for a new prediction, and therefore the prediction unit 612 updates the threshold value. Thus, the prediction unit 612, similarly to the calculation shown in FIG. 8, calculates an average value of toner consumption from the first to the fifth working day, which is 0.44%/day, multiplies this value by a toner delivery time of six days, and replaces the toner lower limit RMA with the product: RMA=0.44%/day×6 days≈3%. The prediction unit 612 further subtracts the toner lower limit RMA of 3% from the maximum toner capacity of 100%, then sets the difference of 97% as the threshold value.

The monitor unit 611 checks whether the total value of toner consumption is less than the threshold value of 97%. As shown in FIG. 16, the total value is less than the threshold value of 97% on the fifth working day.

On the sixth working day, the number of operable devices indicated in the data NTC received from the manager device 123 remains constant at four, and therefore the prediction unit 612 maintains the ratio of the numbers of operable devices at a value of one. Accordingly, the prediction unit 612 maintains the previously-set value of 97% as the threshold value. The monitor unit 611 checks whether the threshold value of 97% is less than the total toner consumption.

On the seventh working day, the data NTC from the manager device 123 indicates that the number of operable devices is three, and therefore the ratio of the numbers of devices becomes 3/4, which is less than one. The prediction unit 612 then corrects the threshold value.

Specifically, the prediction unit 612 first refers to the frequencies in use of operable devices from the data NTC, and searches the devices DV0, DV1, DV2, DV3 of which frequencies in use are included in the previous data NTC received on the sixth working day, for the device DV1 of which frequency in use is not included in the next data NTC received on the seventh working day. The prediction unit 612 regards the device DV1 as inoperative. The prediction unit 612 next calculates the average value of frequencies in use of the inoperative device DV1 from the first to the sixth working day, i.e., 125 sheets per day. The prediction unit 612 then estimates an allocation amount SHR for one device by dividing the average value of 125 sheets per day by the number of operable devices on the seventh working day, i.e., the number of three: SHR=125/3≈42 sheets/day. The prediction unit 612 subsequently calculates the average value of frequencies in use of its own device DV0 from the first to the sixth working day, i.e., 108 sheets per day, adds the allocation amount SHR of 42 sheets per day to the average value, i.e., 108+42=150 sheets/day, and calculates the ratio of the frequency in use after the addition, i.e., 150 sheets/day, to the frequency in use before the addition, i.e., 108 sheets/day. The prediction unit 612 further replaces the toner lower limit RMA, which is the difference between the maximum toner capacity of 100% and the threshold value of 97%, with the product of the toner lower limit RMA and the ratio of the frequencies, i.e., RMA=(100%−97%)×(150/108) 4%. The prediction unit 612 also replaces the threshold value with a value of 96%, which is the difference between the maximum toner capacity of 100% and the toner lower limit RMA of 4%.

Because the total amount of toner consumption at 96% has already reached the updated threshold value of 96%, the monitor unit 611 notifies the request unit 613. In response to the notification, the request unit 613 sends a replenishment request RQS to the manager device 123.

[Process of Correction of Predicted Replenishment Time]
—Manager Device Processing—

Figure 17:
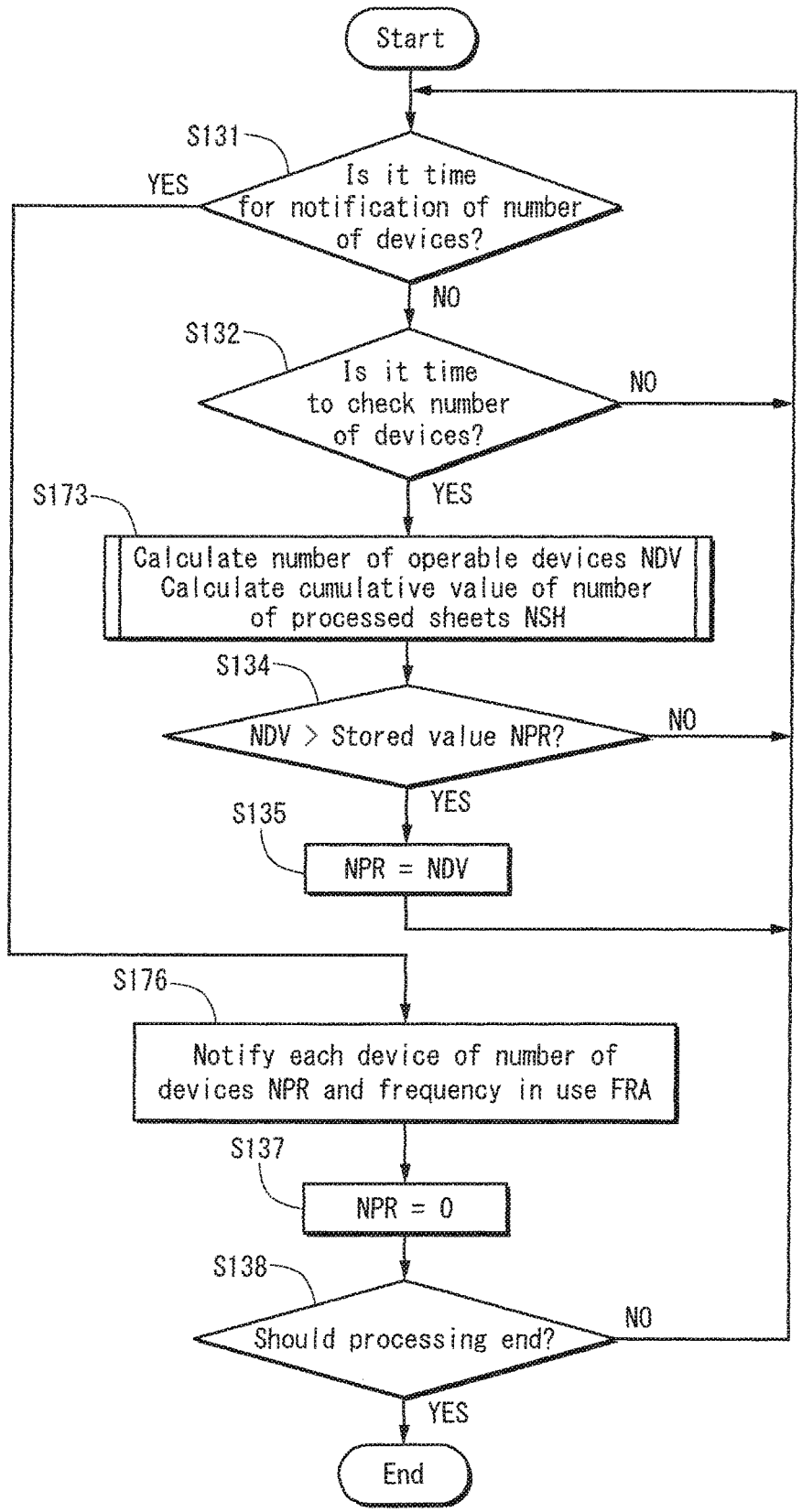
FIG. 17 is a flowchart of a process in which the image forming device shown in FIG. 15 obtains the number and frequencies in use of operable image forming devices and sends the number to other image forming devices.

FIG. 17 is a flowchart of a process in which the manager device 123 obtains the number and frequencies in use of operable devices and sends the number to devices of the device group 113. Compared with the process of the manager device 120 according to Embodiment 2 and shown in FIG. 13, this process includes step S173 and step S176 instead of step S133 and step S136, but other steps are the same. These other steps have the same reference signs as in FIG. 13, such as "S131, S132, . . . ."

In step S131, the notification unit 312 checks whether it is time to send the data NTC to the device group 113, for example, by checking whether one day has passed since the last transmission of the data NTC. If the time has been reached, processing proceeds to step S176, and if not, processing proceeds to step S132.

In step S132, it is not yet time to send the data NTC, and therefore the monitor unit 311 checks whether it is time to count the number of operable devices, for example by checking whether one hour has passed since the last counting of the number. If the time has been reached, processing proceeds to step S173, and if not, processing returns to step S131.

In step S173, it is time to count the number of operable devices. The monitor unit 311 then monitors the device group 113, and based on the result of monitoring, finds the number of operable devices NDV and accumulates the numbers of sheets NSH processed by each operable device. Details of step S173 are provided later. Subsequently, processing proceeds to step S134.

In step S134, the monitor unit 311 checks whether the number of operable devices NDV found in step S173 is greater than the number of operable devices NPR included in the registration data 351. If the former NDV is greater than the latter NPR, processing proceeds to step S135. If not, processing returns to step S131.

In step S135, the number of operable devices NDV found in step S173 is greater than the number of operable devices NPR included in the registration data 351, and therefore the monitor unit 311 updates the latter NPR with the former NDV. Subsequently, processing returns to step S131.

In step S176, it is time to send the data NTC. The notification unit 312 then reads from the registration data 351 the number of operable devices NPR and the cumulative value FRA of the numbers of sheets NSH processed by each operable device, incorporates the NPR and FRA into the data NTC, and sends the data NTC to the device group 113. The number of operable devices NPR is equal to the maximum value of the numbers of operable devices NDV obtained in steps S173 while steps S134 and S135 are repeated since the data NTC was last sent to the device group 113. The cumulative value FRA of the numbers of sheets NSH is a total number of sheets processed by each operable device since the data NTC was last sent to the device group 113, thus equaling the number of sheets processed by the device in the interval of transmission of the data NTC, such as the number of sheets processed per working day. In this sense, the cumulative value FRA is considered as the frequency in use of the device. Subsequently, processing proceeds to step S137.

In step S137, the monitor unit 311 initializes the number of operable devices NPR included in the registration data to zero. Subsequently, processing proceeds to step S138.

In step S138, the monitor unit 311 checks whether to end the monitoring of the device group 113. If the monitoring is to be ended, processing ends, and if not, processing returns to step S131.

Figure 18:
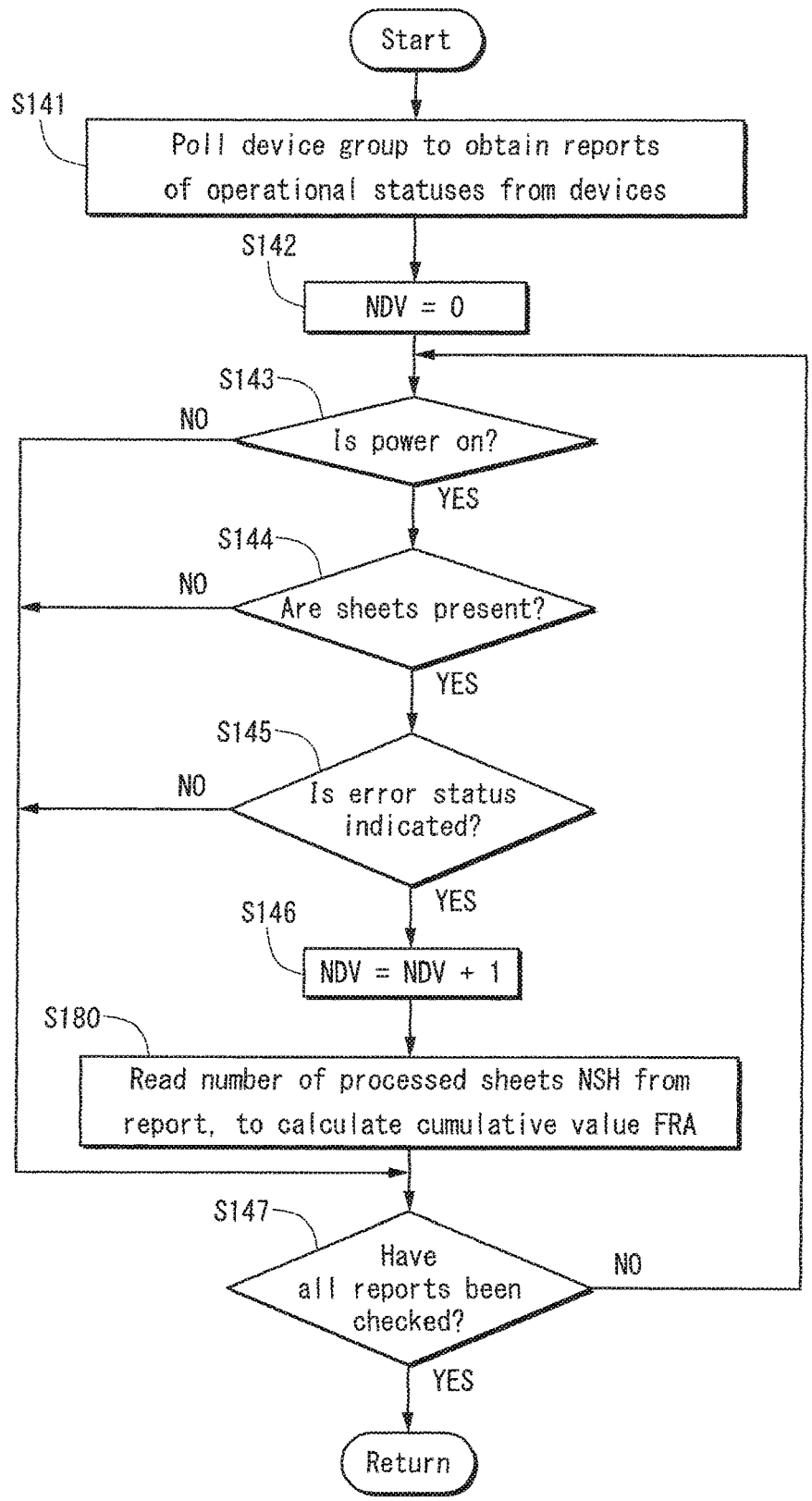
FIG. 18 is a flowchart of the subroutine of step S173 shown in FIG. 17.

FIG. 18 is a flow chart of the subroutine of step S173 shown in FIG. 17, i.e., the subroutine to find the number of operable devices NDV and the cumulative value FRA of the numbers of sheets processed by each operable device, based on the results of monitoring the device group 113. Compared with the process of the manager device 120 according to Embodiment 2 and shown in FIG. 14, this process includes step S180 after step S146, but other steps are the same. These other steps have the same reference signs as in FIG. 14, such as "S141, S142, . . . ."

In step S141, the monitor unit 311 reads IP addresses of devices from the registration data 351 related to the device group 113 from the storage unit 350, and controls the network I/F 370 to transmit a polling signal POL to each of the IP addresses in turn. The monitor unit 311 accepts reports RPT, via the network I/F 370, from the device group 113 in response to the polling signals POL. Subsequently, processing proceeds to step S142.

In step S142, the monitor unit 311 initializes the number of operable devices NDV to zero. Subsequently, processing proceeds to step S143.

In step S143, the monitor unit 311 selects and analyzes one report from the reports RPT in response to the polling signals POL, and checks whether the operational status of the device that sent the selected report satisfies condition (A) to be considered "operable", i.e., whether the device is powered on. If the device is powered on, processing proceeds to step S144, and if powered off, processing proceeds to step S147.

In step S144, the monitor unit 311 checks whether the operational status of the device that sent the report satisfies condition (B) to be considered "operable", i.e., whether the device holds at least one processable sheet in a paper feed cassette. If the device holds such a sheet, processing proceeds to step S145, and if not, processing proceeds to step S147.

In step S145, the monitor unit 311 checks whether the operational status of the device that sent the report satisfies condition (C) to be considered "operable", i.e., whether the device is indicating an error state such as a paper jam. If the device is not indicating any error, processing proceeds to step S146, and if indicating, processing proceeds to step S147.

In step S146, the device that sent the report has satisfied the conditions (A), (B), and (C) indicating that its operational status is "operable", and therefore the monitor unit 311 increments the number of operable devices NDV by one. Subsequently, processing proceeds to step S180.

In step S180, the monitor unit 311 first reads the number of sheets NSH from the report RPT selected in step S143; the device that sent the report RPT has processed the number of sheets NSH since the last polling. The monitor unit 311 next adds the number of sheets NSH to the cumulative value FRA stored in the storage unit 350 as an entry of the registration data 351. Subsequently, processing proceeds to step S147.

In step S147, the monitor unit 311 checks whether the reports RPT in response to the polling signals POL include one that the unit has not yet processed, i.e., whether the unit has reviewed all the reports RPT about whether a device that sent each report is operable. If the reports RPT include no unprocessed report, processing ends, and if otherwise, processing returns to step S143.

—Device Processing—

Figure 19:
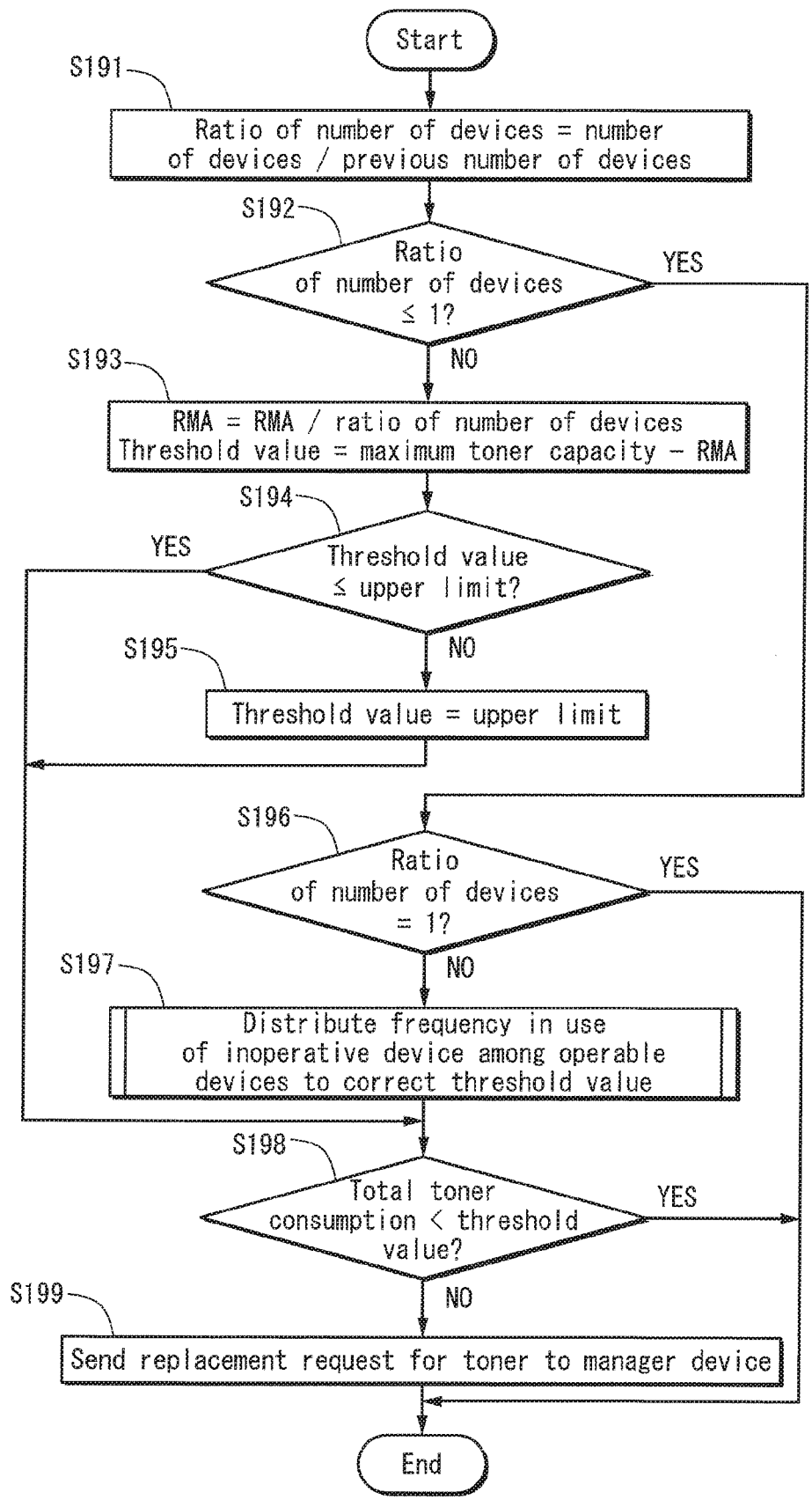
FIG. 19 is a flowchart of a process in which the image forming device shown in FIG. 15 corrects a threshold value for amount of toner consumption based on the number and frequencies in use of operable image forming devices received from the manager device.

FIG. 19 is a flowchart of a process in which the controller unit 60 corrects a threshold value for amount of toner consumption based on the number NPR and frequencies in use FRA of operable devices received from the manager device 123. The process starts when the controller unit 60 receives the data NTC from the manager device 123.

In step S191, the prediction unit 612 reads the number of operable devices NPR from the data NTC, then calculates the ratio of the number of operable devices NPR to another number of operable devices read from the previously-received data NTC. Subsequently, processing proceeds to step S192.

In step S192, the prediction unit 612 checks whether the ratio of the numbers of operable devices is equal to or less than one. If the ratio is equal to or less than one, processing proceeds to step S196, and if greater than one, processing proceeds to step S193.

In step S193, the ratio of the numbers of operable devices is greater than one, and therefore operable devices increases in number. The prediction unit 612 divides the toner lower limit RMA by the ratio and replaces the toner lower limit RMA with the quotient. The prediction unit 612 further updates the threshold value of toner consumption with the difference between the new toner lower limit RMA and the maximum toner capacity, i.e., threshold value=maximum toner capacity−RMA. Subsequently, processing proceeds to step S194.

In step S194, the prediction unit 612 checks whether the new threshold value is equal to or less than the upper limit, for example, 98%. If the threshold value is less than or equal to the upper limit, processing proceeds to step S198, and if greater than the upper limit, processing proceeds to step S195.

In step S195, the threshold value is greater than the upper limit, and therefore the prediction unit 612 limits the threshold value to the upper limit, for example, 98%. Subsequently, processing proceeds to step S198.

In step S196, the ratio of the numbers of operable devices is equal to or less than one, and therefore the prediction unit 612 checks whether the ratio is equal to one. If the ratio is equal to one, processing ends, and if less than one, processing proceeds to step S197.

In step S197, the ratio of the numbers of operable devices is less than one, and therefore operable devices decrease in number. In other words, an inoperative device appears. Accordingly, the prediction unit 612 evenly distributes the frequency in use of the inoperative device among the operable devices. Based on the difference of the frequencies in use of its own device between before and after the distribution, the prediction unit 612 corrects the threshold value. Details of step S197 are provided later. Subsequently, processing proceeds to step S198.

In step S198, the monitor unit 611 checks whether the total toner consumption since the last toner replenishment is less than the threshold value. If the total toner consumption is less than the threshold value, processing ends, and if greater than or equal to the threshold value, processing proceeds to step S199.

In step S199, the total toner consumption is equal to or greater than the threshold value, and therefore the monitor unit 611 notifies the request unit 613. In response to the notification, the request unit 613 sends a replenishment request RQS to the manager device 120. Subsequently, processing ends.

Figure 20:
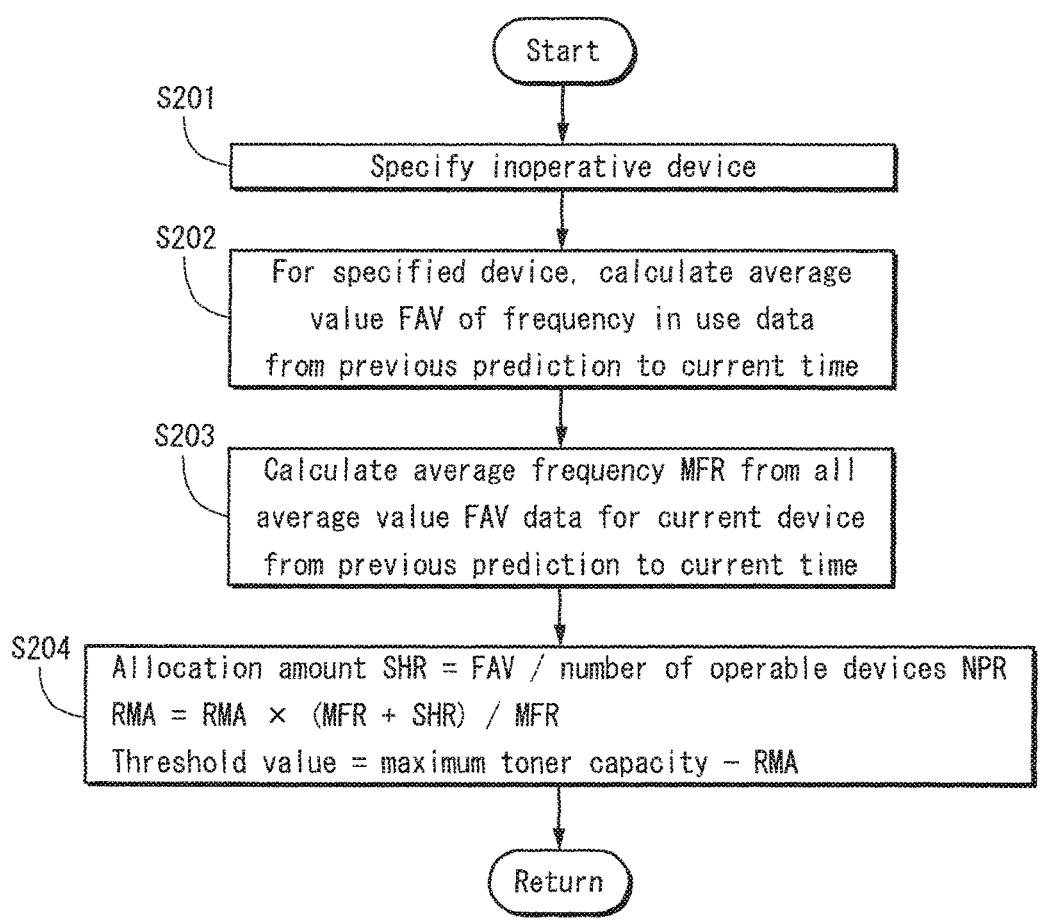
FIG. 20 is a flowchart of the subroutine of step S197 shown in FIG. 19.

FIG. 20 is a flowchart of the subroutine of step S197 shown in FIG. 19, i.e., correcting the threshold value based on the frequency in use of the inoperative device.

In step S201, the prediction unit 612 references the frequencies in use FRA included in the data NTC received from the manager device 123, and searches devices of which frequencies in use FRA are included in the previous data NTC for a device of which frequency in use FRA is not included in the next data NTC. The prediction unit 612 then specifies the device as inoperative. Subsequently, processing proceeds to step S202.

In step S202, the prediction unit 612 calculates the average value of frequencies in use FRA of each inoperative device specified in step S201. The frequencies in use FRA are received from the manager device 123 since toner in the inoperative device was last replenished. Subsequently, processing proceeds to step S203.

In step S203, the prediction unit 612 calculates as the frequency in use MFR of its own device, the average of frequencies in use of the device received from the manager device 123 since the last prediction of toner replenishment time. Subsequently, processing proceeds to step S204.

In step S204, the prediction unit 612 evenly distributes the average value FAV calculated in step S202 among the number of operable devices NPR, in order to estimate the allocation amount SHR for one device. The prediction unit 612 then adds the allocation amount SHR to the frequency in use MFR of its own device, calculates the ratio of the frequency after the addition to the frequency before the addition, multiplies the ratio by the toner lower limit RMA, and replaces the toner lower limit RMA with the product, i.e., RMA=RMA×(MFR+SHR)/MFR. The prediction unit 612 then sets the difference between the new toner lower limit RMA and the maximum toner capacity as the threshold value, i.e., threshold value=maximum toner capacity−RMA. Subsequently, processing returns to the flowchart shown in FIG. 19, and proceeds to step S198.

Advantages of Embodiment 3

In the consumables management system 300 according to Embodiment 3 of the invention, as in the system 100 according to Embodiment 1, each device of the device group 113 monitors the amount of toner consumed by the device, sets the toner lower limit RMA based on the history of toner consumption, and predicts the time when the total toner consumption reaches the threshold value, which is lower than the maximum toner capacity by the toner lower limit RMA. In the system 300, the manager device 123 further notifies devices in the device group 113 of the data NTC indicating the number of operable devices in the device group 113 at intervals. In response to each notification, each device calculates the ratio of the number to another number indicated in the previous data NTC and corrects the threshold value based on the ratio. Thus, the consumables management system makes the devices correct their predicted replenishment time in response to changes in number of operable devices. Therefore, the consumables management system 300 enables the devices to more accurately predict replenishment time regardless of fluctuations not only in number, but also in operational statuses of the devices.

In contrast to Embodiment 1, the prediction unit 612 of each device of the device group 113 according to Embodiment 3, when operable devices in the device group 113 are reduced in number, first specifies an inoperative device in the device group 113 based on the data NTC from the manager device 123 that lacks the frequency in use of the inoperative device. The prediction unit 612 next averages frequencies in use of the inoperative device from all notifications from the previous prediction up to the current time. The prediction unit 612 then divides the average value by the number of the operable devices to estimate an allocation amount to share among the operable devices. The prediction unit 612 subsequently adds the allocation amount to the frequency in use of its own device, calculates the ratio of the frequency after the adding to the frequency before the adding, and replaces the toner lower limit RMA with the product of the ratio and the toner lower limit RMA. Thus, increase in frequency in use of operable devices caused by the appearance of an inoperative device is reflected in the correcting of predicted replenishment time. This reflection enables the operable devices to more accurately predict replenishment time.

Modifications of Embodiment 3

(A) The monitor unit 311 in the manager device 123 makes each device in the device group 113, at each polling, send the number of sheets that the device has processed since the last polling, as an entry in the report RPT related to operational status of the device. Alternatively, the manager device 123 may calculate the number of sheets that each device has processed from the content of jobs that the device has been requested to process from the PC group 140, when the manager device 123 keeps track of the content of jobs because of its function as a print server, etc., for the device group 113. In this case, each device in the device group 113 other than the target device(s) may periodically notify the manager device 123 of the number of sheets processed by the device.

(B) In the manager device 123, the monitor unit 311 makes each device in the device group 113, at each polling, notify the manager device 123 of the number of sheets processed by the device, and the notification unit 312 accumulates the numbers of sheets that the device has processed in the interval between the notifications of the numbers of devices, and from the cumulative value of the numbers of sheets, estimates the frequency in use of the device. Alternatively, the monitor unit 311 may make the device, at each polling, notify the manager device 123 of toner consumption per job, i.e., toner coverage, and from the toner coverage, the notification unit 312 may estimate the frequency in use of the device.

(C) The notification unit 312 in the manager device 123 may seek an entry other than the identification information in the registration data 351 shown in FIG. 4. For example, the notification unit 312 may seek the number and frequencies in use of operable devices for each type of job or each attribute of sheet that the devices can process. The notification unit 312 may classify the frequencies in use, for example, by color and monochrome processing, by printer, copy, and scanner functions, by sheet sizes such as A3, A4, B4, etc., or by paper type such as normal, coated, high-quality, etc.

Thus classifying the number and frequencies in use of operable devices according to job types or sheet attributes, the notification unit 312 may notify the device group 113 of the data NTC indicating the number and frequencies. In this case, each device in the device group 113 may retrieve from the data NTC the number and frequencies in use of devices of its own type, and based on them, correct its own predicted replenishment time. For example, a color printer may correct its threshold value for Y, M, C colors of toner based on the number of devices capable of color processing, such as color printers and color copiers, and their frequencies in use for color processing. On the other hand, the color printer may correct its threshold value for K color of toner based on the number of all the operable devices with or without capability of color processing and their frequencies in use for both color and monochrome processing.

(D) The notification unit 312 in the manager device 123 incorporates both the number and frequencies in use of operable devices into the same data NTC to be sent to the device group 113, and therefore sends both of them at the same intervals. The notification unit 312 may vary the interval of notification between the number and frequencies in use of operable devices. The notification unit 312 may, preferably, set the interval for the number of operable devices to be equal to or less than the interval for their frequencies in use.

(E) The prediction unit 612 of each device in the device group 113 calculates as the frequency in use of the device, the average value of the frequencies in use of the device received from the manager device 123 since the last prediction of replenishment time. The prediction unit 612 may alternatively accumulate the numbers of sheets processed by the device since the last prediction of replenishment time. From the cumulative value of the numbers of sheets and the interval of prediction, the prediction unit 612 may calculate the frequency in use of the device when the device receives the data NTC from the manager device 123.

Embodiment 4

The consumables management system according to Embodiment 4 of the invention is similar to the consumables management system 100 according to Embodiment 1 in that it supports timely resupply of toner for image forming devices included in a device group. The system according to Embodiment 4, like the system 300 according to Embodiment 3, includes frequency in use in items of operational statuses of the device group that the system monitors, and uses the frequencies in use of devices as well as the number thereof in correction of predicted replenishment time. In contrast to the systems 100, 300 according to Embodiments 1 and 3, the system according to Embodiment 4 distributes the frequency in use of an inoperative device among operable devices not equally, but instead, according to a ratio of their frequencies in use.

The following describes different portions of the system according to Embodiment 4 from those of the systems 100, 300 according to Embodiments 1 and 3. Details of portions of the system according to Embodiment 4 that are the same as those of the system 100 according to Embodiment 1 or the system 300 according to Embodiment 3 can be found in the description of Embodiment 1 or Embodiment 3.

[Configuration of Consumables Management System]

In addition to functions similar to those of the manager device 120 according to Embodiment 1, i.e., (1) accepting a replenishment request and (2) accepting a registration request for addition/removal of a device, the manager device according to Embodiment 4 has functions similar to those of the manager device 123 according to Embodiment 3, i.e., (2A) monitoring operational statuses of the device group, and (3A) periodically notifying the device group of the number and frequencies in use of their operable devices.

In addition to functions similar to those of each device in the device group according to Embodiment 1, i.e., (4) monitoring toner consumption, (5) predicting replenishment time, and (6) sending a replenishment request to the manager device, each device in the device group according to Embodiment 4 has the function of (7B) in response to a notification from the manager device, correcting the predicted replenishment time based on the number and frequencies in use of operable devices that the notification indicates. In particular, when the operable devices decrease in number, the prediction unit of each operable device after the decrease distributes the frequency in use of a device that was operable only before the decrease among the operable devices after the decrease "according to a ratio of increase in their frequencies in use". The prediction unit then corrects the threshold value based on a difference in frequency in use of its own device between before and after the distribution.

—Correction of Prediction of Replenishment Time—

FIG. 21 is a schematic diagram for illustrating a process in which the prediction unit 612 of a specific device DV0 corrects predicted time for replenishment of toner based on the number and frequencies in use of operable image forming devices. FIG. 21 shows, for each working day: the number of operable devices indicated in the data NTC from a manager device 124; frequency in use of each device DV0, DV1, DV2, DV3; total toner consumed by the specific device DV0 since toner was last replenished; and the threshold value the prediction unit 612 of the device DV0 sets for toner consumption.

From the first to the fifth working day, the number of devices indicated in the data NTC received from the manager device 124 remains constant at four, and therefore the prediction unit 612 maintains the ratio of the numbers of devices at a value of one. Accordingly, the prediction unit 612 maintains a previously-set value of 97% as the threshold value for the first to the fourth working day. The prediction unit 612 also reads and stores frequency in use data for each device from the data NTC.

The fifth working day is time for a new prediction, and therefore the prediction unit 612 updates the threshold value. Thus, the prediction unit 612, similarly to the calculation shown in FIG. 8, calculates an average value of toner consumption from the first working day to the fifth working day, which is 0.44%/day, multiplies this value by a toner delivery time of six days, and replaces the toner lower limit RMA with the product: RMA=0.44%/day×6 days≈3%. The prediction unit 612 further sets a value of 97% as the threshold value, obtained by subtracting the toner lower limit RMA of 3% from the maximum toner capacity of 100%.

The monitor unit 611 checks whether the threshold value of 97% is less than the total toner consumption. As shown in FIG. 21, the total value of toner consumption is less than the threshold value of 97% on the fifth working day.

On the sixth working day, the number of devices indicated in the data NTC received from the manager device 124 remains constant at four, and therefore the prediction unit 612 maintains the ratio of the numbers of devices at a value of one. Accordingly, the prediction unit 612 maintains the previously-set value of 97% as the threshold value. The monitor unit 611 checks whether the threshold value of 97% is less than the total toner consumption. The prediction unit 612 also reads and stores frequency in use data for each device from the data NTC.

On the seventh working day, the data NTC from the manager device 124 indicates that the number of devices is three, and therefore the ratio of the numbers of devices becomes 3/4, which is less than one. In response, the prediction unit 612 determines whether the threshold value should be corrected.

Specifically, the prediction unit 612 first refers to the frequencies in use of operable devices from the data NTC, and searches the devices DV0, DV1, DV2, DV3 of which frequencies in use are included in the previous data NTC received on the sixth working day, for a device DV1 of which frequency in use is not included in the next data NTC received on the seventh working day. The prediction unit 612 then regards the device DV1 as inoperative. The prediction unit 612 subsequently calculates the average value of frequencies in use of the inoperative device DV1 from the first to the sixth working day; the average value is for example 125 sheets per day.

The prediction unit 612 also calculates an average value FAV of frequency in use for each of the operable devices DV2, DV3, and DV0, from the first to the sixth working day. In FIG. 21, the average value FAV from the first to the sixth working day for each of the operable devices DV2, DV3, and DV0 is 17 sheets per day, 93 sheets per day, and 108 sheets per day, respectively.

Subsequently, the prediction unit 612 waits for the next data NTC from the manager device 124. Thus, the threshold value is maintained at the previous value of 97%, and therefore the monitor unit 611 checks whether the total toner consumption is less than the threshold value of 97%.

On the eighth working day, the prediction unit 612 first checks whether the number of devices indicated in the data NTC newly sent from the manager device 124 remains at three. The prediction unit 612 then reads the frequency in use FRA for each operable device DV2, DV3, DV0 from the data NTC, and calculates an increase INC of the frequency in use FRA from the average value FAV for the first to the sixth working day, i.e., INC=FRA−FAV. In FIG. 21, the frequency in use FRA of the operable devices DV2, DV3, and DV0 indicated in the data NTC received on the eighth working day is 60 sheets per day, 90 sheets per day, and 150 sheets per day, respectively, and therefore the increases INC for the devices DV2, DV3, and DV0 is +43 sheets per day, −3 sheets per day, and +42 sheets per day, respectively.

The prediction unit 612 extracts from the increases INC any results that are greater than or equal to a lower limit, for example +10 sheets per day or greater. When the devices indicated in the extracted increases INC do not include the device itself, the prediction unit 612 of the device does not correct the threshold value, but when the device itself is included, the prediction unit 612 corrects the threshold value. In FIG. 21, the increases INC for the devices DV2 and DV0 are equal to or greater than +10 sheets per day, and therefore the prediction units 612 of these devices correct their respective threshold values.

For the device DV0, the prediction unit 612 thereof performs the following correction of its threshold value. The prediction unit 612 first calculates the ratio between increases INC that are equal to or greater than +10 sheets per day. In FIG. 21, the ratio of increases INC between the operable device DV2 and the device DV0 itself is 43:42. The prediction unit 612 then distributes the average frequency in use of the inoperative device DV1 of 125 sheets per day between device DV2 and the device DV0, according to the ratio of 43:42. Thus, the allocation amount SHR of the device DV0 is calculated as follows: SHR=125×42/(43+42) ≈62 sheets/day. The prediction unit 612 then adds the allocation amount of 62 sheets per day to the frequency in use of 108 sheets per day of the device DV0, i.e., 108+62=170 sheets/day, calculates the ratio of the result to the frequency in use of 108 sheets per day, multiplies the ratio by the toner lower limit RMA of 3%, derived from the difference between the maximum toner capacity and the threshold value, and replaces the lower limit RMA with the product, i.e., RMA=(100%−97%)×(170/108) 5%. The prediction unit 612 then replaces the threshold value with a value of 95%, which is lower than the toner maximum capacity of 100% by the toner lower limit RMA of 5%.

Because the total amount of toner consumption at 97% has already reached the updated threshold value of 95%, the monitor unit 611 notifies the request unit 613. In response to the notification, the request unit 613 sends a replenishment request RQS to the manager device 124.

[Process of Correction of Predicted Replenishment Time]
—Device Processing—

Figure 22:
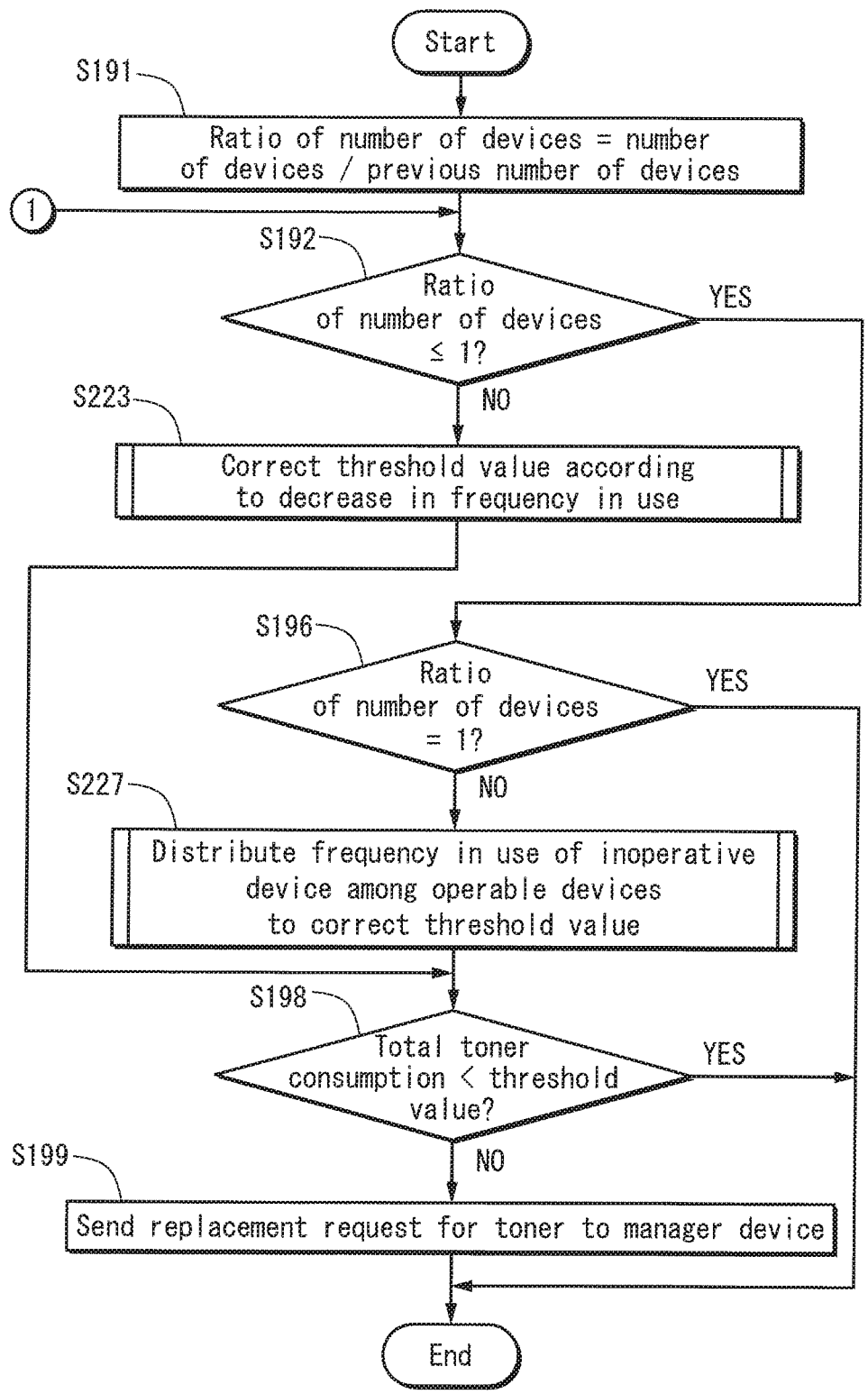
FIG. 22 is a flowchart of a process in which the image forming device shown in FIG. 21 corrects a threshold value for amount of toner consumption based on the number and frequencies in use of operable image forming devices received from the manager device.

FIG. 22 is a flowchart of a process in which the controller unit 60 corrects a threshold value for amount of toner consumption based on the number of operable devices and the frequency in use FRA received from the manager device 124. This process is different from the process of the manager device 123 according to Embodiment 3 shown in FIG. 19 in that step S223 replaces steps S193 to S195, and step S227 replaces step S197. Other steps are unchanged. These other steps have the same reference signs as in FIG. 19, such as "S191, S192, . . . ."

In step S191, the prediction unit 612 reads the number of operable devices from the data NTC, then calculates the ratio of the number of operable devices to another number of operable devices read from the previously-received data NTC. Subsequently, processing proceeds to step S192.

In step S192, the prediction unit 612 checks whether the ratio of the numbers of operable devices is equal to or less than one. If the ratio is equal to or less than one, processing proceeds to step S196, and if greater than one, processing proceeds to step S223.

In step S223, the ratio of the numbers of operable devices is greater than one, and therefore operable devices increase in number. In other words, a new operable device is added to the system. This addition causes a decrease in frequencies in use of other operable devices, and according to the decrease, the prediction unit 612 corrects the threshold value. Details of step S223 are provided later. Subsequently, processing proceeds to step S198.

In step S196, the ratio of the numbers of operable devices is equal to or less than one, and therefore the prediction unit 612 checks whether the ratio is equal to one. If the ratio is equal to one, processing ends, and if less than one, processing proceeds to step S227.

In step S227, the ratio of the numbers of operable devices is less than one, and therefore operable devices decrease in number. In other words, an inoperative device appears. Accordingly, the prediction unit 612 corrects the threshold value based on the frequency in use of the inoperative device. Details of step S227 are provided later. Subsequently, processing proceeds to step S198.

In step S198, the monitor unit 611 checks whether total toner consumption since the last toner replenishment is less than the threshold value. If the total toner consumption is less than the threshold value, processing ends, and if greater than or equal to the threshold value, processing proceeds to step S199.

In step S199, the total amount of toner consumption is equal to or greater than the threshold value, and therefore the monitor unit 611 notifies the request unit 613. In response to the notification, the request unit 613 sends a replenishment request RQS to the manager device 124. Subsequently, processing ends.

Figure 23:
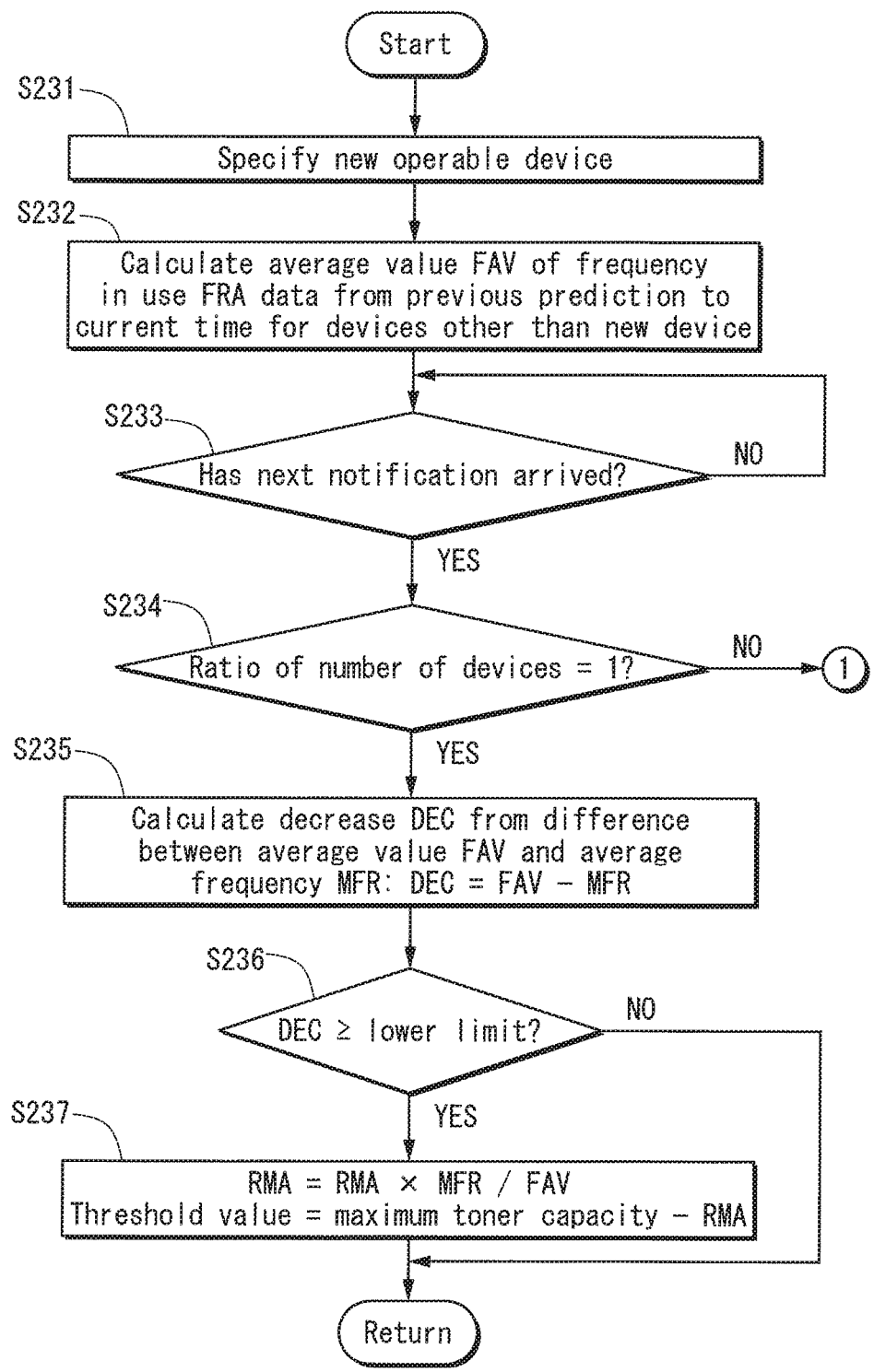
FIG. 23 is a flowchart of the subroutine of step S223 shown in FIG. 22.

FIG. 23 is a flowchart of the subroutine of step S223 shown in FIG. 22, i.e., correcting the threshold value according to a decrease in frequency in use caused by the addition of a new operable device to the system.

In step S231, the prediction unit 612 references the frequencies in use FRA included in the data NTC from the manager device 124, searches for a device of which frequency in use FRA is included in the data NTC but not in the previous data NTC, and specifies the device as a new device. Subsequently, processing proceeds to step S232.

In step S232, the prediction unit 612 calculates the average value FAV of all the frequencies in use FRA of each of operable devices other than the new device specified in step S231. The frequencies in use FRA have been sent from the manager device 124 to the prediction unit 612 since the last toner replenishment. Subsequently, processing proceeds to step S233.

In step S233, the prediction unit 612 checks whether the next data NTC from the manager device 124 has arrived. If the next data NTC has arrived, processing proceeds to step S234 and if not, processing repeats step S233.

In step S234, the next data NTC from the manager device 124 has arrived. From the next data NTC, the prediction unit 612 reads the number of operable devices and calculates the ratio of the number to another number of operable devices read from the pervious data NTC. Furthermore, the prediction unit 612 checks whether the ratio of the numbers of devices is equal to one. If the ratio is equal to one, processing proceeds to step S235, and if not, processing returns to the flowchart of FIG. 22, step S192.

In step S235, the prediction unit 612 reads the frequency in use of its own device MFR from the next data NTC, and subtracts the frequency MFR from the average value FAV calculated in step S232 to determine a decrease DEC of the frequency in use of the device, i.e., DEC=FAV−MFR. Subsequently, processing proceeds to step S236.

In step S236, the prediction unit 612 checks whether the decrease DEC calculated in step S235 is greater than or equal to a lower limit, for example 20 sheets per day. The lower limit is, for example, set to be the decrease in frequency in use of a device that can cause one-day delay of the replenishment time. If the decrease DEC is greater than or equal to the lower limit, processing proceeds to step S237, and if less than the lower limit, processing returns to the flowchart shown in FIG. 22 and proceeds to step S198.

In step S237, the decrease DEC is equal to or greater than the lower limit, and therefore there is a possibility that the replenishment time will be pushed back by at least one day. Accordingly, the prediction unit 612 calculates the ratio of the frequency in use of its own device MFR after the decrease to the average value FAV calculated in step S232, i.e., the frequency in use of the device before the decrease, multiplies the ratio by the toner lower limit RMA, and replaces the toner lower limit RMA with the product, i.e., RMA=RMA×MFR/FAV. The prediction unit 612 then sets the difference between the new toner lower limit RMA and the maximum toner capacity as the threshold value, i.e., threshold value=maximum toner capacity−RMA. Subsequently, processing returns to the flowchart shown in FIG. 22, and proceeds to step S198.

Figure 24:
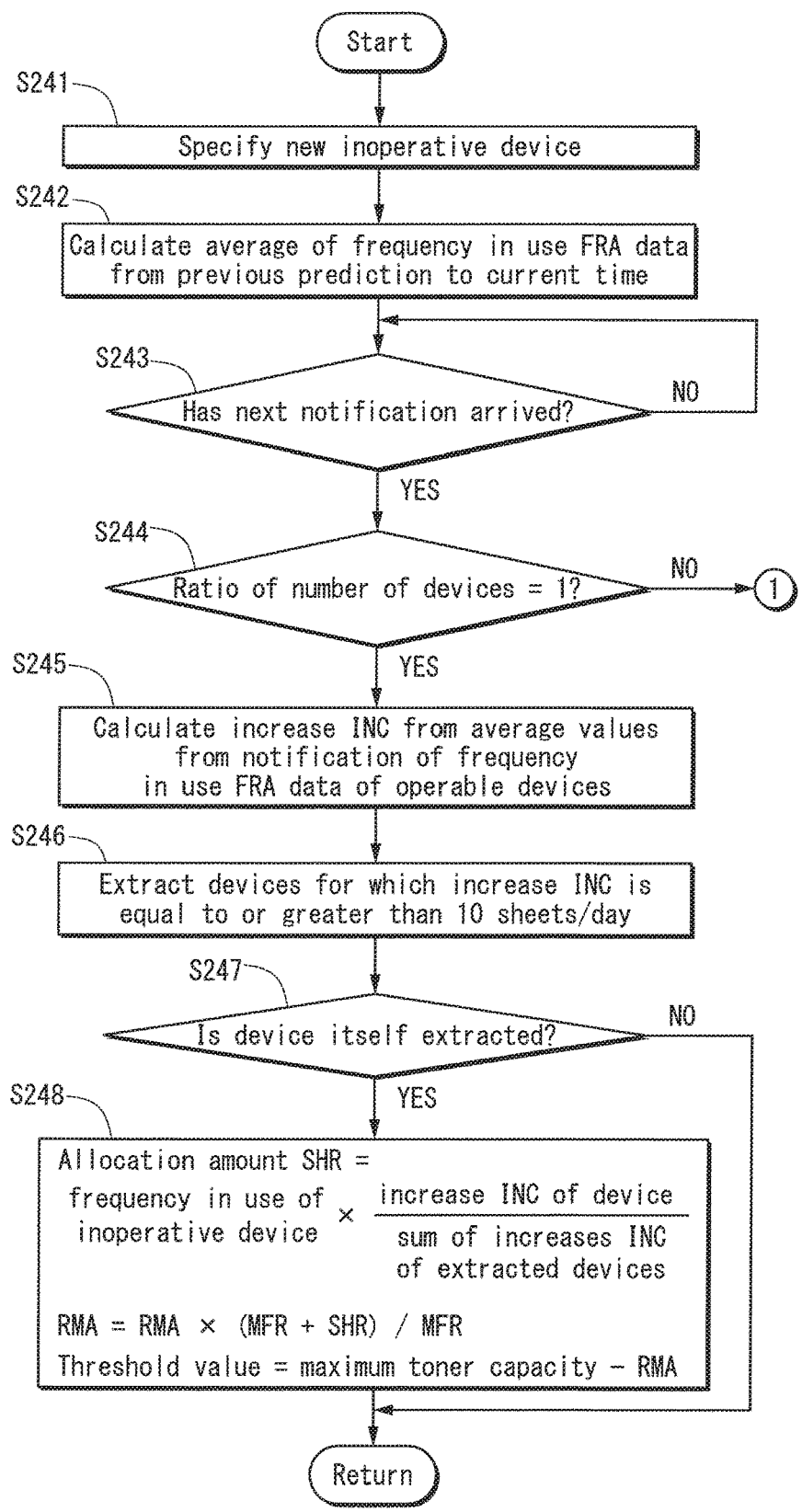
FIG. 24 is a flowchart of the subroutine of step S227 shown in FIG. 22.

FIG. 24 is a flowchart of the subroutine of step S227 shown in FIG. 22, i.e., correcting the threshold based on the frequency in use of an inoperative device.

In step S241, the prediction unit 612 references the frequencies in use FRA included in the data NTC from the manager device 124, searches for a device of which frequency in use FRA is not included in the data NTC but is included in the previous data NTC, and specifies the device as inoperative. Subsequently, processing proceeds to step S242.

In step S242, the prediction unit 612 calculates the average value FAV of all the frequencies in use of each device FRA received from the manager device 123 from the last time toner was replenished until the present time. Subsequently, processing proceeds to step S243.

In step S243, the prediction unit 612 checks whether the next data NTC has arrived from the manager device 124. If the next data NTC has arrived, processing proceeds to step S244, and if not, processing repeats step S243.

In step S244, the next data NTC has arrived from the manager device 124. From the data NTC, the prediction unit 612 reads the number of operable devices and calculates the ratio of the number to the previous number of operable devices. The prediction unit 612 further checks whether the ratio of the numbers of devices is equal to one. If the ratio is equal to one, processing proceeds to step S245, and if not, processing returns to the flowchart of FIG. 22 and proceeds to step S198.

In step S245, the prediction unit 612 reads the frequency in use FRA of each operable device from the data NTC from the manager device, and subtracts from the frequency FRA the average value FAV calculated in step S242 to determine an increase INC of the frequency in use of the operable device, i.e., INC=FRA−FAV. Subsequently, processing proceeds to step S246.

In step S246, the prediction unit 612 selects an operable device of which the increase INC calculated in step S245 is equal to or greater than the lower limit of, for example, +10 sheets per day. Subsequently, processing proceeds to step S247.

In step S247, the prediction unit 612 checks whether it has selected its own device in step S246. If it has selected the device, processing proceeds to step S248, and if not, processing returns to the flowchart of FIG. 22 and then proceeds to step S198.

In step S248, the prediction unit 612 has selected its own device in step S246, and therefore a decrease in the number of operable devices has increased the frequency in use of the device by the lower limit of, for example, +10 sheets per day or more. Accordingly, the prediction unit 612 distributes the frequency in use of the inoperative device among the operable devices according to the ratio of the increases INC in frequency in use of the operable devices, and corrects the threshold value based on the difference of frequency in use of its own device between before and after the distribution.

Specifically, the prediction unit 612 calculates the ratio of the increase INC of its own device to a sum of the increases INC of all the operable devices selected in step S246, multiplies the ratio by the frequency in use of the inoperative device, and sets the product as the allocation amount SHR for its own device. The prediction unit 612 then adds the allocation amount SHR to the frequency in use of the device MFR, calculates the ratio of the frequency MFR after the addition to the frequency MFR before the addition, multiplies the ratio by the toner lower limit RMA, and replaces the toner lower limit RMA with the product, i.e., RMA=RMA×(MFR+SHR)/MFR. The prediction unit 612 then sets the difference between the new toner lower limit RMA and the maximum toner capacity as the threshold value, i.e., threshold value=maximum toner capacity−RMA. Subsequently, processing returns to the flowchart shown in FIG. 22, and proceeds to step S198.

Advantages of Embodiment 4

In the consumables management system according to Embodiment 4 of the invention, as in the system 100 according to Embodiment 1, each device of the device group 114 monitors the amount of toner consumed by the device, and based on the history of toner consumption, sets the toner lower limit RMA and predicts the time when the total toner consumption reaches the threshold value, which is lower than the maximum toner capacity by the toner lower limit RMA. In the system, the manager device 124 further periodically notifies devices in the device group 114 of the data NTC indicating the number of operable devices in the device group 114. In response to each notification, the devices of the device group 114 calculate the ratio of the number to another number indicated in the previous data NTC and, based on the ratio, correct the threshold values. Thus, the consumables management system makes the devices correct their predicted replenishment time in response to changes in number of the operable devices. Therefore, the consumables management system enables the devices to more accurately predict replenishment time regardless of fluctuations in number of the devices.

In contrast to Embodiment 1, the prediction unit 612 of each device of the device group 114 according to Embodiment 4, when operable devices of the device group 113 are reduced in number, first specifies an inoperative device of the device group 114 based on the data NTC from the manager device 124 that lacks a frequency in use of the inoperative device. The prediction unit 612 next calculates the average value FAV of frequencies in use of each operable device from notifications from the previous prediction up to the reduction in number of the operable devices. The prediction unit 612 subsequently calculates an increase INC in frequency in use of each operable device between before and after the reduction in number of the operable devices, then distributes the average frequency in use of the inoperative device among the operable devices in proportion to their increases INC, thereby estimating allocation amounts SHR for the operable devices. The prediction unit 612 further adds the allocation amount SHR to the average value FAV of frequency in use of its own device, calculates the ratio of the frequency after the adding to the frequency before the adding, multiplies the toner lower limit RMA by the ratio, and replaces the toner lower limit RMA with the product of the multiplication. In this manner, the system makes each operable device correct predicted replenishment time according to an actual increase in frequency in use of the operable device caused by appearance of an inoperative device. The system thus enables the operable devices to more accurately predict replenishment time.

Modifications of Embodiment 4

(A) The notification unit 312 of the manager device 124 notifies devices in the device group 114 of the number and frequencies in use of operable devices at the same intervals. The notification unit 312 may alternatively send notifications of the frequencies in use of operable devices at longer intervals than it sends notification of the number of operable devices. For example, the notification unit 312 may send notifications of the frequencies in use each week, while sending those of the number every working day. From the time operable devices change in number, the notification unit 312 preferably starts to send notifications of the frequencies in use at the same intervals as it sends those of the number.

Embodiment 5

The consumables management system according to Embodiment 5 of the invention is similar to the consumables management system 100 according to Embodiment 1 in that it supports timely resupply of toner for image forming devices included in the device group 110. However, the system according to Embodiment 5 is different from the system 100 according to Embodiment 1 in that a specific PC has the functions that the manager device 120 according to Embodiment 1 has as an element of the consumables management system 100.

The following describes this difference between the systems according to Embodiment 5 and Embodiment 1. Details of the portions of the system according to Embodiment 5 that are the same as those of the system 100 according to Embodiment 1 can be found in the description of Embodiment 1.

[Hardware Configuration of PC]

Figure 25:
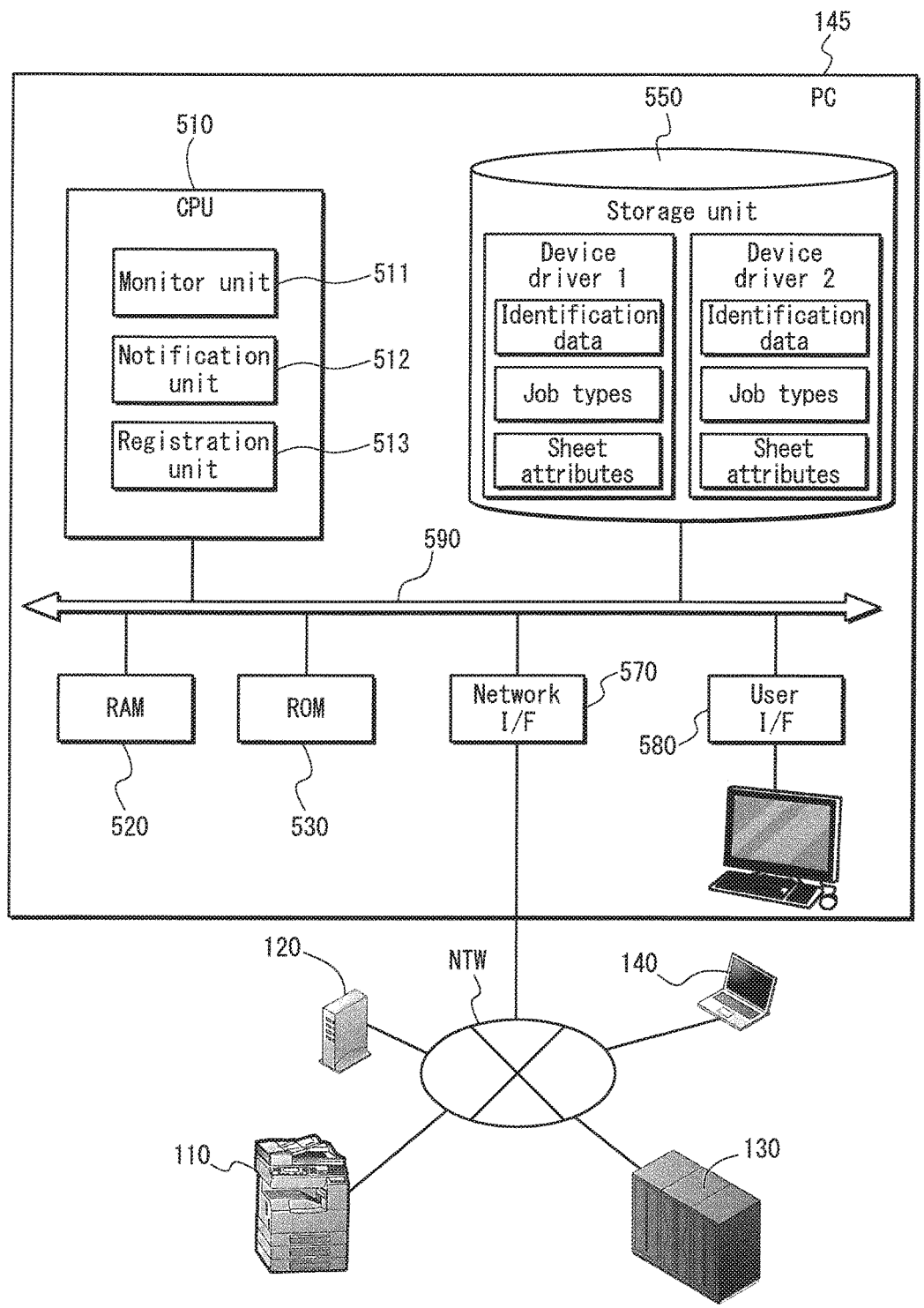
FIG. 25 is a block diagram showing hardware configuration of a personal computer (PC), which is an electronic device according to Embodiment 5 of the invention.

FIG. 25 is a block diagram showing hardware configuration of the specific PC 145. The PC 145 is at least one PC of the PC group 140 shown in FIG. 1. Referring to FIG. 25, the PC 145 includes a CPU 510, a RAM 520, a ROM 530, a storage unit 550, a network I/F 570, and a user I/F 580. These elements 510, 520, 530, 350, 550, 570, and 580 are connected to be able to communicate with each other via a bus 590.

The CPU 510, the RAM 520, and the ROM 550 are electronic circuits mounted on a single substrate of the PC 145. The CPU 510 controls the elements 520, 530, 550, 570, and 580 according to firmware. The RAM 520 provides the CPU 510 with a workspace for executing firmware. The ROM 550 includes a non-writable semiconductor memory device and a writable semiconductor memory device such as EEPROM. The former stores firmware and the latter provides the CPU 510 with storage for data such as environmental variables.

The storage unit 550 is a non-volatile mass storage unit housed inside the PC 145, for example a HDD or SSD. In particular, the storage unit 550 stores device drivers for each device of the device group 110.

The network I/F 570 is connected to the network NTW by wired or wireless means, and communicates with the device group 110, the PC group 140, and the cloud server 150 via the network NTW. The network I/F 570 accepts a replenishment request RQS from the device group 110 and notifies the CPU 511 of the reception; receives a registration request RST for addition/removal of a device from the device group 110 and notifies the CPUT 511 of the reception; and transmits a received replenishment request RQS to the cloud server 150.

The user I/F 580 relays data exchange between an input device such as a mouse, keyboard, display, etc., and the bus 590. Via the user I/F 580, the CPU 510 accepts user operations and presents information to the user by, for example, generating a screen display.

[Functions of PC as Elements of Consumables Management System]

Properties 551 of a corresponding device included in a device driver stored in the storage unit 550 can be used as registration data of the device. The device driver include items of the registration data shown in FIG. 4, i.e., device identification data such as device name and IP address, color processing ability, job types that can be processed such as printing, copying, and scanning, and sheet attributes that can be processed such as size and paper type. Furthermore, installation/uninstallation of the device driver to the PC 145 may be treated as connection/disconnection of the corresponding device with the network NTW.

Referring again to FIG. 25, the CPU 510 operates as three types of functional unit according to firmware, i.e., operates as a monitor unit 511, a notification unit 512, and a registration unit 513. These functional units implement the three functions described above as elements of the consumables management system provided by the manager device 120 according to Embodiment 1: (1) accepting toner replenishment requests; (2) accepting requests for registration of adding/removing a device; and (3) periodically notifying target devices of the number of devices.

The monitor unit 511 controls the network I/F 570, according to a device driver installed on the PC 145, to search for a replenishment request RQS from a device of the device group 110 that corresponds to the device driver. The notification unit 512 periodically, for example each working day, counts the number of device drivers installed on the PC 145, and calculates the number of usable devices of the device group 110. The notification unit 512 further creates data NTC indicating the number of devices and controls the network I/F 570 to notify the device group 110 of the data NTC. When the network I/F 570 detects a replenishment request RQS from a device of the device group 110, the notification unit 512 controls the network I/F 570 to transfer the replenishment request RQS to the cloud server 130. The registration unit 513 accepts, via the user I/F 580, a request for installation/uninstallation of a device driver corresponding to addition/removal of a device to/from the network NTW, and executes the install/uninstall. Thus, in the case of an install, the properties 551 of a corresponding device are added to the storage unit 550, and in the case of an uninstall, the properties 551 of a corresponding device are overwritten with an entry to the effect that the "device is unavailable" or all of a device driver that includes the properties 551 is deleted from the storage unit 550.

[Correction of Predicted Replenishment Time]

Figure 26:
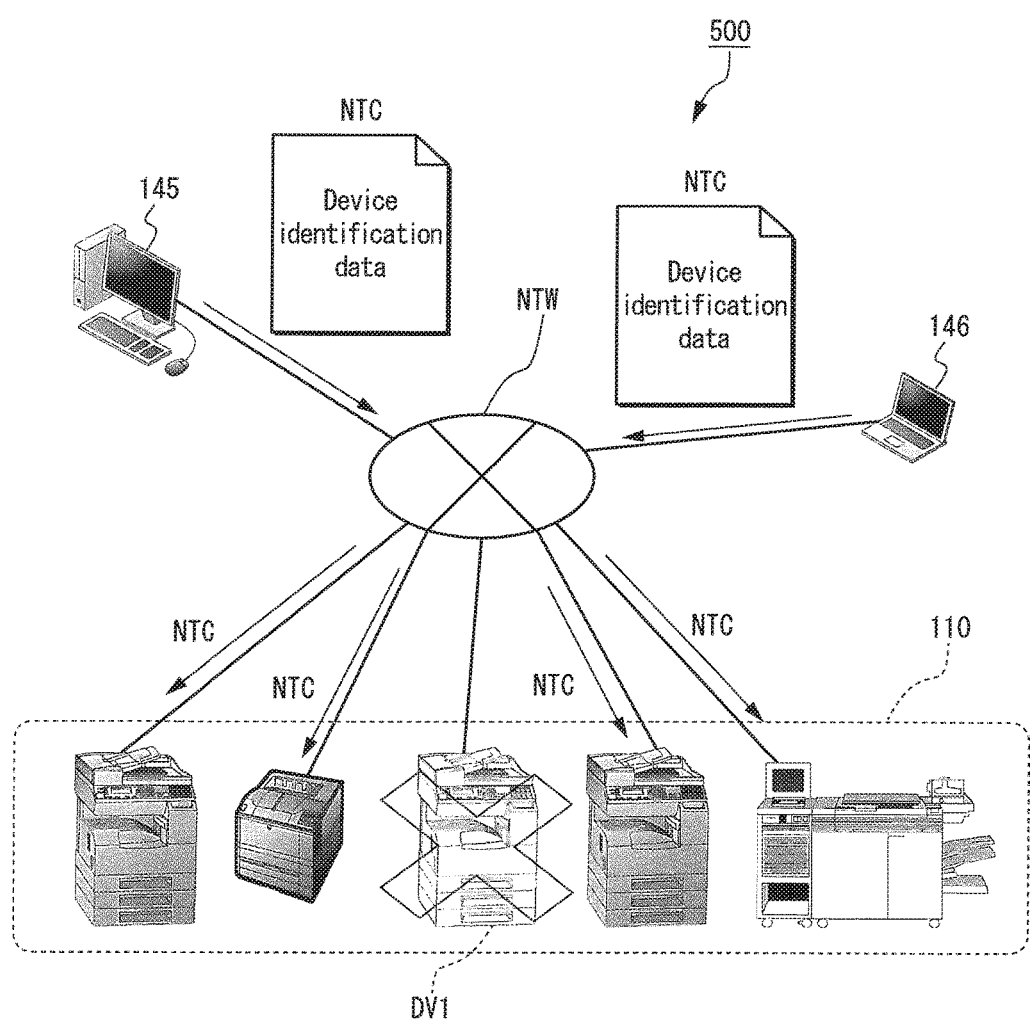
FIG. 26 is a schematic diagram showing data exchanges by a system according to Embodiment 5 of the invention when the PC shown in FIG. 25 uninstalls a device driver in response to removal of a corresponding image forming device from the network.

When there is a change in the number of devices of the device group 110, the system according to Embodiment 5 controls each device of the device group 110 to predict the replenishment time as follows:

FIG. 26 is a schematic diagram showing data exchanges by the system 500 when the PC 145 uninstalls a device driver in response to removal of a corresponding device from the network NTW. Referring to FIG. 26, when one device DV1 among the device group 110 is removed from the network NTW, a user requests that device drivers corresponding to the device DV1 be uninstalled from terminals 145, 156, which used the device DV1. In the terminals 145 and 146, the registration unit 513 uninstalls the device driver of the device DV1 in response to the request, and overwrites the properties of the device DV1 stored in the storage unit 550. When the device DV1 is newly added to the device group 110, the device driver of the device DV1 is installed in response to a request for installation of the device driver, and properties of the device DV1 are stored in the storage unit 550.

In the terminals 145 and 146 of the PC group 140, the notification unit 512 periodically searches for identification data of devices, for example device names or IP addresses, from device drivers installed thereon, and sends the data NTC to devices of the device group 110 to notify them of identification data of a device that the terminal can use. The interval for notification is set to be equal to or less than the interval for prediction of replenishment time, which may be a week or five working days, for example the interval for notification may be one working day.

When accepting the data NTC, in each device of the device group 110, the prediction unit 612 first reads identification data of devices from the data NTC, and subsequently calculates the number of devices from the identification data. At this time, a device common to different PCs is counted as one device. The counted value expresses the number of devices usable by the PC group 140, i.e., the total number of devices of the device group 110. The prediction unit 612 then calculates a ratio of the total number and a total number obtained from the previous data NTC. When this ratio is not "1", it indicates a change in the number of devices. Accordingly, the prediction unit 612 uses the ratio to correct their predicted replenishment time, i.e., their threshold value for toner consumption, in the same way as in Embodiment 1.

In particular, even if removal of one device DV1 causes an abrupt increase in the amount of jobs that the surrounding devices should process, the interval for notifying devices of the number of devices is set to be equal to or less than the interval for predicting replenishment time, and therefore the consumables management system enables each device to bring forward the replenishment time to keep pace with the abrupt increase.

—Process of Correction of Prediction—

Figure 27:
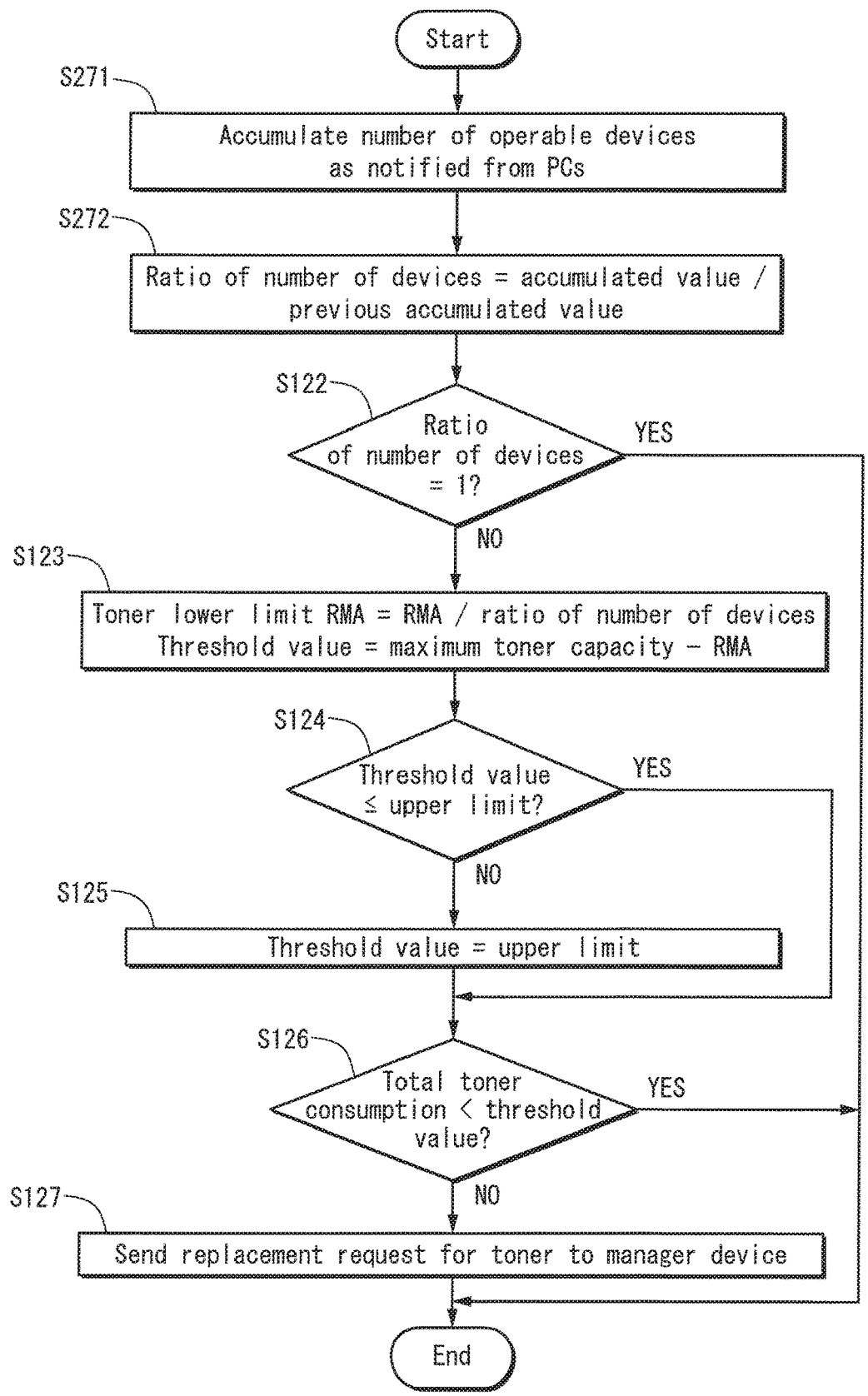
FIG. 27 is a flowchart of a process in which each image forming device corrects a threshold value for amount of toner consumption based on the number of image forming devices received from the PC shown in FIG. 26.

FIG. 27 is a flowchart of a process in which the control unit 60 of each device of the device group 110 corrects a threshold value for amount of toner consumption based on the number of devices received from the PC 145 and the PC 146. The controller unit 60 starts the process when the data NTC indicating usable devices is received from the PC 145 and the PC 146. Compared with the process of the controller unit 60 according to Embodiment 1 and shown in FIG. 12, in this process steps S271 and S272 are included instead of step S121, but other steps are the same. These other steps have the same reference signs as in FIG. 12, such as "S122, S123, . . . ."

In step S271, the prediction unit 612 reads identification data of devices from the data NTC, and cross-checks it with identification data of devices read from the data NTC from other terminals of the PC group 140. Thus, the number of devices of the device group 110 is totaled. Subsequently, processing proceeds to step S272.

In step S272, the prediction unit 612 calculates the ratio of a total value calculated in step S271 to the previous total value as a ratio of the numbers of devices. Subsequently, processing proceeds to step S122.

In step S122, the prediction unit 612 checks whether the ratio of the numbers of devices is equal to one. If the ratio is equal to one, processing ends, and if not, processing proceeds to step S123.

In step S123, the ratio of the numbers of devices is not one and therefore devices have changed in number. The prediction unit 612 divides the toner lower limit RMA by the ratio and replaces the toner lower limit RMA with the quotient.

The prediction unit 612 further updates the threshold value of toner consumption with the difference between the new toner lower limit RMA and the maximum toner capacity, i.e., threshold value=maximum toner capacity−RMA. Subsequently, processing proceeds to step S124.

In step S124, the prediction unit 612 checks whether the threshold value is equal to or less than an upper limit. If the threshold value is less than or equal to the upper limit, processing proceeds to step S126, and if greater than the upper limit, processing proceeds to step S125.

In step S125, the threshold value is greater than the upper limit, and therefore the prediction unit 612 limits the threshold value to the upper limit Subsequently, processing proceeds to step S126.

In step S126, the monitor unit 611 checks whether total toner consumption since the last toner replenishment is less than the threshold value. If the total toner consumption is less than the threshold value, processing ends, and if greater than or equal to the threshold value, processing proceeds to step S127.

In step S127, the total toner consumption has reached or exceeded the threshold value and therefore the monitor unit 611 notifies the request unit 613. In response to the notification, the request unit 613 sends a replenishment request RQS to the PC 145, and the notification unit 512 of the PC 145 transfers the replenishment request RQS to the cloud server 130. Subsequently, processing ends.

Advantages of Embodiment 5

In the consumables management system 500 according to Embodiment 5 of the invention, as in the system 100 according to Embodiment 1, each device of the device group 110 monitors the amount of toner that the device consumes, sets the toner lower limit RMA based on the history of toner consumption, and predicts the time when the total toner consumption reaches the threshold value, which is lower than the maximum toner capacity by the toner lower limit RMA. However, instead of the manager device 120 of the system 100 according to Embodiment 1, at least one terminal 145, 146 of the PC group 140 in the system 500 periodically sends to each device of the device group 110 data NTC indicating devices available to the at least one terminal 145, 146. Each device of the device group 110 reads from the data NTC identification data items of the available devices to count the number of the items as the number of devices of the device group 110. Each device of the device group 110 further calculates the ratio of the number to the previously-counted number, and if the ratio is not one, then the device divides the toner lower limit RMA by the ratio, and replaces the toner lower limit RMA with the quotient. Thus, the consumables management system makes the devices correct their predicted replenishment time in response to changes in number of the devices. Therefore, the consumables management system enables the devices to more accurately predict replenishment time regardless of fluctuations in number of the devices.

Modifications of Embodiment 5

(A) The notification unit 512 of the PC 145 repeats the device driver count and the notification of the number of devices to the device group 110 at the same intervals. Alternatively, the notification unit 512 may perform the device driver count at shorter intervals than the intervals at which the notification of the number of devices is performed. For example, the device drivers may be counted every hour, and notification of the number of devices may be sent every day. In this case, the notification unit 512 may set a representative value of the number of device drivers obtained since the last notification as the number of available devices, such as a maximum value or an average value.

[Supplement]

Embodiments 1 to 5 and their modifications can be freely combined with each other. This is clearly understandable from the above description for those skilled in the art.

In each consumables management system according to the above-described embodiments of the invention, the prediction unit predicts a predicted time for replenishment or replacement of consumables based on a consumption ratio of consumables in at least one of the image forming devices connected to the network. When the acquisition unit acquires the number of the image forming devices from registered data about the devices, the prediction unit corrects the predicted time for replenishment or replacement based on comparison between the number and a number previously acquired. This system can thus accurately predict time for replenishment or replacement of consumables in the image forming devices connected to the same network regardless of fluctuation in number of the image forming devices.

Based on the above-described embodiments, the invention may be characterized as follows.

In the system according to the invention, the prediction unit may predict time for replacement or replacement at first intervals, and the acquisition unit may acquire the number of the image forming devices at second intervals, each of the second intervals being equal to or shorter than each of the first intervals. The registered data may contain identification data items of the image forming devices, and the acquisition unit may count the number of the identification data items of the image forming devices and set the counted value as the number of the image forming devices. The prediction unit may express the predicted time as a threshold value for the consumption ratio of consumables; the requisition unit may define the predicted time as being reached when the consumption ratio of consumables reaches the threshold value; and whenever the acquisition unit acquires the number of the image forming devices, the prediction unit may correct the threshold value based on the ratio of the number to another number previously acquired.

This system may include a status monitor unit; this unit monitors operational statuses of the image forming devices via the network. Based on a result that the status monitor unit monitors, the acquisition unit may count the number of operable image forming devices of the image forming devices and may set the counted value as the number of the image forming devices. The operational statuses of the image forming devices monitored by the status monitor unit may include frequencies in use of the image forming devices. When the prediction unit corrects the predicted time in response to a decrease in the number of the image forming devices, the prediction unit may distribute the frequency in use of a previously-operable image forming device among the operable image forming devices equally or in proportion to increments in the frequencies in use thereof; the previously-operable image forming device is a device classified as operable in a result that the status monitor unit monitored and the acquisition unit used to acquire the number of the image forming devices before the decrease in the number. The prediction unit may correct the threshold value based on change in the frequencies in use of the image forming devices before and after the distributing.

This system may further include a manager device that is connected to the image forming devices via the network. The acquisition unit may be incorporated into the manager device, while the consumption ratio monitor unit, the prediction unit, and the requisition unit may be incorporated into a specific one of the image forming devices. The manager device may include a notification unit that notifies the specific image forming device of data about the number that the acquisition unit has acquired. In response to the data from the notification unit, the prediction unit may correct the predicted time based on comparison between a number that the acquisition unit previously acquired and another number that the acquisition unit has newly acquired. The data may indicate the number of the image forming devices other than the specific image forming device. The registered data may contain an item showing which types of sheet and job each of the other image forming devices can process. Based on the item, the notification unit may count the number of the other image forming devices that can process each type of sheet or job; and based on the counted number of the other image forming devices that can process each type of sheet or job, the prediction unit may correct the predicted time for each type of sheet or job that the specific image forming device can process. A type of job that at least one of the other image forming devices can process may indicate whether an image to be processed is monochrome or color.

The manager device may be built into a device that directs a job to at least one of the image forming devices. The manager device may be built into an electronic device connected to the network and may retrieve information about the image forming devices from device drivers installed in an operating system of the electronic device.

The information processing device according to the invention may be, as a consumable manager device, connected to the image forming devices via the network. The acquisition unit may acquire the number of the image forming devices other than a specific one of the image forming devices. The consumption ratio monitor unit may monitor a consumption ratio of consumables in the specific image forming device. The prediction unit may correct the predicted time for the specific image forming device according to a change in number of the other image forming devices.

The information processing device according to the invention may be a specific one of the image forming devices. The consumption ratio monitor unit may monitor a consumption ratio of consumables in the specific image forming device. The acquisition unit may refer to registered data about other image forming devices connected to the same network as the specific image forming device, and may acquire the number of the other image forming devices. The prediction unit may correct the predicted time for the specific image forming device according to a change in number of the other image forming devices. The acquisition unit may acquire the registered data from a manager device connected to the network. This information processing device may further include a storage unit that stores therein registered data about the image forming devices other than the specific image forming device.

According to the program codes on the non-transitory recording medium according to the invention, the computer may further execute: predicting the predicted time at first intervals; and acquiring the number of the image forming devices at second intervals; each of the second intervals being equal to or shorter than each of the first intervals. The registered data may contain identification data items of the image forming devices. Acquiring the number of the image forming devices may include counting the number of the identification data items thereof and setting the counted value as the number of the image forming devices. The predicted time may be expressed as a threshold value for the consumption ratio of consumables. Issuing the request for replenishment or replacement of consumables may include defining that the predicted time is reached when the consumption ratio of consumables reaches the threshold value. The computer may further execute according to the program codes, whenever acquiring the number of the image forming devices, correcting the threshold value as well as the predicted time based on the ratio of the number to another number previously acquired. Acquiring the number of the image forming devices may include: monitoring operational statuses of the image forming devices via the network; and counting, based on a result of the monitoring, the number of operable image forming devices of the image forming devices, to set the counted value as the number of the image forming devices. The operational statuses of the image forming devices to be monitored may include frequencies in use of the image forming devices. Correcting the predicted time may include: in response to a decrease of the number of the image forming devices, distributing the frequency in use of a previously-operable image forming device among the operable image forming devices equally or in proportion to increments in the frequencies in use thereof, wherein the previously-operable image forming device is a device classified as operable in a result of the monitoring that was used to acquire the number of the image forming devices before the decrease in the number; and correcting the threshold value based on change in the frequencies in use of the image forming devices before and after the distributing.

The computer may be built into a manager device connected to the image forming devices via the network. Monitoring the consumption ratio of consumables may include assigning as an object of the monitoring the consumption ratio of consumables in a specific one of the image forming devices. Correcting the predicted time may include using change in number of the image forming devices other than the specific image forming device to correct the predicted time for the specific image forming device. The request to be issued may indicate the request for replenishment or replacement of consumables to the specific image forming device. The registered data may contain an item showing which types of sheet and job each of the image forming devices other than the specific image forming device can process. Acquiring the number of the image forming devices may include acquiring, based on the item, the number of the other image forming devices that can process each type of sheet and job. Correcting the predicted time may include using the acquired number of the other image forming devices that can process each type of sheet or job to correct the predicted time for each type of sheet or job that the specific image forming device can process. A type of job that at least one of the other image forming devices can process may indicate whether an image to be processed is monochrome or color. The manager device may be built into a device that directs a job to at least one of the image forming devices. The manager device may be built into an electronic device connected to the network. The computer may further execute, according to the program codes, retrieving information about the other image forming devices from device drivers installed in an operating system of the electronic device.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A system comprising image forming devices that are connected to each other via a network, the system further comprising:
   a storage device configured to store therein registered data about the image forming devices;
   a hardware processor configured to:
   monitor a consumption ratio of consumables in at least one of the image forming devices;
   predict a predicted time for replenishment or replacement of consumables for each image forming device monitored, based on the consumption ratio of consumables thereof;
   correct the predicted time in response to at least one of a connecting status corresponding to a number of the plurality of image forming devices connected on the network and an operable status corresponding to a number of the plurality of image forming devices detected to be operable on the network; and
   issue a request for replenishment or replacement of consumables at the predicted time; and
   a manager device that is connected to the image forming devices via the network,
   wherein:
   the hardware processor is incorporated into a specific one of the image forming devices,
   the manager device includes another hardware processor which is configured to acquire at least one of the number of the imaging devices that are connected on the network and the number of the image forming devices detected to be operable on the network, and to notify the specific image forming device of data about the acquired number, and
   in response to the data from the manager device, the hardware processor of the specific image forming device corrects the predicted time based on a comparison between a number that the hardware processor of the manager device previously acquired and another number that the hardware processor of the manager device has newly acquired.

2. The system according to claim 1, wherein:
   the hardware processor of the specific image forming device predicts the predicted time for replenishment or replacement at first intervals; and
   the hardware processor of the manager device acquires said at least one of the number of the image forming devices that are connected on the network and the number of the image forming devices that are detected to be operable on the network, at second intervals, each of the second intervals being equal to or shorter than each of the first intervals.

3. The system according to claim 1, wherein:
   the hardware processor of the manager device acquires said at least one of the number of the image forming devices that are connected on the network and the number of the image forming devices that are detected to be operable on the network, by referring to the registered data;
   the registered data contains identification data items of the image forming devices; and
   the hardware processor of the manager device counts a number of the identification data items of the image forming devices and sets the counted value as the number of the image forming devices.

4. The system according to claim 1, wherein:
the hardware processor of the manager device acquires said at least one of the number of the image forming devices that are connected on the network the number of the image forming devices that are detected to be operable on the network;
the hardware processor of the specific image forming device:
expresses the predicted time as a threshold value for the consumption ratio of consumables; and
defines the predicted time as being reached when the consumption ratio of consumables reaches the threshold value; and
whenever the hardware processor of the manager device acquires the number of the image forming devices, the hardware processor of the specific image forming device corrects the threshold value based on a ratio of the presently acquired number to another number previously acquired.

5. The system according to claim 1, wherein:
the hardware processor of the manager device is configured to acquire the number of the image forming devices detected to be operable on the network;
the hardware processor of the manager device is further configured to monitor operational statuses of the image forming devices via the network; and
based on a result of the monitoring, the hardware processor of the manager device counts the number of operable image forming devices of the image forming devices and sets the counted value as the number of the image forming devices detected to be operable.

6. The system according to claim 5, wherein:
the hardware processor of the specific image forming device:
expresses the predicted time as a threshold value for the consumption ratio of consumables; and
defines the predicted time as being reached when the consumption ratio of consumables reaches the threshold value;
the operational statuses of the image forming devices monitored include frequencies in use of the image forming devices; and
when the hardware processor of the specific image forming device corrects the predicted time in response to a decrease in the number of the image forming devices, the hardware processor of the specific image forming device:
distributes the frequency in use of a previously-operable image forming device among the operable image forming devices equally or in proportion to increments in the frequencies in use thereof, wherein the previously-operable image forming device is a device classified as operable in a result of the monitoring and used to acquire the number of the image forming devices before the decrease in the number, and
corrects the threshold value based on change in the frequencies in use of the image forming devices before and after the distributing.

7. The system according to claim 1, wherein the data of which the hardware processor of the manager device notifies the specific image forming device indicates the number of the image forming devices other than the specific image forming device.

8. The system according to claim 7, wherein a type of job that at least one of the other image forming devices can process indicates whether an image to be processed is monochrome or color.

9. The system according to claim 1, wherein:
the registered data contains an item showing which types of sheet and job each of the other image forming devices can process;
based on the item, the hardware processor of the manager device counts the number of the other image forming devices that can process each type of sheet and job; and
based on the counted number of the other image forming devices that can process each type of sheet and job, the hardware processor of the specific image forming device corrects the predicted time for each type of sheet or job that the specific image forming device can process.

10. The system according to claim 1, wherein the manager device is built into a device configured to direct a job to at least one of the image forming devices.

11. The system according to claim 1, wherein the manager device is built into an electronic device connected to the network and retrieves information about the image forming devices from device drivers installed in an operating system of the electronic device.

12. The system according to claim 1, wherein the hardware processor of the specific image forming device is configured to correct the predicted time based on a comparison between a first number previously acquired and a second number presently acquired about at least one of the number of the image forming devices connected on the network and the number of the image forming devices detected to be operable on the network.

13. The system according to claim 1, wherein the hardware processor of the manager device is further configured to detect an error caused in at least one of the image forming devices.

14. The system according to claim 1, wherein the hardware processor of the specific image forming device further corrects the predicted time based on the number of plurality of image forming devices detected to be operable on the network and frequencies of use of the image forming devices.

15. A non-transitory recording medium having stored thereon program codes executable by a computer connected to image forming devices via a network, the program codes being executable by the computer to cause the computer to perform functions comprising:
monitoring a consumption ratio of consumables in at least one of the image forming devices;
predicting a predicted time for replenishment or replacement of consumables for each image forming device monitored, based on the consumption ratio thereof;
correcting the predicted time in response to at least one of a connecting status corresponding to a number of the plurality of image forming devices connected on the network and an operable status corresponding to a number of the plurality of image forming devices detected to be operable on the network; and
issuing a request for replenishment or replacement of consumables at the predicted time;
wherein:
the computer is built into a manager device connected to the image forming devices via the network;
monitoring the consumption ratio of consumables includes assigning as an object of the monitoring the consumption ratio of consumables in a specific one of the image forming devices;

correcting the predicted time includes using change in number of image forming devices other than the specific image forming device to correct the predicted time for the specific image forming device; and the request to be issued indicates the request for replenishment or replacement of consumables to the specific image forming device.

16. The non-transitory recording medium according to claim 15, wherein the program codes cause the computer to perform further functions comprising:

predicting the predicted time at first intervals; and acquiring the number of the image forming devices that are connected on the network or that are detected to be operable on the network, at second intervals, each of the second intervals being equal to or shorter than each of the first intervals.

17. The non-transitory recording medium according to claim 15, wherein:

the program codes cause the computer to perform further functions comprising acquiring at least one of the number of the image forming devices that are connected on the network and the number of the image forming devices that are detected to be operable on the network, by referring to registered data;

the registered data contains identification data items of the image forming devices; and acquiring the number of the image forming devices includes counting the number of the identification data items thereof and setting the counted value as the number of the image forming devices.

18. The non-transitory recording medium according to claim 15, wherein:

the program codes cause the computer to perform further functions comprising acquiring at least one of the number of the image forming devices that are connected on the network and the number of the image forming devices that are detected to be operable on the network;

the predicted time is expressed as a threshold value for the consumption ratio of consumables;

issuing the request for replenishment or replacement of consumables includes defining the predicted time as being reached when the consumption ratio of consumables reaches the threshold value; and the program codes cause the computer to perform further functions comprising correcting, whenever the number of the image forming devices is acquired, the threshold value as well as the predicted time based on a ratio of the presently acquired number to another number previously acquired.

19. The non-transitory recording medium according to claim 15, wherein:

the program codes cause the computer to perform further functions comprising:

acquiring the number of the image forming devices detected to be operable on the network; and wherein acquiring the number of the image forming devices detected to be operable on the network includes:

monitoring operational statuses of the image forming devices via the network; and counting, based on a result of the monitoring, the number of operable image forming devices of the image forming devices, to set the counted value as the number of the image forming devices detected to be operable on the network.

20. The non-transitory recording medium according to claim 19, wherein the predicted time is expressed as a threshold value for the consumption ratio of consumables;

issuing the request for replenishment or replacement of consumable includes defining the predicted time as being reached when the consumption ratio of consumables reaches the threshold value;

the operational statuses of the image forming devices to be monitored includes frequencies in use of the image forming devices, and correcting the predicted time includes:

in response to a decrease of the number of the image forming devices, distributing the frequency in use of a previously-operable image forming device among the operable image forming devices equally or in proportion to increments in the frequencies in use thereof, wherein the previously-operable image forming device is a device classified as operable in a result of the monitoring that was used to acquire the number of the image forming devices before the decrease in the number; and correcting the threshold value based on change in the frequencies in use of the image forming devices before and after the distributing.

21. The non-transitory recording medium according to claim 15, wherein:

the program codes cause the computer to perform further functions comprising:

acquiring at least one of the number of the image forming devices that are connected on the network and the number of the image forming devices that are detected to be operable on the network;

the registered data contains an item showing which types of sheet and job each of the image forming devices other than the specific image forming device can process;

acquiring at least one of the number of the image forming devices that are connected on the network and the number of the image forming devices that are detected to be operable on the network includes acquiring, based on the item, the number of the other image forming devices that can process each type of sheet and job; and correcting the predicted time includes using the acquired number of the other image forming devices that can treat each type of sheet or job to correct the predicted time for each type of sheet or job that the specific image forming device can process.

22. The non-transitory recording medium according to claim 21, wherein a type of job that each of the other image forming devices can process indicates whether an image to be processed is monochrome or color.

23. The non-transitory recording medium according to claim 15, wherein the manager device is built into a device configured to direct a job to each of the image forming devices.

24. The non-transitory recording medium according to claim 15, wherein:

the manager device is built into an electronic device connected to the network, and the program codes cause the computer to perform further functions comprising retrieving information about the other image forming devices from device drivers installed in an operating system of the electronic device.

25. The non-transitory recording medium according to claim 15, wherein the predicted time is corrected based on a comparison between a first number previously acquired and a second number presently acquired about at least one of the number of the image forming devices connected on the network and the number of the image forming devices detected to be operable on the network.

26. The non-transitory recording medium according to claim 15, wherein the program codes cause the computer to perform further functions comprising detecting an error caused in at least one of the image forming devices.

27. The non-transitory recording medium according to claim 15, wherein the program codes cause the computer to perform further functions comprising correcting the predicted time based on the number of the plurality of image forming devices detected to be operable on the network and frequencies of use of the image forming devices.

* * * * *